US008639775B2

(12) United States Patent
Nakagawa et al.

(10) Patent No.: US 8,639,775 B2
(45) Date of Patent: *Jan. 28, 2014

(54) COMPUTER SYSTEM AND ITS MANAGEMENT METHOD

(75) Inventors: Hirotaka Nakagawa, Sagamihara (JP); Mioko Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 160 days.

This patent is subject to a terminal disclaimer.

(21) Appl. No.: 13/130,390

(22) PCT Filed: Apr. 28, 2011

(86) PCT No.: PCT/JP2011/002501
§ 371 (c)(1),
(2), (4) Date: May 20, 2011

(87) PCT Pub. No.: WO2012/147135
PCT Pub. Date: Nov. 1, 2012

(65) Prior Publication Data
US 2012/0278426 A1  Nov. 1, 2012

(51) Int. Cl.
*G06F 15/16* (2006.01)
(52) U.S. Cl.
USPC .......................................................... 709/217
(58) Field of Classification Search
USPC .......... 709/217, 213, 223; 711/114, 117, 162, 711/165, 170, 112; 380/270
See application file for complete search history.

(56) References Cited

U.S. PATENT DOCUMENTS

| 6,230,239 | B1* | 5/2001 | Sakaki et al. ................. 711/112 |
| 6,240,494 | B1* | 5/2001 | Nagasawa et al. ............ 711/165 |
| 6,538,669 | B1* | 3/2003 | Lagueux et al. ............... 715/764 |
| 6,839,747 | B1* | 1/2005 | Blumenau et al. ............ 709/223 |
| 6,928,513 | B2* | 8/2005 | Lubbers et al. ............... 711/114 |
| 7,353,358 | B1* | 4/2008 | Marokhovsky ............... 711/170 |
| 7,469,325 | B2* | 12/2008 | Shibayama et al. .......... 711/162 |
| 7,805,585 | B2* | 9/2010 | Shibayama et al. .......... 711/165 |
| 8,046,537 | B2* | 10/2011 | Carr et al. ..................... 711/117 |
| 2004/0039875 | A1* | 2/2004 | Kuwata ......................... 711/114 |
| 2005/0080810 | A1* | 4/2005 | Matsuura ...................... 707/102 |
| 2006/0080362 | A1* | 4/2006 | Wagner et al. ................ 707/200 |
| 2006/0182281 | A1* | 8/2006 | Taguchi et al. ............... 380/270 |
| 2007/0245110 | A1* | 10/2007 | Shibayama et al. .......... 711/165 |

(Continued)

FOREIGN PATENT DOCUMENTS

| EP | 0 926 585 A2 | 12/1998 |
| JP | 2009-217683 A | 9/2009 |

*Primary Examiner* — Chirag Shah
*Assistant Examiner* — Jael Ulysse
(74) *Attorney, Agent, or Firm* — Volpe and koenig, P.C.

(57) ABSTRACT

A migration destination storage apparatus among a plurality of storage apparatuses and has a controller for sending or receiving information to or from a host computer and managing each migration destination volume as an access target of the host computer. The controller manages each migration destination volume by dividing the migration destination volumes into a plurality of resource groups based on identification information for identifying each migration source volume; manages a plurality of resources related to each migration destination volume by associating them with each resource group; and manages each migration destination volume and each resource belonging to each resource group as operation targets to be allocated individually to each migration source user who uses each migration source volume, and as operation targets over which only each migration source user has operation authority.

12 Claims, 41 Drawing Sheets

(56) References Cited

U.S. PATENT DOCUMENTS

| | | | |
|---|---|---|---|
| 2008/0162754 A1* | 7/2008 | Ogawa et al. | 710/74 |
| 2009/0235046 A1* | 9/2009 | Asano et al. | 711/203 |
| 2010/0131728 A1* | 5/2010 | Miyamae et al. | 711/162 |
| 2011/0040943 A1* | 2/2011 | Kondo et al. | 711/162 |
| 2011/0113259 A1* | 5/2011 | Bilodi et al. | 713/193 |
| 2011/0225359 A1* | 9/2011 | Kulkarni et al. | 711/114 |
| 2011/0276821 A1* | 11/2011 | Gudlavenkatasiva et al. | 714/3 |
| 2012/0259810 A1* | 10/2012 | Kopylovitz et al. | 707/609 |

* cited by examiner

FIG.7

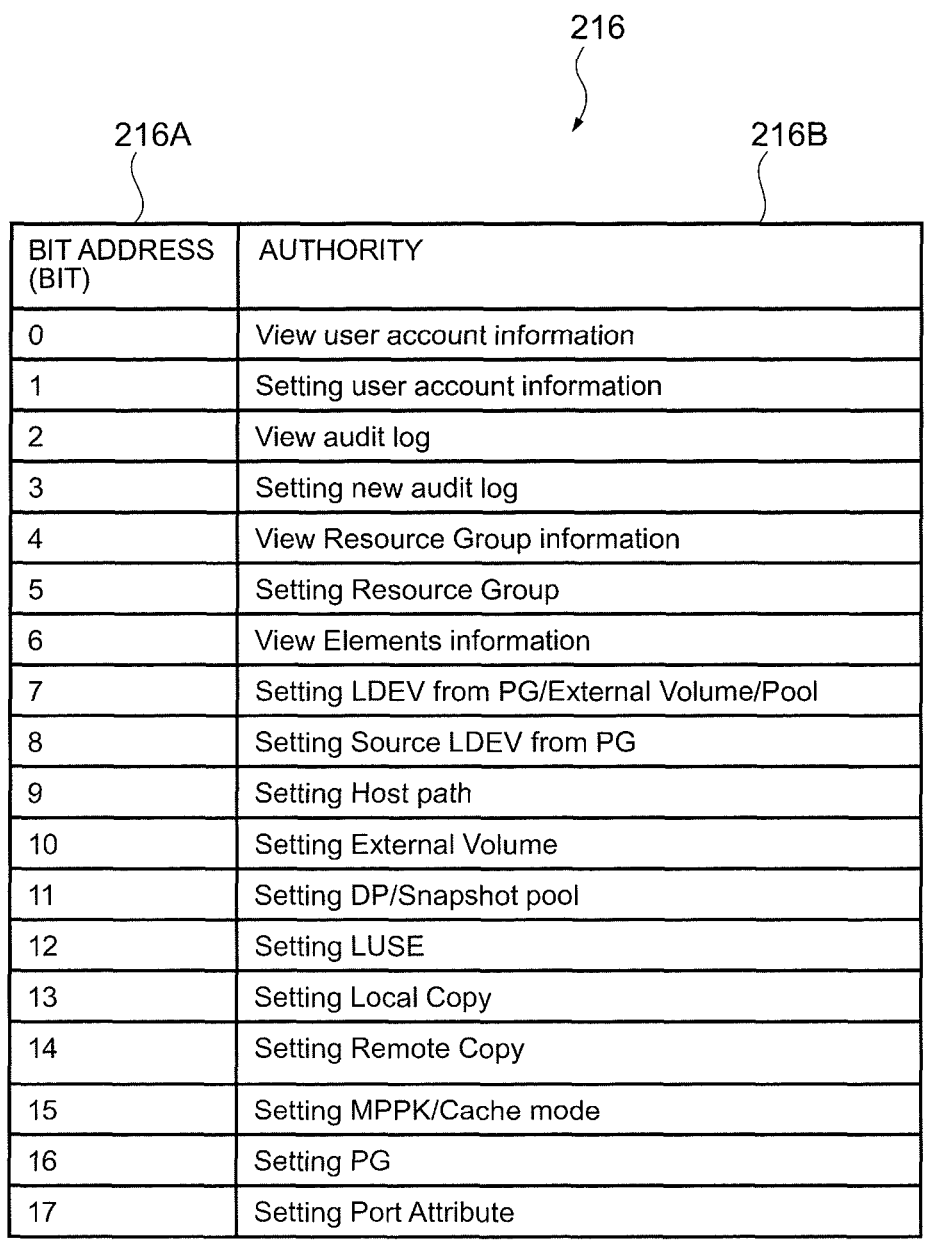

| BIT ADDRESS (BIT) | AUTHORITY |
|---|---|
| 0 | View user account information |
| 1 | Setting user account information |
| 2 | View audit log |
| 3 | Setting new audit log |
| 4 | View Resource Group information |
| 5 | Setting Resource Group |
| 6 | View Elements information |
| 7 | Setting LDEV from PG/External Volume/Pool |
| 8 | Setting Source LDEV from PG |
| 9 | Setting Host path |
| 10 | Setting External Volume |
| 11 | Setting DP/Snapshot pool |
| 12 | Setting LUSE |
| 13 | Setting Local Copy |
| 14 | Setting Remote Copy |
| 15 | Setting MPPK/Cache mode |
| 16 | Setting PG |
| 17 | Setting Port Attribute |

FIG.8

| ROLE ID | ROLE NAME | AUTHORITY BITMAP |
|---|---|---|
| ROLE1 | SECURITY (VIEW) | 000000000001010001 |
| ROLE2 | SECURITY (VIEW/MODIFY) | 000000000001110010 |
| ROLE3 | AUDIT LOG (VIEW) | 000000000000000100 |
| ROLE4 | AUDIT LOG (VIEW/MODIFY) | 000000000000001000 |
| ROLE6 | STORAGE MANAGEMENT (VIEW) | 000000000001010000 |
| ROLE7 | PROVISIONING | 000000000011010000 |
| ROLE8 | POOL MANAGEMENT | 000000100101010000 |
| ROLE9 | UVM MANAGEMENT | 000000010101010000 |
| ROLE10 | LOCAL COPY | 000010010101010000 |
| ROLE11 | REMOTE COPY | 000100000101010000 |
| ROLE12 | PERFORMANCE MANAGEMENTI | 000000000001010000 |
| ROLE13 | SYSTEM RESOURCE MANAGEMENT | 101000000001010000 |
| ROLE14 | VENDOR MAINTENANCE | 111111111111111111 |
| ROLE15 | USER MAINTENANCE | 111000000001010000 |

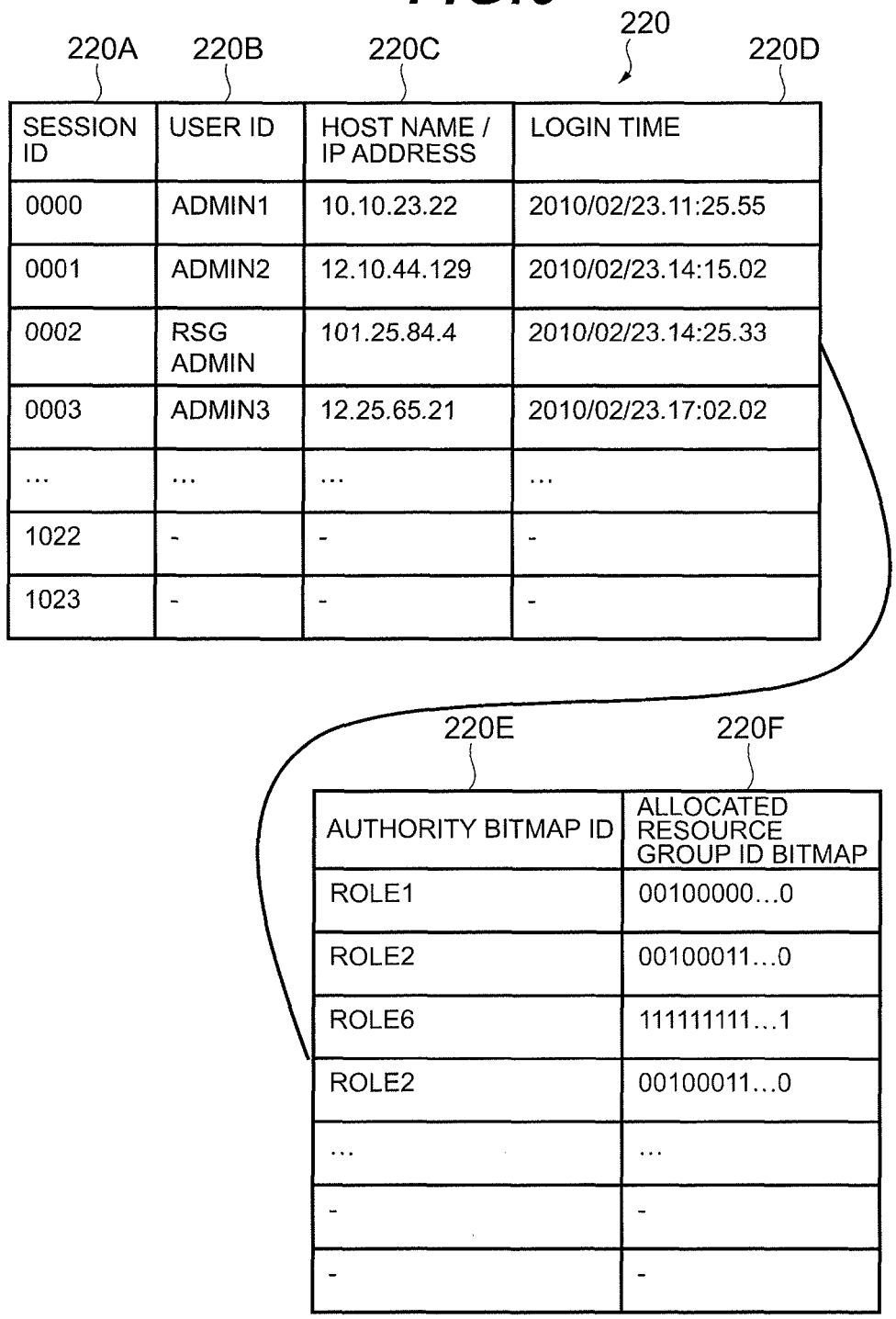

| ID (224A) | RESOURCE ID (224B) | RESOURCE GROUP ID (224C) |
|---|---|---|
| 0x00000 | LDEV#00000 | 0000 |
| 0x00001 | LDEV#00001 | 0000 |
| ... | ... | 0000 |
| 0x0FFFF | LDEV#65535 | 0000 |
| 0x10000 | VDEV#00000 | 0000 |
| 0x10001 | VDEV#00001 | 0000 |
| ... | ... | 0000 |
| 0x1FFFF | VDEV#65535 | 0000 |
| 0x20000 | HG#00000 | 0000 |
| 0x20001 | HG#00001 | 0000 |
| ... | ... | 0000 |
| 0x2FFFF | HG#65535 | 0000 |
| 0x30000 | PORT#1A | 0000 |
| 0x30001 | PORT#1B | 0000 |
| ... | | |
| 0x30100 | PORT#GR | 0000 |

LDEV ID = 65536 (rows 0x00000–0x0FFFF)
VDEV ID = 65536 (rows 0x10000–0x1FFFF)
HG ID = 65536 (rows 0x20000–0x2FFFF)
PORT ID = 256 (rows 0x30000–0x30100)

FIG.12

| ID | DEFAULT RSG NAME | RSG ID | AUTHORITY BITMAP |
|---|---|---|---|
| D1 | TARGET PORTs | RSG0001 | 000000001000000000 |
| D2 | HOST VISIBLE LDEV NUMBERS | RSG0002 | 000110000010000000 |
| D3 | SOURCE LDEV NUMBERS | RSG0003 | 000000000011010000 |
| D4 | INITIATOR PORTs | - | 000100000000000000 |
| D5 | RCU TARGET PORTs | - | 000100000000000000 |
| D6 | EXTERNAL PORTs | RSG0005 | 000000010000000000 |
| D7 | PARITY GROUPs | RSG0004 | 010000000000000000 |
| D8 | EXTERNAL VOLUMEs | RSG0006 | 000000010000000000 |

FIG.37

| RESOURCE ID | RESOURCE TYPE | CURRENT OWNER | NEW OWNER | GROUP PATTERN ID |
|---|---|---|---|---|
| CLA-1 | VISIBLE PORT | a,b | a | P1 |
| CLA-2 | VISIBLE PORT | a,b | b | P2 |
| CLA-1.HG00 | HOST GROUP | a,b | a | P1 |
| CLA-2.HG00 | HOST GROUP | a,b | b | P2 |
| LDEV00:01 | VISIBLE LDEV | a,b | a | P1 |
| LDEV00:02 | VISIBLE LDEV | a,b | a | P1 |
| LDEV10:11 | VISIBLE LDEV | a,b | b | P2 |
| LDEV10:12 | VISIBLE LDEV | a,b | b | P2 |
| LDEV01:00 | INVISIBLE LDEV | a,b | a,b | P3 |
| LDEV01:01 | INVISIBLE LDEV | a,b | a,b | P3 |
| LDEV01:02 | INVISIBLE LDEV | a,b | a,b | P3 |
| LDEV01:03 | INVISIBLE LDEV | a,b | a,b | P3 |
| E1-1 | ExG | a,b | a,b | P3 |
| CLB-1 | INVISIBLE PORT | a,b,c | a,b,c | P4 |

FIG.38

| GROUP PATTERN ID | OWNER | RESOURCE GROUP ID | RESOURCE GROUP NAME |
|---|---|---|---|
| P1 | a | 1 | "MODEL.SERIAL.1" |
| P2 | b | 2 | "MODEL.SERIAL.2" |
| P3 | a, b | 3 | "MODEL.SERIAL" |
| P4 | a,b,c | 10 | "MODEL.SERIAL,MODEL 2.SERIAL2" |

COMPUTER SYSTEM AND ITS MANAGEMENT METHOD

TECHNICAL FIELD

The present invention relates to a computer system and its management method. For example, the invention relates to: a computer system having a plurality of storage apparatuses for which a multitenancy-type management system is adopted; and a method for managing such a computer system.

BACKGROUND ART

There is a suggested computer system configured so that if a failure occurs in some storage apparatus in the computer system where a plurality of storage apparatuses are mutually connected via a network, a normal storage apparatus takes over input/output requests from a host computer and storage apparatus function operation (hereinafter sometimes referred to as the storage operation) from the storage apparatus where the failure occurred (see Patent Literature 1).

In this case, if a failure occurs in a first storage apparatus among a plurality of storage apparatuses, the input/output requests from a host computer and the storage operation such as data processing and data migration can be continued at a normal second storage apparatus.

Meanwhile, in a large-scale storage aggregate environment where, for example, a plurality of companies or a plurality of departments share one storage apparatus, there has recently been a need for a multitenancy-type management method for assigning an administrator to each company or each department and having each administrator manage the storage apparatuses as a storage apparatus management method in order to reduce a burden on the administrators of the storage apparatuses.

CITATION LIST

Patent Literature

PTL 1: Japanese Patent Application Laid-Open (Kokai) Publication No. 2009-217683

SUMMARY OF INVENTION

Technical Problem

If the method described in Patent Literature 1 is adopted for a computer system for which the multitenancy-type management system is used, input/output requests from a host computer and the storage operation between storage apparatuses can be taken over, but resource access control information of an administrator cannot be taken over.

Specifically speaking, when executing volume migration processing online, the resource access control information of the administrator is not a target to be taken over according to the conventional technology described in Patent Literature 1. Therefore, when operating the computer system for which the multitenancy-type management system is adopted, even if an administrator of a migration source storage apparatus attempts to continue operation management by using a migration destination storage apparatus, they cannot recognize the correspondence relationship between the migration source resource and the migration destination resource, which will cause the administrator to select a wrong resource, resulting in cessation of their business and business of others.

Specifically speaking, when two storage apparatuses in a plurality of storage apparatuses are migration source storage apparatuses and another storage apparatus is a migration destination storage apparatus and data of volumes (migration source volumes) managed by each migration source storage apparatus are migrated to volumes of the migration destination storage apparatus (migration destination volumes), each administrator who manages each migration source storage apparatus can manage the migration destination volumes as operation targets.

However, if the correspondence relationship between the migration source volumes (migration source resources) and the migration destination volumes (migration destination resources) is not associated with each administrator, each migration destination volume becomes an operation target of each administrator, so that each administrator might operate the migration destination volumes of other administrators by mistake. In this case, this will result in the cessation of their own business or business of others.

Incidentally, under this circumstance, it is possible to adopt a method of manually allocating the resources of the migration destination storage apparatus to each administrator. However, if this method is adopted, resource distribution mistakes tend to occur easily as the number of the resources or the number of the administrators increases. Also, a burden on each administrator to distribute the resources will increase and costs of distribution for the system will increase.

The present invention was devised in light of the problems of the above-described conventional technology and it is an object of the invention to provide a computer system and its management method capable of appropriately allocating resources, which have been migrated from the migration source storage apparatuses to the migration destination storage apparatus, to each migration source user who manages each migration source storage apparatus.

Solution to Problem

In order to achieve the above-described object, the present invention provides a computer system wherein two storage apparatuses among a plurality of storage apparatuses are migration source storage apparatuses and another storage apparatus is a migration destination storage apparatus, and data of each migration source volume of each migration source storage apparatus is migrated via networks to each migration destination volume of the migration destination storage apparatus, wherein on condition that a migration setting is set to migrate the data of each migration source volume to each migration destination volume, the host computer switches from each network path connecting each migration source volume and the host computer to each network path connecting each migration destination volume and the host computer, and recognizes each migration destination volume as each migration source volume; wherein the migration destination storage apparatus has a controller for sending or receiving information to or from the host computer and managing each migration destination volume as an access target of the host computer; and wherein the controller manages each migration destination volume by associating it with each migration source storage apparatus and dividing the migration destination volumes into a plurality of resource groups based on identification information for identifying each migration source volume; manages a plurality of resources related to each migration destination volume by associating them with each resource group; and manages each migration destination volume and each resource belonging to each resource group as operation targets to be allocated individually to each migration source user who uses each migration source apparatus, and as operation targets over which only each migration source user has operation authority.

Advantageous Effects of Invention

According to the present invention, resources migrated from the migration source storage apparatuses to the migration destination storage apparatus can be appropriately allocated to each migration source user who manages each migration source storage apparatus.

BRIEF DESCRIPTION OF DRAWINGS

FIG. 7 is a configuration diagram of an authority bitmap management table.
FIG. 8 is a configuration diagram of a role management table.
FIG. 9 is a configuration diagram of a session management table.
FIG. 11 is a configuration diagram of a resource group configuration management table.
FIG. 12 is a configuration diagram of a default resource group ID management table.
FIG. 37 is a configuration diagram of an access management table.
FIG. 38 is a configuration diagram of a group pattern list.

DESCRIPTION OF EMBODIMENTS

First Embodiment

Figure 1:
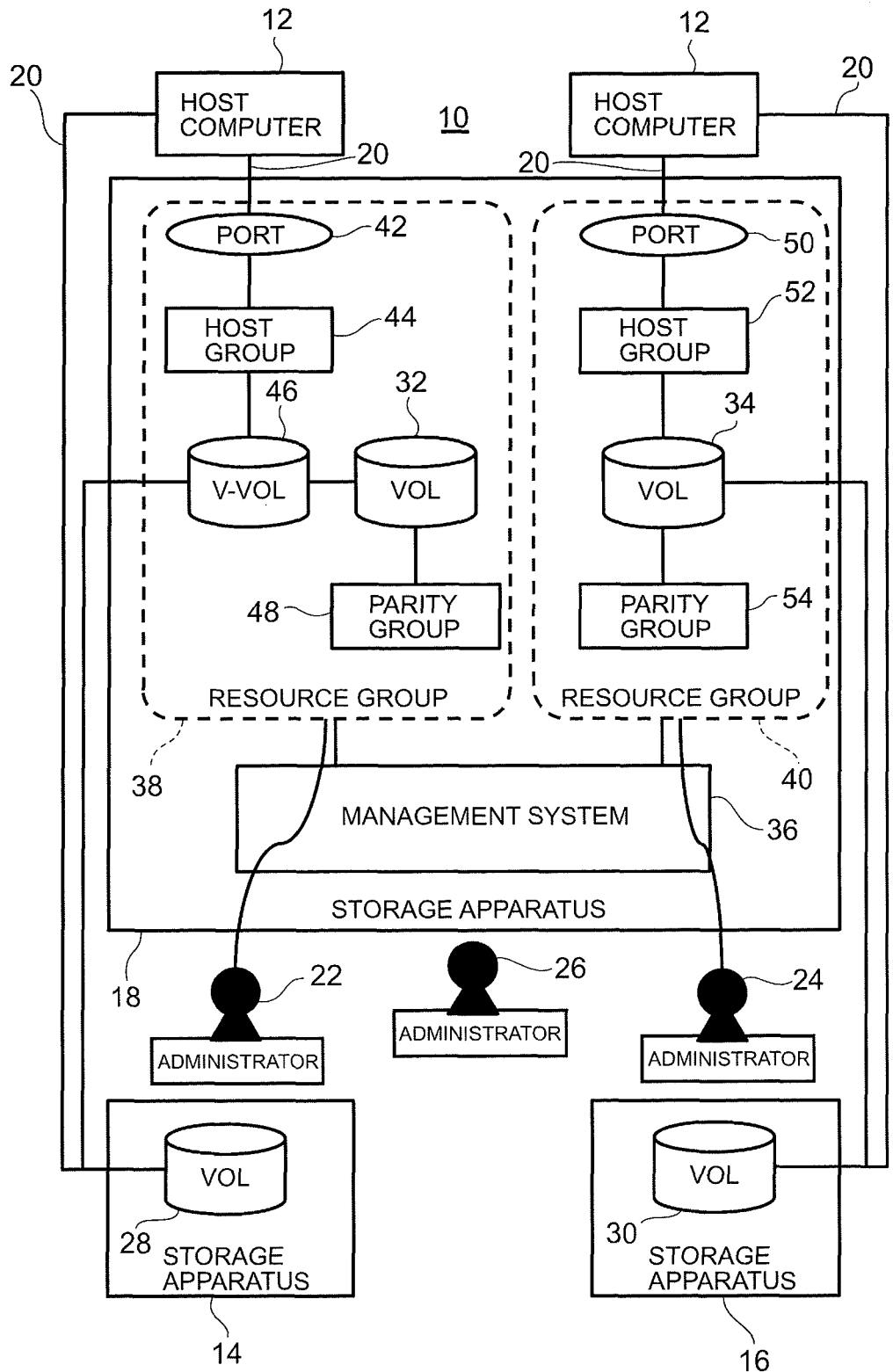
FIG. 1 is an overall configuration diagram of a computer system for explaining the concept of a first embodiment.

FIG. 1 shows an overall configuration diagram of a computer system for explaining the concept of a first embodiment.

Referring to FIG. 1, a computer system 10 includes a host computer 12 and a plurality of storage apparatuses 14, 16, 18 and the host computer 12 and each storage apparatus 14, 16, 18 are connected via a network 20.

The storage apparatus 14 is managed by an administrator 22, the storage apparatus 16 is managed by an administrator 24, and the storage apparatus 18 is managed by an administrator 26.

Under this circumstance, a volume (Vol) 28 of the storage apparatus 14 is provided, as an access target of the host computer 12, from the storage apparatus 14 to the host computer 12; and a volume (Vol) 30 of the storage apparatus 16 is provided, as an access target of the host computer 12, from the storage apparatus 16 to the host computer 12.

When executing online volume migration between the storage apparatus 14 and the storage apparatus 18 by using an external connection function and a local copy function, the storage apparatus 14 is configured as a migration source storage apparatus, the storage apparatus 18 is configured as a migration destination storage apparatus, the volume 28 of the migration source storage apparatus 14 is configured as a migration source volume, a volume (Vol) 32 of the migration destination storage apparatus 18 is configured as a migration destination volume, and data of the migration source volume 28 is migrated to the migration destination volume 32.

On the other hand, when executing online volume migration between the storage apparatus 16 and the storage apparatus 18 by using a remote copy function, the storage apparatus 16 is configured as a migration source storage apparatus, the storage apparatus 18 is configured as a migration destination storage apparatus, the volume 30 of the migration source storage apparatus 16 is configured as a migration source volume, a volume (Vol) 34 of the migration destination storage apparatus is configured as a migration destination volume, and data of the migration source volume 30 is migrated to the migration destination volume 34.

Under this circumstance, the storage apparatus 18 has a SCSI inquiry ID conversion function that is a function converting a globally unique identifier used by the host computer 12 to identify each migration destination volume 32, 34, for example, a SCSI (Small Computer System Interface) Inquiry ID (IDentifier), into an identifier of the migration source volume 28, 30.

When the storage apparatus 18 converts the identifier of the migration destination volume 32 into the identifier of the migration source volume 28 and converts the identifier of the migration destination volume 34 into the identifier of the migration source volume 30 by using the SCSI inquiry ID conversion function, the host computer 12 can identify the migration destination volume 32 as the migration source volume 28 and identify the migration destination volume 34 as the migration source volume 30.

Furthermore, the host computer 12 has a switching path function switching a network path from the same volume without stopping applications. The host computer 12 can convert, for example, a network path connecting the host computer 12 and the migration source volume 28 to a network path connecting the host computer 12 and the migration destination volume 32 and convert a network path connecting the host computer 12 and the migration source volume 30 to a network path connecting the host computer 12 and the migration destination volume 34 by using the switching path function. Under this circumstance, for example, on condition that the administrator 26 sets a migration setting to migrate data of the migration source volumes 28, 30 to the migration destination volumes 32, 34, the host computer 12 converts the network path connecting the host computer 12 and the migration source volume 28 to the network path connecting the host computer 12 and the migration destination volume 32 and also converts the network path connecting the host computer 12 and the migration source volume 30 to the network path connecting the host computer 12 and the migration destination volume 34.

Therefore, the host computer 12 can use the switching path function and thereby switch from I/O (Input/Output) to the migration source volume 28 to I/O to the migration destination volume 32 without stopping the applications and switch from I/O to the migration source volume 30 to I/O to the migration destination volume 34 without stopping the applications. The I/O migration herein means that, for example, I/O between the host computer 12 and the migration source volumes 28, 30 is switched to I/O between the host computer 12 and the migration destination volumes 32, 34. Furthermore, a state in which an online migration configuration is set (duplication state) means a state in which, for example, the data of the migration source volumes 28, 30 correspond with the data of the migration destination volumes 32, 34 and I/O processing is executed between the host computer 12 and the migration source volumes 28, 30.

If the administrator 26 sets the online volume migration configuration by using the management system 36 and then activates a migration support control program (not shown in the drawing) belonging to the management system 36, a resource group (hereinafter sometimes referred to as the migration destination resource groups) 38, 40 is formed for each migration source storage apparatus. Under this circumstance, there is a means for keeping the migration support control program always resident and having it detect the execution of setting of the online volume migration configuration by the administrator 26 and forming the resource groups 38, 40.

The resource group 38 is constituted from the migration destination volume 32 and resources related to the migration destination volume 32 (hereinafter sometimes referred to as the related resources). The related resources includes, for example, a port 42 connected to the host computer 12, a host group 44 connected to the port 42, a virtual volume (V-Vol) 46 connected to the host group 44 and the migration destination volume 32, and a parity group 48 connected to the migration destination volume 32.

The resource group 40 is constituted from the migration destination volume 30 and the related resources related to the migration destination volume. The related resources includes, for example, a port 50 connected to the host computer 12, a host group 52 connected to the port 50 and the migration destination volume 34, and a parity group 54 connected to the migration destination volume 34.

After forming the resource groups 38, 40, the migration support control program allocates the resource group 38 to the administrator 22 and allocates the resource group 40 to the administrator 24.

The administrator 22 can obtain information about configuration changes and the operation status of the storage apparatus 18 via the management system 36 and the administrator 24 can obtain information about configuration changes and the operation status of the storage apparatus 18 via the management system 36.

Under this circumstance, the migration support control program allocates the resource group 38 in association with an administrator account, for example, a user ID, to the administrator 22 and assigns a role (aggregate of the operation authorities) to the administrator 22; and allocates the resource group 40 in association with an account (user ID) of the administrator 24 to the administrator 24 and assigns a role to the administrator 24.

Therefore, the administrator 22 can manage, operate, and refer to only the resources in the allocated resource group 38 within the range of the assigned operation authorities. The administrator 24 can manage, operate, and refer to only the resources in the assigned resource group 40 within the range of the assigned operation authorities.

Consequently, even if the administrators 22, 24 continue operation management business at the migration destination storage apparatus 18, they cannot operate the resources of other administrators, so that they will not affect other businesses.

Figure 2:
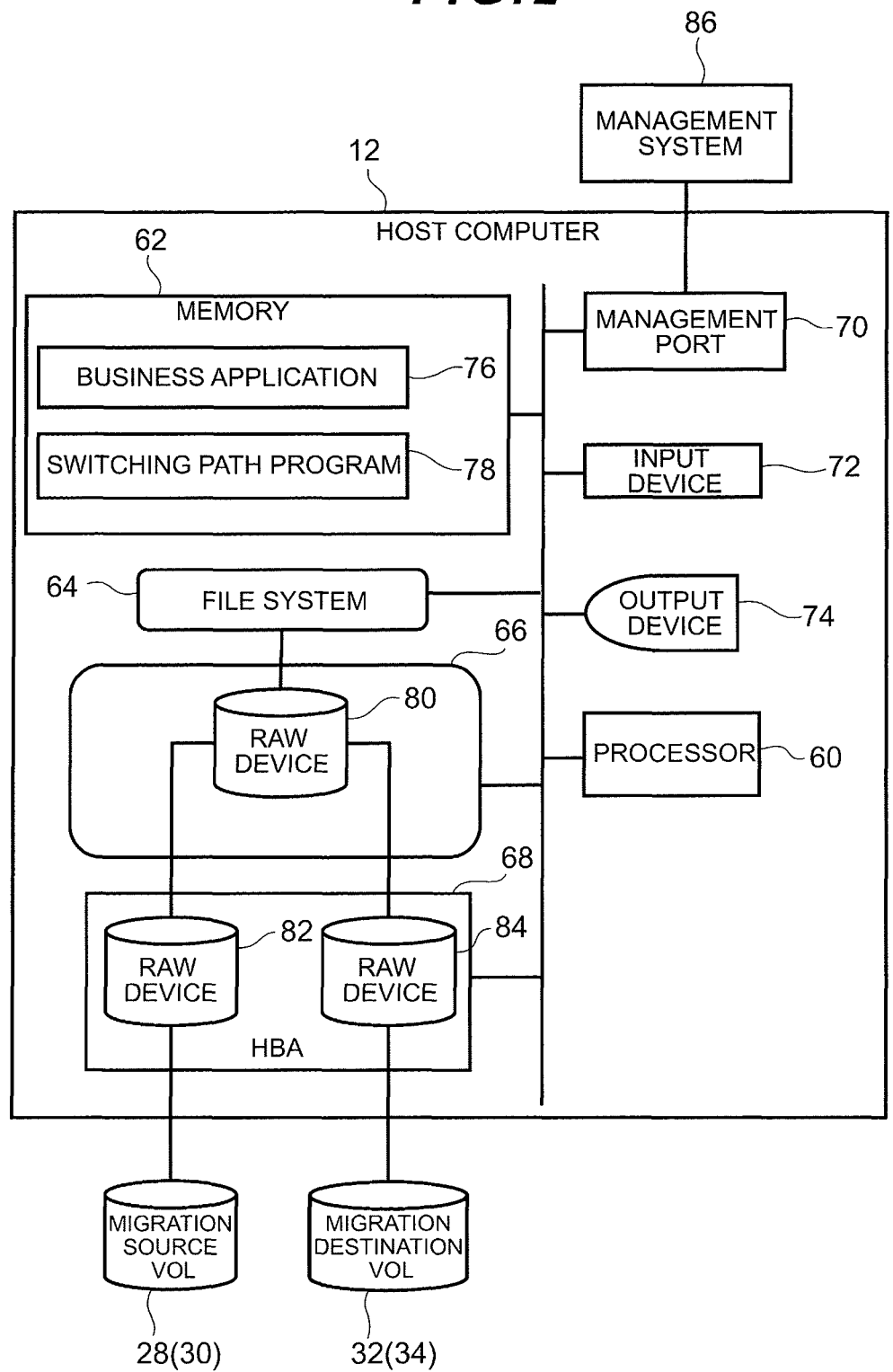
FIG. 2 is a block configuration diagram explaining the configuration of a host computer.

The host computer 12 is a computer device equipped with, for example, a processor 60, a memory 62, a file system 64, a switching path execution unit 66, a host bus adapter (HBA) 68, a management port 70, an input device 72, and an output device 74 as shown in FIG. 2 and is composed of, for example, a personal computer, a workstation, or a mainframe.

The memory 62 stores a business application 76 and a switching path program 78. The switching path execution unit 64 is composed of a raw device 80 and the host bus adapter 66 is composed of raw devices 82, 84 connected to the raw device 80. The raw device 82 is connected to the migration source volume 28 or the migration source volume 30 and the raw device 84 is connected to the migration destination volume 32 or the migration destination volume 34. The management port 68 is connected to the management terminal 86.

The processor 60 has a function supervising and controlling the entire host computer 12 and executes various control processing by executing the business application 76 or the switching path program 78 stored in the memory 62. For example, the processor 60 executes the business application 76, thereby issuing an access request, for example, a read access request or a write access request to the storage apparatuses 14, 16, 18.

The memory 62 is used to store, for example, programs and is also used as a work memory for the processor 60.

When the file system 66 is accessed, the raw devices 80, 82, 84 are used as devices for reducing overhead by executing I/O (input/output) processing without executing processing for copying data to a page cache (not shown in the drawing) once.

The switching path execution unit 66 has a function recognizing the network path to the migration source volume 28, 30 as the network path to the migration destination volume 30, 34 when the identifier of each migration destination volume 32, 34 is changed to the identifier of the migration source volume 28, 30 by means of the SCSI inquiry ID change function of the migration destination storage apparatus 18.

The host bus adapter 68 performs protocol control when communicating with the storage apparatuses 14, 16, 18. As the host bus adapter 68 executes a protocol control function, data and commands are sent and received between the host computer 12 and each storage apparatus 14, 16, 18 according to, for example, Fibre Channel protocol.

The management port 70 functions as an interface for sending/receiving information to/from the management terminal 86 and the host computer 12.

The input device 72 is constituted from, for example, a keyboard, a switch, a pointing device, and a microphone. The output device 74 is constituted from, for example, a monitor display and a speaker.

Figure 3:
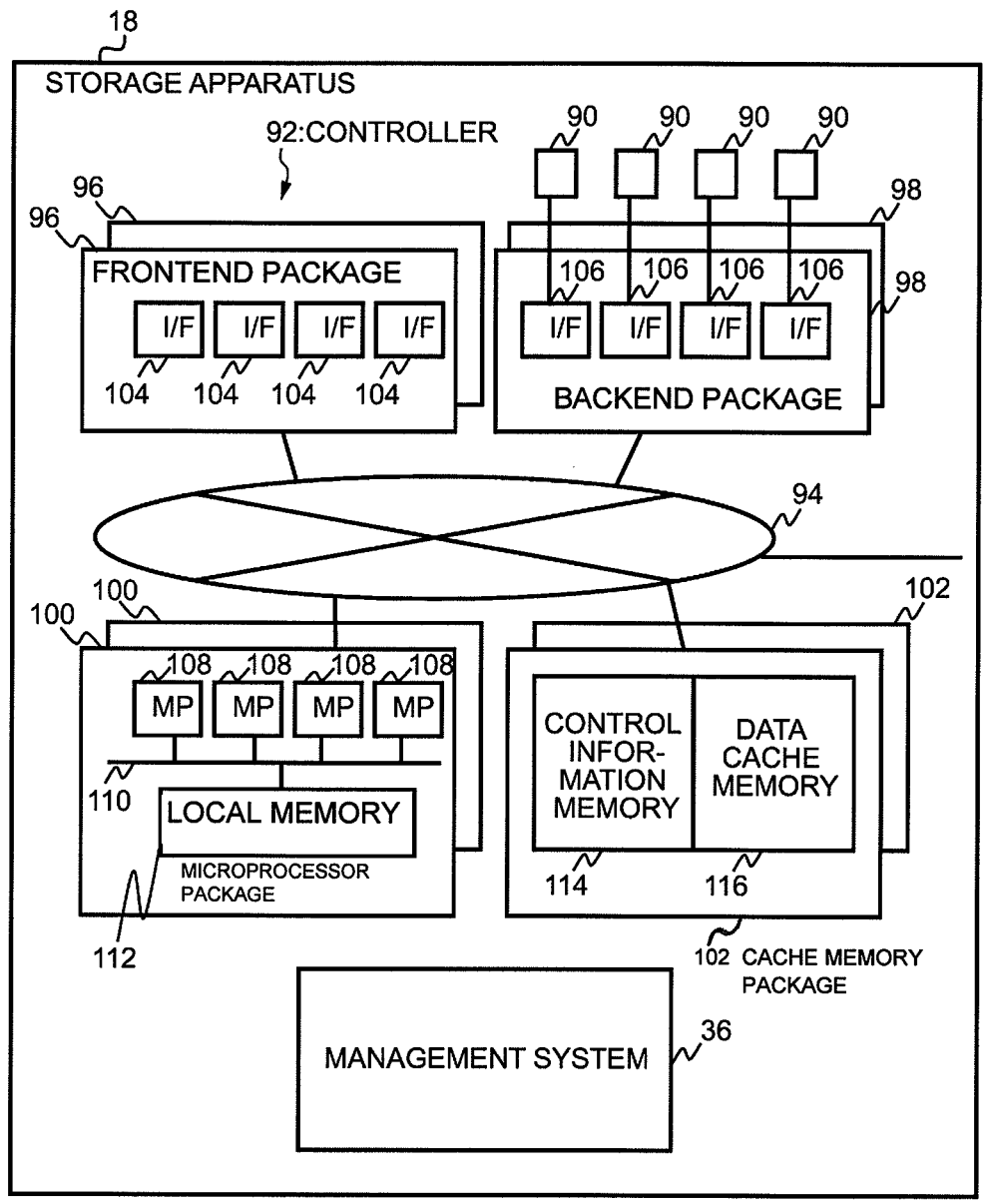
FIG. 3 is a block configuration diagram explaining the configuration of a storage apparatus.

The storage apparatus 18 includes a plurality of storage devices 90 and a controller 92 for controlling data input to, and/or output from, each storage device 90 as shown in FIG. 3.

Each storage device 90 is composed of, for example, a plurality of HDDs (Hard Disk Drives) as storage devices. One or more storage devices 90 constitute one parity group and one or more logical volumes, for example, volumes 32, 34, are defined in storage areas provided by one or more parity groups. Data from the host computer 12 is stored in blocks or files of specified size in any of the logical volumes. Incidentally, a unique logical device number is assigned to each logical volume.

The controller 92 is constituted from one or more frontend packages 96, one or more backend packages 98, one or more microprocessor packages 100, and one or more cache memory packages 102, which are connected to each other via an internal network 94, and the management system 36.

The frontend package 96 includes a plurality of host interfaces 104. Each host interface 104 functions as an interface when communicating with the host computer 12; and includes one or more ports (not shown in the drawing). Each port is assigned a unique address such as an IP (Internet Protocol) address or a WWN (World Wide Name).

The backend package 98 includes a plurality of disk interfaces 106. Each disk interface 106 functions as an interface when communicating with each storage device 90 and is connected to the storage device 90 via a communication cable such as a Fibre Channel cable.

The microprocessor package 100 includes a plurality of microprocessors (MP) 108 and a local memory (LM) 112 connected to each microprocessor 108 via a bus 110. The microprocessor 108 has a function supervising and controlling the entire storage apparatus 18 and executes various processing based on a microprogram stored in the local memory 112. For example, the microprocessor 108 receives a read request or a write request from the host computer 12 via the host interface 104 of the frontend package 96 and reads/writes data from/to the storage devices 90 via a designated disk interface 106 in the backend package 98 based on the received read request or the write request.

The local memory 112 stores, besides the microprogram, part of control information stored in a control information memory 114 for the cache memory package 102 described below.

The cache memory package 102 includes the control information memory 114 and a data cache memory 116, each of which is composed of one or more semiconductor memories such as DRAM (Dynamic Random Access Memories). The control information memory 114 stores configuration information of each storage device 90 and control information necessary for various processing and the data cache memory 116 temporarily stores data which is read from, and/or written to, each storage device 90.

The management system 36 has a resource group management function managing management target resources among resources (including physical resources and logical resources) in the storage apparatus 18 by dividing the management target resources into a plurality of resource groups. Under this circumstance, a role-based access control system is adopted for the management system 36 as a system for controlling access to the administrator 26 in order to employ a multitenancy-type management method.

Furthermore, the controller 92 for the storage apparatus 18 is equipped with a volume virtualization function and an external connection function.

The volume virtualization function is a function providing virtual volumes to the host computer 12 and dynamically allocating physical storage areas to the virtual volumes according to the usage of the virtual volumes.

Under this circumstance, the storage apparatus 18 manages predetermined one or more volumes as one pool volume; and if a write request is issued from the host computer 12 to a virtual storage area, to which any physical storage area has not been allocated yet, from among the virtual volumes, a physical storage area of a specified unit is allocated from a pool volume associated with the relevant virtual volume to the virtual storage area to which the write request was given. As a result, data to be read from, or written to, the virtual storage area in the virtual volume will be read from, or written to, the physical storage area thereafter.

The external connection function is a function providing the host computer 12 with the volume 28 in the external storage apparatus, for example, the storage apparatus 14, connected to a specified host interface 104 in the frontend package 96 as if it were the volume 32 in its own storage apparatus 18. For example, the storage apparatus 18 manages the volume 28 in the storage apparatus 14 as an external volume and provides the virtual volume 46 associated with the external volume 28 to the host computer 12.

Under this circumstance, if a read request or a write request is given by the host computer 12 to a virtual volume, the microprocessor 108 generates a read request or a write request by rewriting a read location of the read request or a write location of the write request as an address in the external volume 28 and sends the generated read request or write request to the storage apparatus 14. After receiving a response (response command and read data) to the read request or the write request from the storage apparatus 14, the microprocessor 108 transfers the received response command and read data to the host computer 12.

Figure 4:
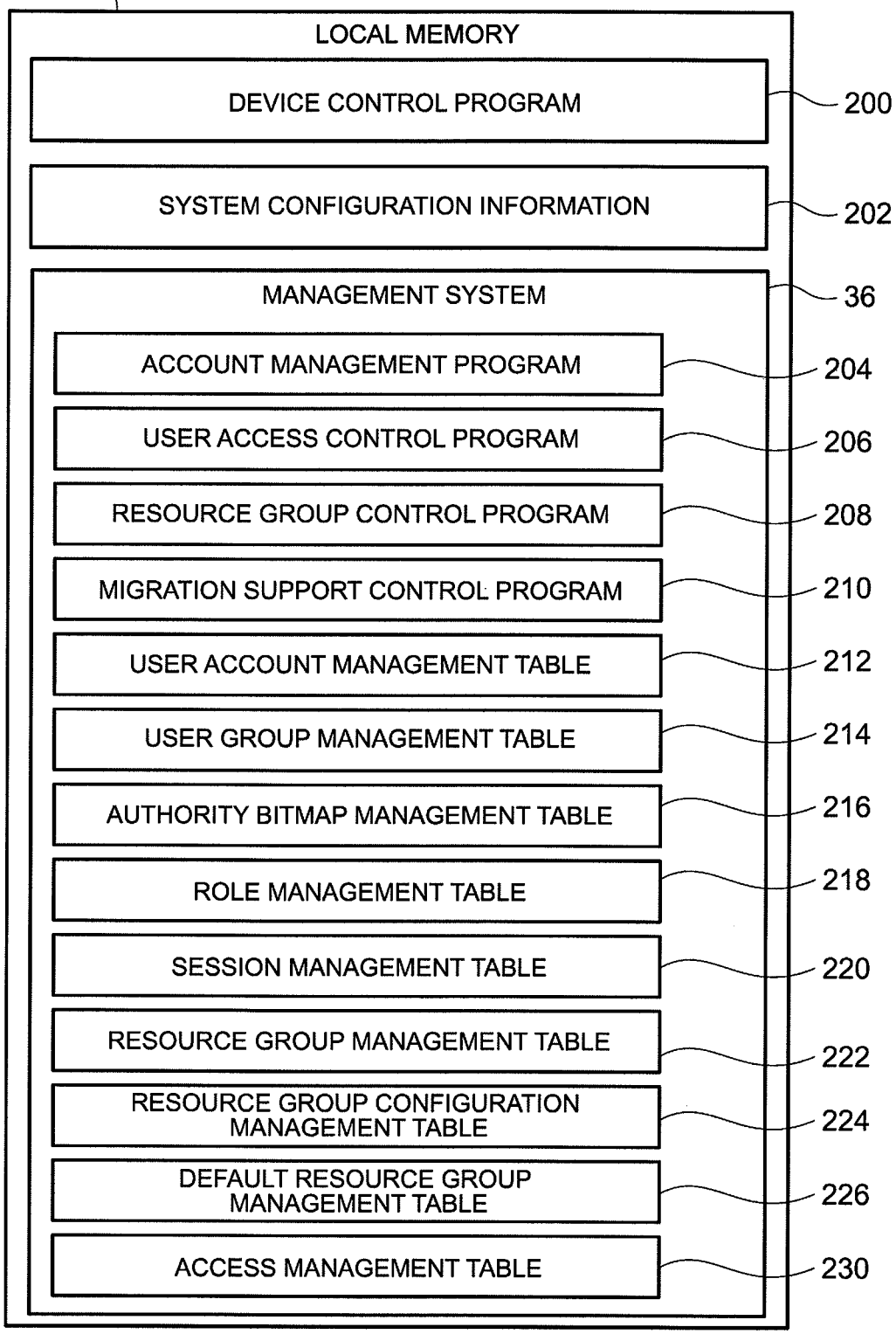
FIG. 4 is a configuration diagram explaining the configuration of a local memory.

The local memory 112 stores a device control program 200 for controlling various devices in the storage apparatus 18 and system configuration information 202 indicating information about the system configuration of the entire storage apparatus 18 as well as the management system 36 including information about various programs and tables as shown in FIG. 4.

The management system 36 includes an account management program 204, a user access control program 206, a resource group control program 208, a migration support control program 210, a user account management table 212, a user group management table 214, an authority bitmap management table 216, a role management table 218, a session management table 220, a resource group management table 222, a resource group configuration management table 224, a default resource group management table 226, and an access management table 230. Incidentally, the configuration of the access management table 230 will be explained with respect to a third embodiment.

The account management program 204 is a program for managing an account of a user, for example, an administrator. The user access control program 206 is a program for executing processing (authorization processing) for authenticating and approving users, for example, administrators, and controlling resources, which can be accessed by the users, and the operation range. The resource group control program 208 is a program having a function managing management target resources by dividing them into resource groups. The migration support control program 210 is a program for executing user access control information about volumes, to which the online volume migration configuration is set, and their related resources, that is, assignment of roles which are aggregates of resource groups and operation authorities.

Figure 5:
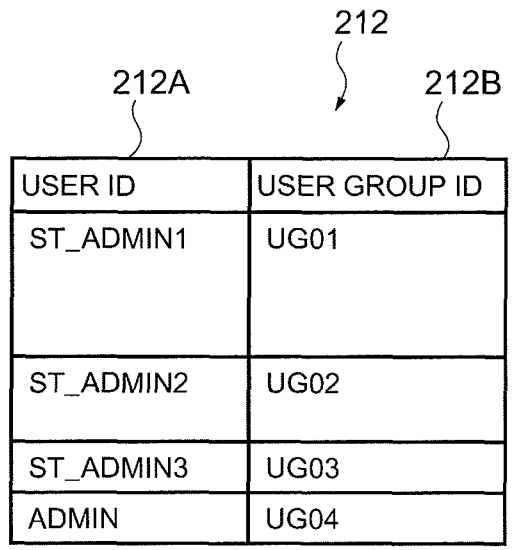
FIG. 5 is a configuration diagram of a user account management table.

The user account management table 212 is a table used to manage user groups UG to which each user, for example, each administrator belongs; and is constructed from a user ID column 212A and a user group (UG) ID column 212B as shown in FIG. 5. The user ID column 212A stores a user ID of each registered user and the user group ID column 212B stores a user group ID of a user group UG to which the relevant user belongs.

For example, in the case of FIG. 5, a user whose ID is ST_ADMIN1 belongs to a user group UG whose ID is UG01.

Incidentally, in this embodiment, the user can belong to a plurality of user groups UG. So, when the user belongs to a plurality of user groups UG, the user group ID column 212B stores a plurality of user group IDs.

Figure 6:
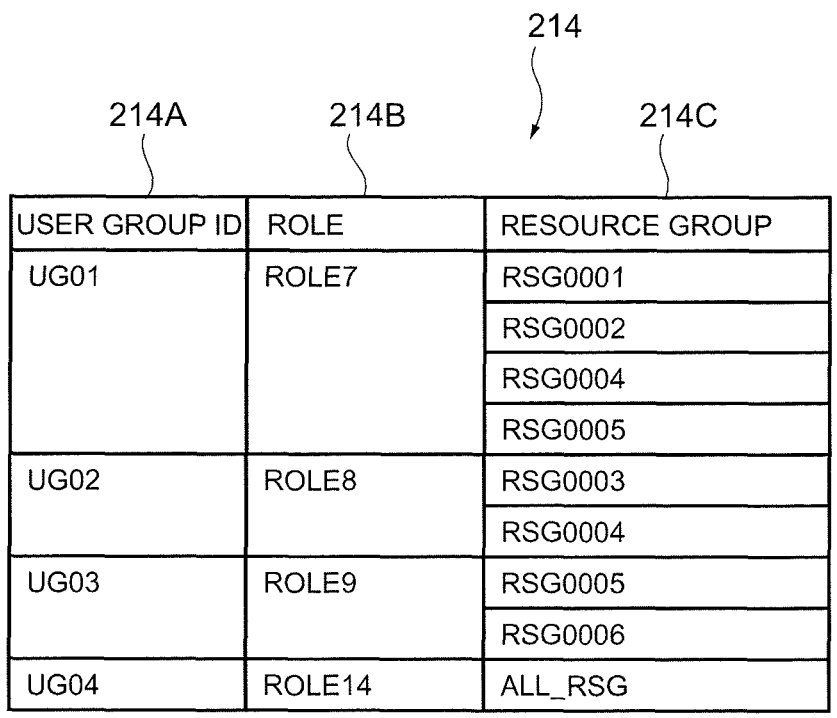
FIG. 6 is a configuration diagram of a user group management table.

The user group management table 214 is a table used to manage each user group UG that is set by a user (administrator) who has the operation authority and is constructed from a user group ID column 214A, a role column 214B, and a resource group column 214C as shown in FIG. 6.

The user group ID column 214A stores, for example, an identifier (user group ID) of each user group UG defined in the storage apparatus 18; and the resource group column 214C stores an identifier (resource group ID) of each resource group (RSG) allocated to the relevant user group UG.

Furthermore, the role column 214B stores an identifier (role ID) of each role assigned to the relevant user group UG. In this case, a plurality of roles can be assigned to a user group UG. If a plurality of roles are assigned to a user group UG, the role column 214B in the user group management table 214 stores the role IDs of all the roles assigned to the relevant user group UG.

Accordingly, in the case of FIG. 6 for example, a role whose ID is ROLE7 and resource groups RSG whose IDs are RSG0001, RSG002, RSG004, and RSG005 are allocated to a user group UG whose ID is UG01.

Referring to FIG. 6, a role whose ID is ROLE14 assigned to a user group UG whose ID is UG04 is the authority including all the authorities defined in FIG. 7 described later.

ALL_RSG allocated to this user group UG includes, for example, all the resource groups RSG defined in the storage apparatus 18. Accordingly, a user belonging to the user group UG whose ID is UGO4 has all the authorities over all the management target resources in the storage apparatus 18.

The authority bitmap management table 216 is a table used to manage predetermined various authorities; and is constructed from a bit address column 216A and an authority column 216B as shown in FIG. 7.

Each bit address column 216A stores a bit address when the bit address of each right-end bit in an authority bitmap of the role management table 218 described later with reference to FIG. 8 is set to 1; and the authority column 216B stores the authority associated with the bit in the bit address.

Accordingly, FIG. 7 shows that, for example, a bit whose bit address in the authority bitmap is 0 is associated with the authority described as View User Account Information, that is, the authority to be able to view user account information; and a bit whose bit address in the authority bitmap is 9 is associated with the authority described as Setting Host path, that is, the authority to be able to set a host path.

The role management table 218 is a table used to manage the roles which are set in advance; and is constructed from a role ID column 218A, a role name column 218B, and an authority bitmap column 218C as shown in FIG. 8.

The role ID column 218A stores an identifier (role ID) assigned to the relevant role; and the role name column 218B stores the role name of each role defined in advance. The authority bitmap column 218C stores an authority bitmap in which the authority that can be executed by the user having the relevant role is described in a bitmap format (a bitmap in which 1 represents the relevant user has the authority and 0 represents the relevant user does not have the authority).

In this embodiment, the authority bitmap consists of 18 bits. Each bit of the authority bitmap is associated with any of the authorities registered in the authority bitmap management table 216 (FIG. 7) according to each bit address as described above.

Therefore, FIG. 8 shows that, for example, a role whose role ID is ROLE7 and whose name is PROVISIONING is constituted from the authority described as View Resource Group information (bit address 4=1), the authority described as View Elements information to view information of each resource in the corresponding resource group RSG (bit address 6=1), and the authority described as Setting LDEV from PG/External Volume/Pool to create a logical device from a parity group, an external volume, or a pool volume (bit address 7=1).

The session management table 220 is a table used to manage a login session that occurs when the user (administrator) connects their communication terminal device to the management terminal 86 and logs into the storage apparatus 18. This session management table 220 is constructed from a session ID column 220A, a user ID column 220B, a host name/IP address column 220C, a login time column 220D, an authority bitmap ID column 220E, and an allocated resource group ID bitmap column 220F as shown in FIG. 9.

The session ID column 220A stores a unique identifier (session ID) of the login session, which is assigned to the login session; and the user ID column 220B stores an identifier (user ID) of the relevant user (the administrator 26 who made the login) corresponding to the login session.

The host name/IP address column 220C stores identification information (a host name or an IP address of the communication terminal device) of the communication terminal device used by the user (administrator 26) who made the login; and the login time column 220D stores time when the login was made (login time).

Furthermore, the authority bitmap ID column 220E stores an identifier (role ID) of the role assigned to the user group UG to which the relevant user (administrator 26) belongs; and the allocated resource group ID bitmap column 220F stores a bitmap in which 1 is set to a bit corresponding to the resource group ID of the resource group RSG allocated to the relevant user (administrator 26) (hereinafter referred to as the allocated resource group ID bitmap).

Each bit in the allocated resource group ID bitmap column 220F corresponds to any of the resource group names registered in the resource group management table 222 described later.

Specifically speaking, a right-end bit of the allocated resource group ID bitmap column 220F corresponds to the resource group name (RSG0) whose resource group ID is 0000, and a bit adjacent to and immediately left to the right-end bit corresponds to the resource group name (ST1.87222) whose resource group ID is 0001, and a bit adjacent to and immediately left to the above bit corresponds to the resource group name (ST2.11111) whose resource group ID is 0002.

Furthermore, the example in FIG. 9 shows that a login session whose session ID is 0000 corresponds to login that a user (administrator 26) whose ID is ADMIN1 made at 2010/02/23.11:25.55 by using a communication terminal device whose IP address is 10.10.23.22; and the role whose ID is ROLE1 and at least the resource group RSG corresponding to the third bit form the left end of the allocated resource group ID bitmap column 220F are allocated to that user.

Figure 10:
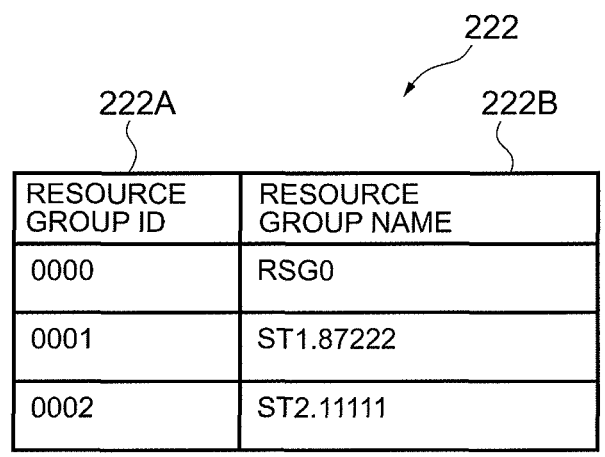
FIG. 10 is a configuration diagram of a resource group management table.

The resource group management table 220 is a table used to manage the resource group ID; and is constructed from a resource group ID column 222A and a resource group name column 222B as shown in FIG. 10.

When a resource group RSG is created, the resource group ID column 222A stores an identifier (resource group ID) for uniquely identifying the created resource group RSG. When the relevant resource group RSG is created, the resource group name column 222B stores information about a name of that resource group RSG.

Accordingly, in an example shown in FIG. 10, the resource group RSG to which 0000 is assigned as the resource group ID is managed as having a name RSG0.

The resource group configuration management table 224 is a table used to manage the configuration of resource groups RSG created in the storage apparatus 18; and is constructed from an ID column 224A, a resource ID column 224B, and a resource group ID column 224C as shown in FIG. 11.

The ID column 224A stores a unique serial number assigned to each management target resource in the storage apparatus 18. The resource ID column 224B stores an identifier (resource ID) that is a serial number for each resource type, which is assigned to the relevant resource; and the resource group ID column 224C stores an identifier (resource group ID) of a resource group RSG to which the relevant resource belongs.

Accordingly, an example in FIG. 11 shows that a resource whose resource ID is LDEV#00000 is assigned a serial number 0x00000 as the resource ID of that resource and belongs to a resource group RSG whose ID is 0000.

Incidentally, referring to FIG. 11, a resource whose resource ID includes a character string LDEV, VDEV, HG, or PORT represents a logical device, virtual device, host group, or port, respectively.

The default resource group management table 226 is a table used to manage the resource groups defined as defaults (hereinafter referred to as the default resource groups) RSG; and is constructed from an ID (default resource group ID) column 226A, a default resource group name column 226B, a resource group ID column 226C, and an authority bitmap column 226D as shown in FIG. 12.

The ID column 226A stores an identifier (hereinafter referred to as the default resource group ID) assigned to the relevant default resource group RSG; and the default resource group name column 226B stores a resource group name assigned to the relevant default resource group RSG. The resource group ID column 226C stores a resource group ID of the relevant default resource group RSG.

Furthermore, the authority bitmap column 226D stores an authority bitmap in which a bit representing the authority necessary to operate (for example, create, change, or delete) the relevant default resource group RSG is set to 1. Each bit of this authority bitmap corresponds to any of the authorities registered in the authority bitmap management table 216 described with reference to FIG. 7 according to its bit address.

For example, a bit whose bit address is 0 (right-end bit) corresponds to the authority described as View User Account Information; a bit whose bit address is 1 (second bit from the right end) corresponds to the authority described as Setting User Account Information; and a bit whose bit address is 17 (left-end bit) corresponds to the authority described as Setting Port Attribute.

Accordingly, FIG. 12 shows that eight default resource groups RSG whose default resource group IDs are D1 to D8 and whose default RSG names are TARGET PORTs, HOST VISIBLE LDEV NUMBERS, SOURCE LDEV NUMBERS, INITIATOR PORTs, RCU TARGET PORTs, EXTERNAL PORTS, PARITY GROUPs, and EXTERNAL VOLUMEs are defined as defaults in the storage apparatus 18. FIG. 12 also shows that, for example, the authority described as Setting Host Path to set a host path is required in order to operate the default resource group RSG called TARGET PORTs.

Incidentally, if a plurality of bits in the authority bitmap are set to 1 and the owner has one authority from among the authorities corresponding to each bit which is set to 1, the relevant default resource group RSG can be operated. So, FIG. 12 shows that, for example, in order to operate the default resource group RSG (whose resource group ID is RSG0003) whose default RSG name is SOURCE LDEV NUMBERS and which is an aggregate of logical devices constituting a pool, any of the following authorities are required: the authority called View Resource Group information corresponding to the fifth bit from the right end of the authority bitmap; the authority called View Elements Information corresponding to the seventh bit from the right end of the authority bitmap; and the authority called Setting LDEV from PG/External Volume/Pool corresponding to the eighth bit from the right end of the authority bitmap.

(Login Processing)

Figure 13:
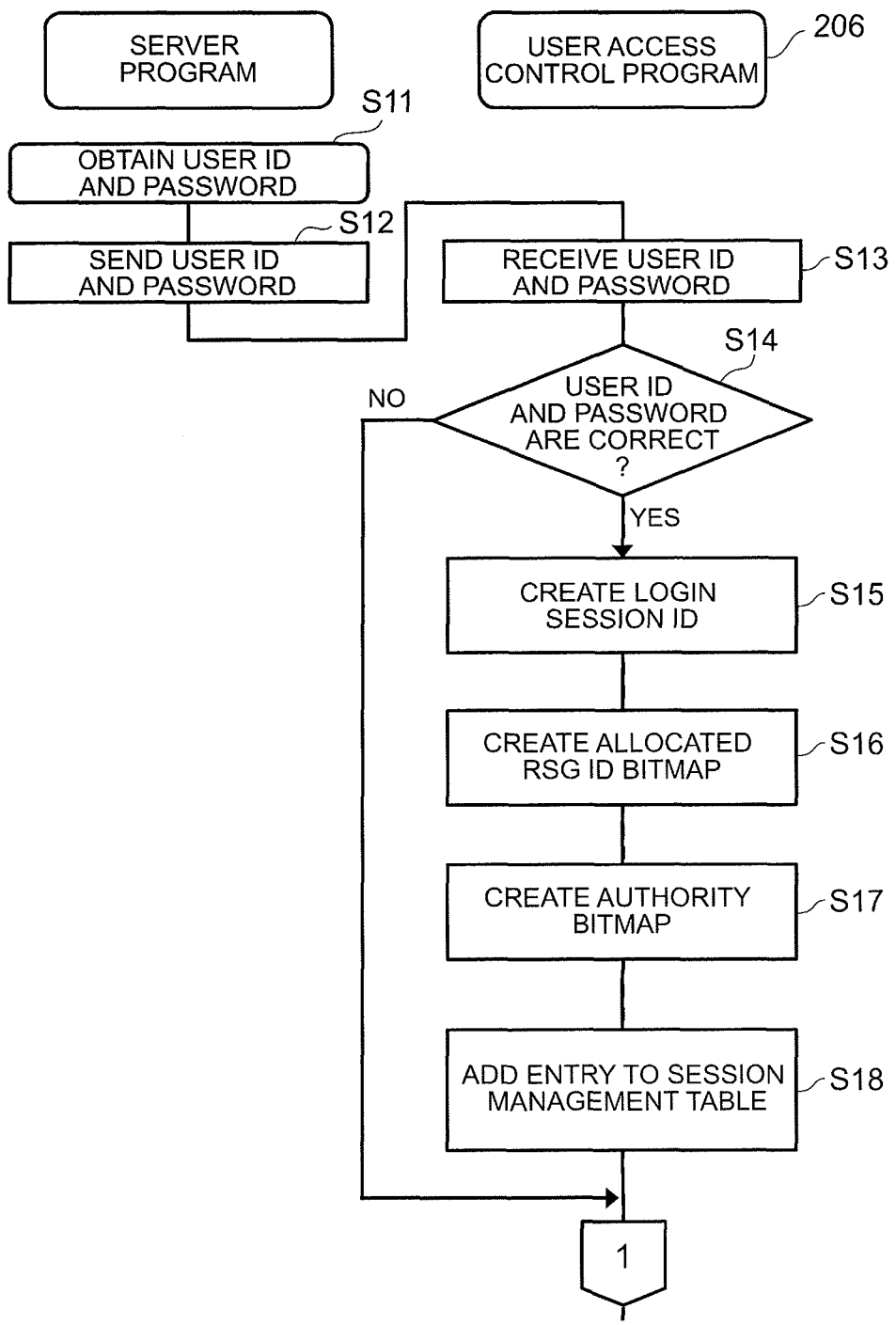
FIG. 13 is a flowchart explaining login processing.
Figure 14:
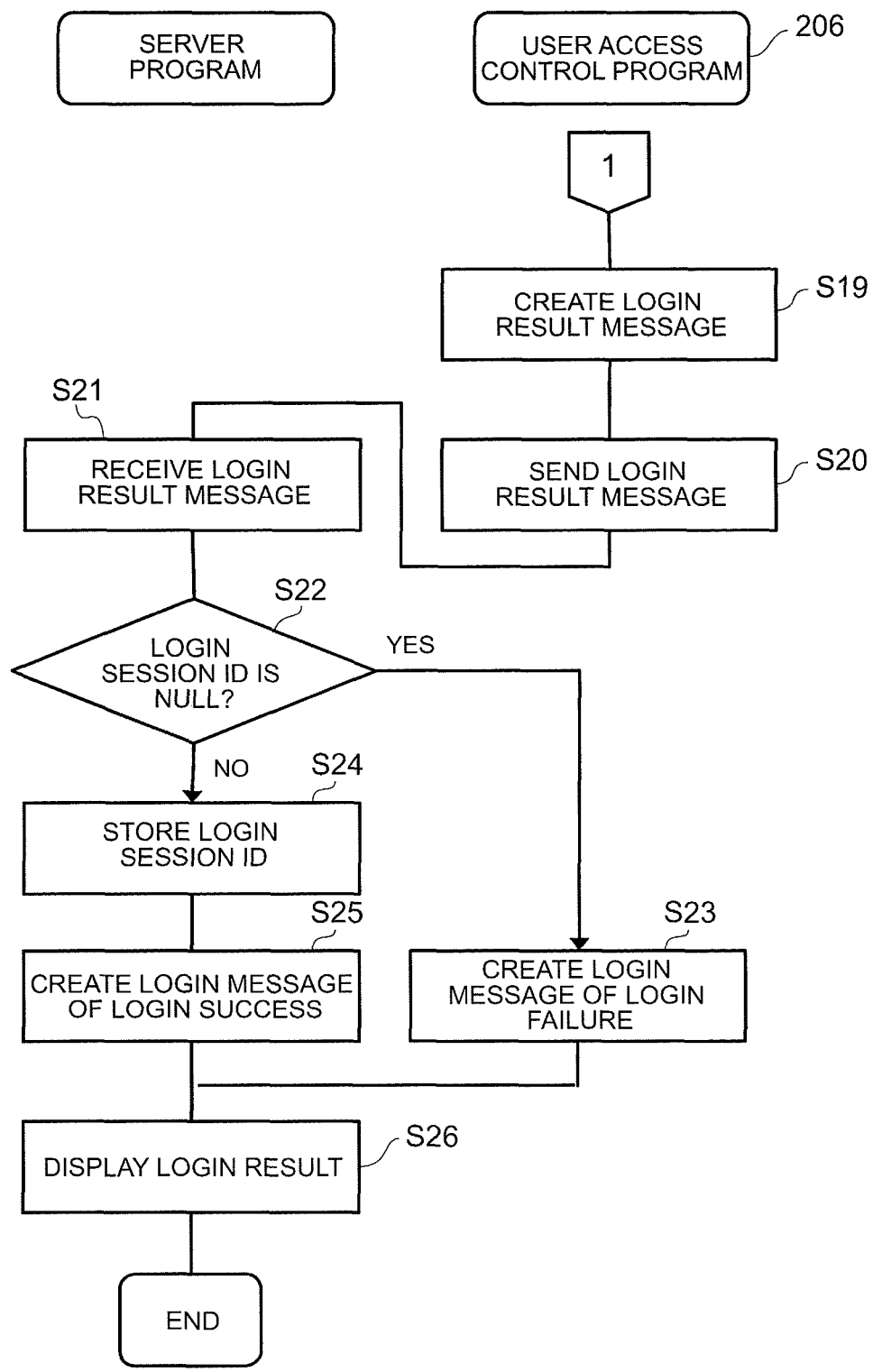
FIG. 14 is a flowchart explaining the login processing.

Next, login processing according to this embodiment will be explained with reference to flowcharts in FIG. 13 and FIG. 14.

After starting operation of the storage apparatus 18, this processing is executed by a server program (not shown in the drawing) of the management terminal 86 and the user access control program 206 of the storage apparatus 18 when the administrator 26 operates the communication terminal device connected to the management terminal 86 and logs into the storage apparatus 18.

When the administrator 26 operates the communication terminal device connected to the management terminal 86 and requests login by entering a user ID and password (PWD)

of the administrator 26, the server program starts the login processing. The server program obtains the user ID and password entered by the administrator 26 (S11) and sends the obtained user ID and password to the user access control program 206 (S12).

After receiving the user ID and the password sent from the management terminal 86 (S13), the user access control program 206 compares a combination of a user ID and a password, which are managed in advance for each user, with the combination of the user ID and password received in step S13 and thereby judges whether the combination of the user ID and password received in step S13 is correct or not (S14).

If a negative judgment is returned in step S14, the user access control program 206 proceeds to processing in step S19; and if an affirmative judgment is returned, the user access control program 206 creates a login session ID for that login (S15). Incidentally, in this embodiment, a serial number is assigned as this login session ID. If there is an unused number in already assigned login session IDs, that unused number will be used as a login session ID for new login.

Next, the user access control program 206 searches the user account management table 212 (FIG. 5) for the user group UG, to which the administrator 26 belongs, and also searches the user group management table 214 (FIG. 6) for the resource group RSG allocated to that user group UG, and creates an allocated resource group ID bitmap (see the allocated resource group ID bitmap column 220F in the session management table 220 in FIG. 9) for the administrator 26 based on the above search result (S16).

Subsequently, the user access control program 206 searches the user group management table 214 (FIG. 6) for the role assigned to the user group UG, to which the administrator 26 belongs, refers to the role management table 218 (FIG. 8) based on the above search result, searches for the roles assigned to that user group UG, and creates an authority bitmap based on the search result (S17).

Then, the user access control program 206 adds a new entry (row) to the session management table 220 (FIG. 9) (S18).

Under this circumstance, the user access control program 206 secures a new entry (row) in the session management table 220 and stores, for example, the created login session ID, the received user ID, the IP address of the host computer 12, and login time indicating time when, for example, the user ID was received, in the secured entry.

Furthermore, the user access control program 206 stores the role IDs of all the detected roles in the authority bitmap ID column 220E of the new entry in the session management table 220 and also stores the allocated resource group ID bitmap created in step S16 in the allocated resource ID bitmap column 220F.

Subsequently, the user access control program 206 creates a login result message indicating whether the login was successful or not (S19) and sends the created login result message to the communication terminal device connected to the management terminal 86 (S20), thereby terminating the processing in this routine.

Incidentally, the login result message includes the login session ID; and when the administrator 26 who requested the login was authenticated in the authentication result step S14, that is, when the login was successful, the login session ID created in step S15 is stored as the login session ID in the login result message. On the other hand, if the administrator 26 was not authenticated and the login failed, null is stored as the login session ID.

Meanwhile, when receiving the login result message sent from the user access control program 206 (S21), the server program extracts the login session ID included in the login result message and judges whether the extracted login session ID is null or not (S22).

If an affirmative judgment is returned in step S22, the server program creates a login message of the login failure (S23), has the communication terminal device connected to the management terminal 86 display the created login message (S26), and thereby terminates the processing in this routine.

On the other hand, if a negative judgment is returned in step S22, the server program stores the login session ID extracted from the login result message (S24), creates a login message of the login success (S25), has the communication terminal device connected to the management terminal 86 display the created login message (S26), and then thereby terminates the processing in this routine.

(Access Control Processing)

Figure 15:
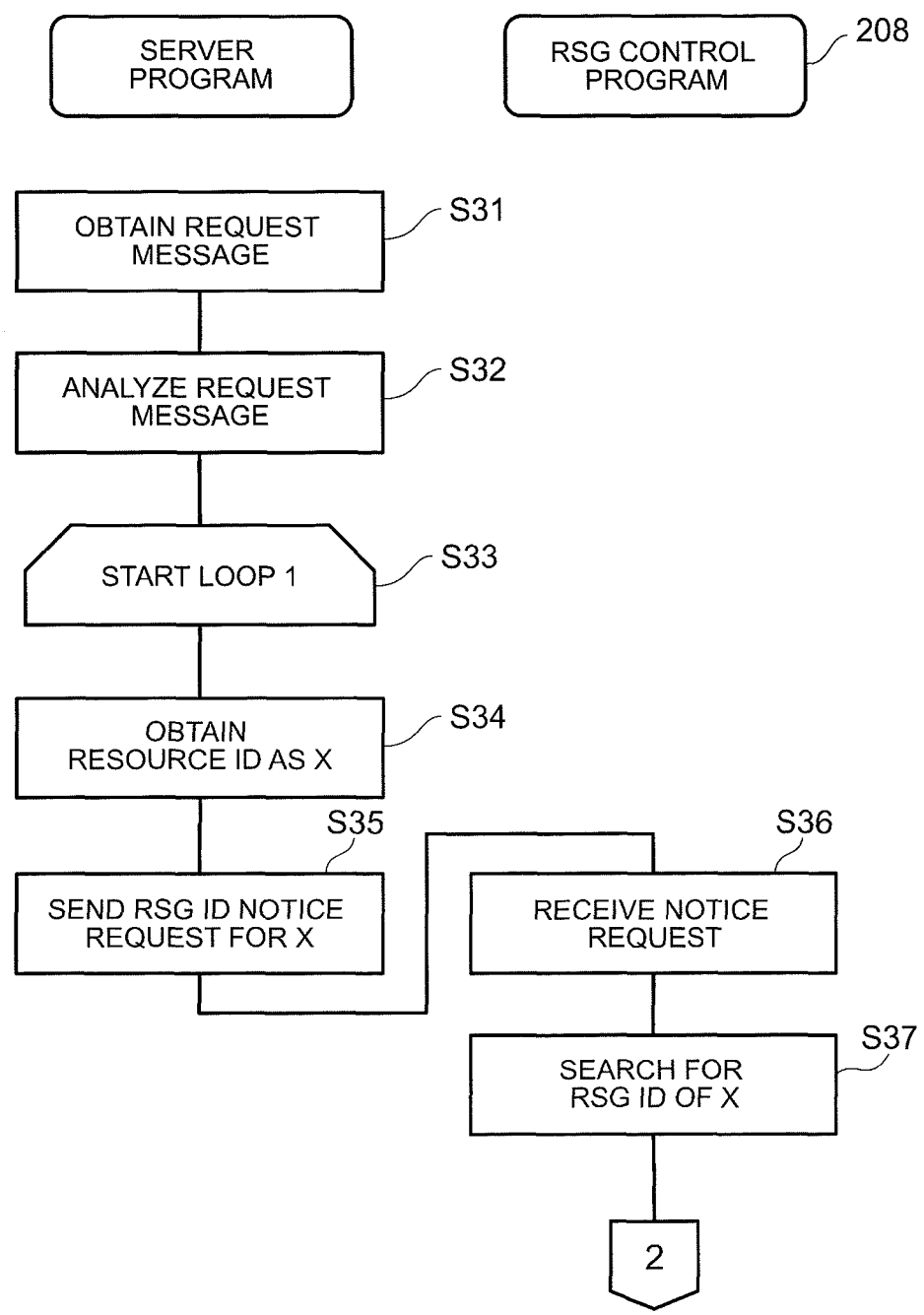
FIG. 15 is a flowchart explaining the login processing.
Figure 16:
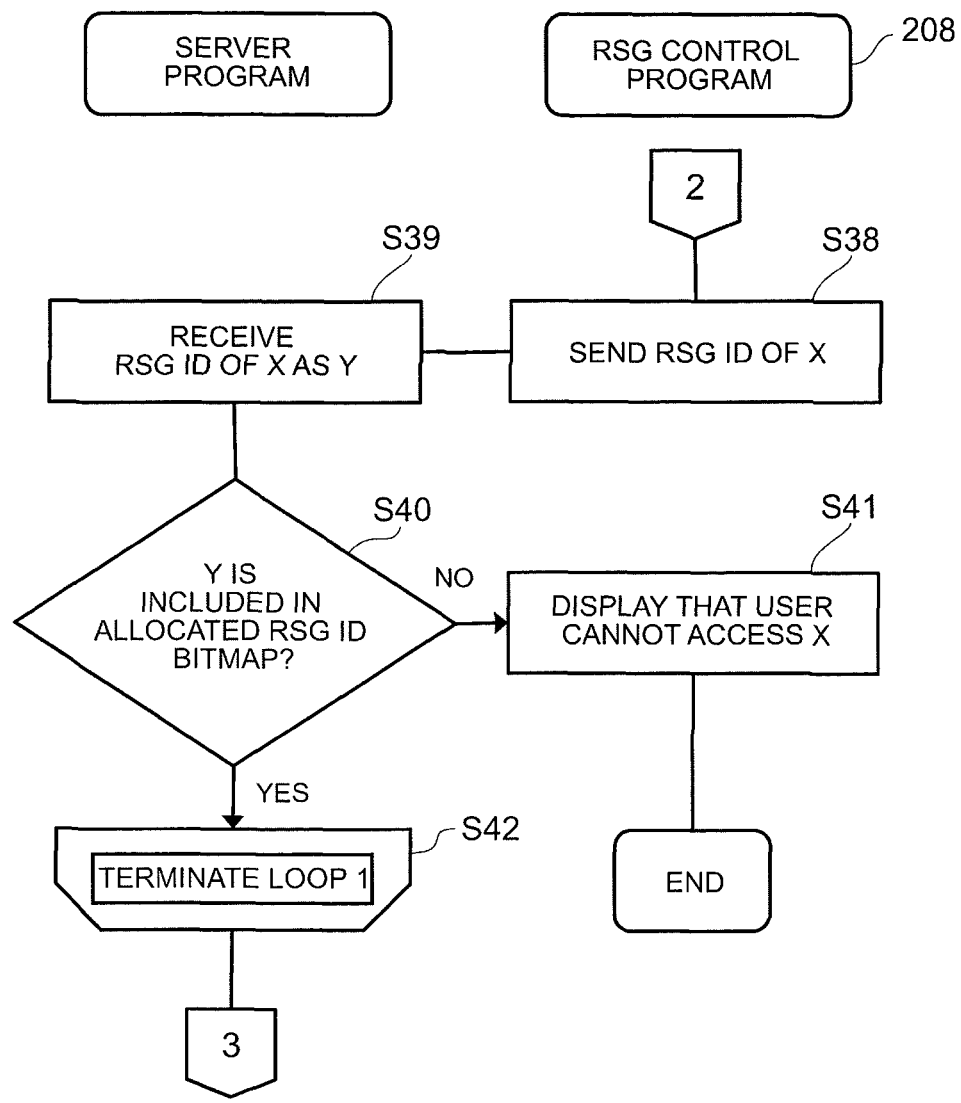
FIG. 16 is a flowchart explaining the login processing.
Figure 17:
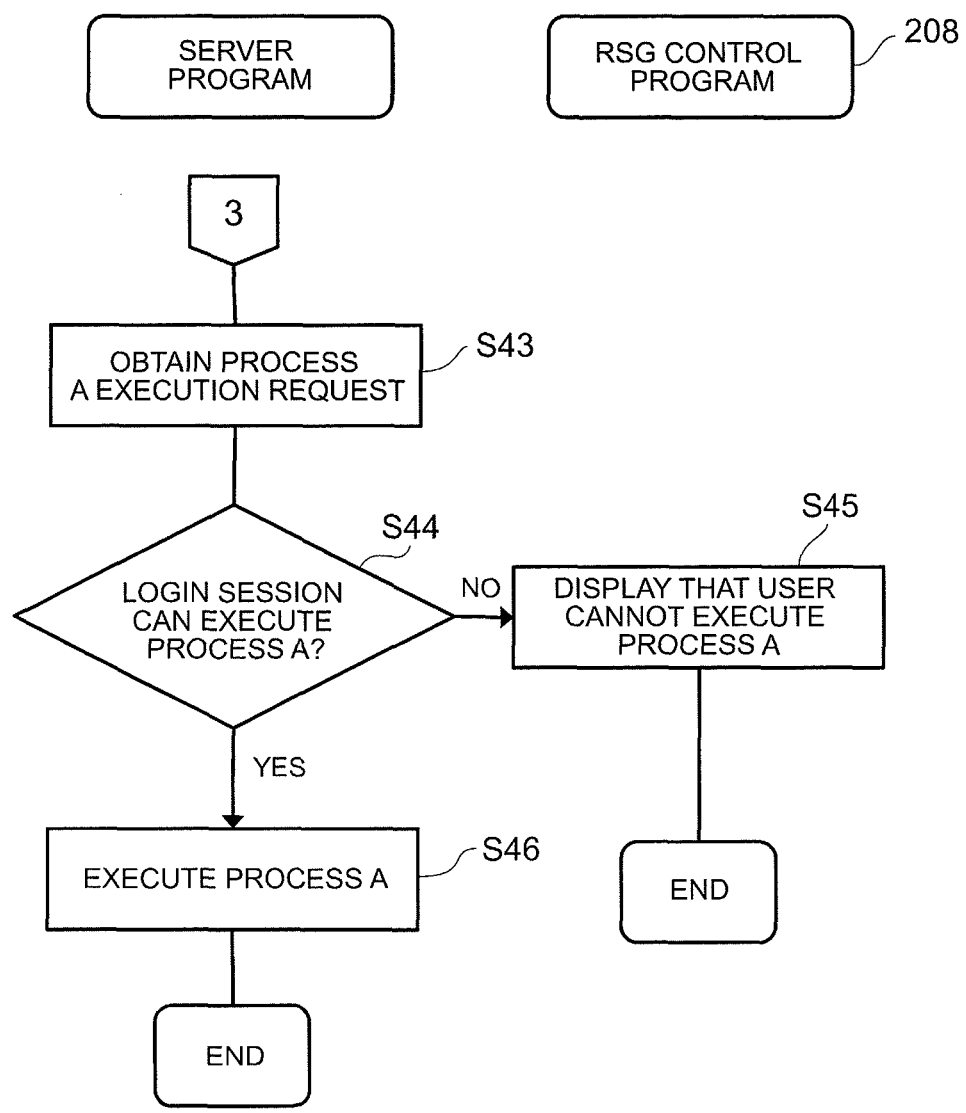
FIG. 17 is a flowchart explaining the login processing.

Next, access control processing will be explained with reference to flowcharts in FIG. 15, FIG. 16, and FIG. 17. This processing is to check whether or not access is made to an object designated by a request message.

Firstly, the server program obtains a request message from the management terminal 86 (S31) and analyzes the obtained request message (S32). For example, the server program extracts operation requested by the administrator 26, analyzes the operation content of the administrator, and judges whether the authority to execute the operation content of the administrator exists or not.

Next, the server program starts processing of loop 1 (S33), extracts a resource included in the request message, obtains the resource ID of the extracted resource as X (S34), and sends a notice request to obtain the resource group ID for the resource whose resource ID is X, to the resource group control program 208 (S35).

After receiving the notice request from the server program (S36), the resource group control program 208 refers to the resource group configuration management table 224, searches for the resource group ID of the resource whose resource ID is X (S37), and sends the resource group ID of the resource, whose resource ID is X, to the server program as the above search result (S38).

Meanwhile, after receiving the resource group ID of the resource, whose resource ID is X, from the resource group control program 208, the server program obtains the received resource group ID as Y (S39), refers to the session management table 220, using Y as the session ID, and judges whether Y is included in the allocated resource group ID bitmap or not (S40).

If a negative judgment is returned in step S40, the server program displays that the user who sent the request message cannot access the resource X (S41), thereby terminating the processing in this routine.

If an affirmative judgment is returned in step S40, the server program recognizes that the user has the access authority, and terminates the processing of loop 1 (S42). The server program then refers to the request message, obtains a process A execution request (S43) and judges, based on the obtained execution request, whether or not the user, for example, the login session request message sender, is a user who can execute process A designated by the request message (S44).

If a negative judgment is returned in step S44, the server program displays that the user cannot execute the processing of process A (S45), thereby terminating the processing in this routine.

On the other hand, if an affirmative judgment is returned in step S44, the server program recognizes the user as a user who can execute the processing of process A, and executes the processing of process A (S46), thereby terminating the processing in this routine.

As the processing of process A, for example, processing for sending the request message to the control program is executed.

(User Group Creation Processing)

Figure 18:
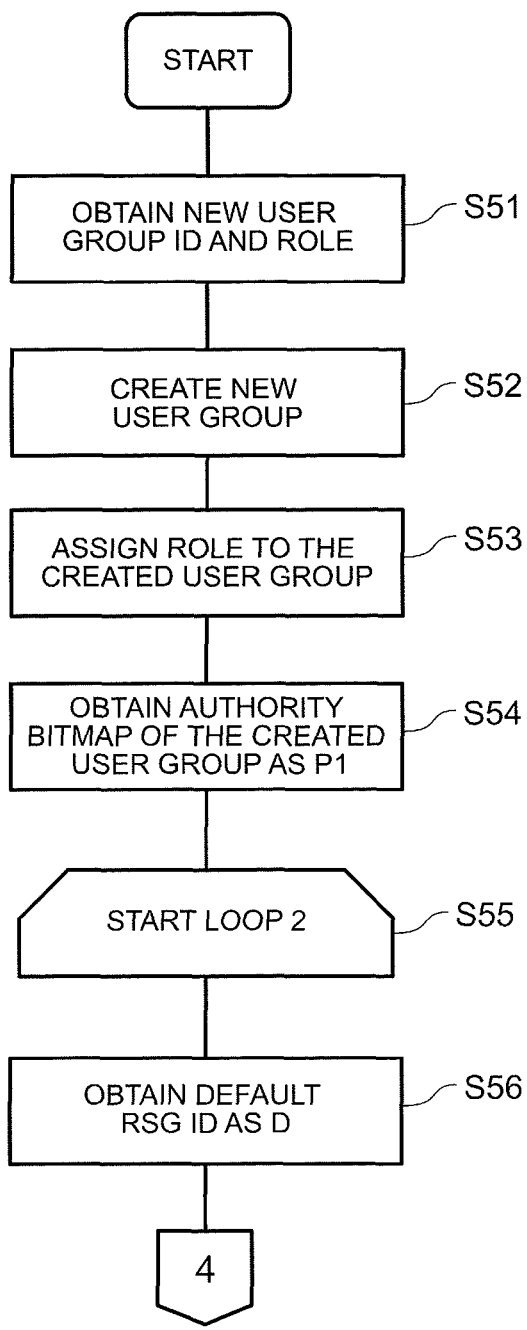
FIG. 18 is a flowchart explaining user group creation processing.
Figure 19:
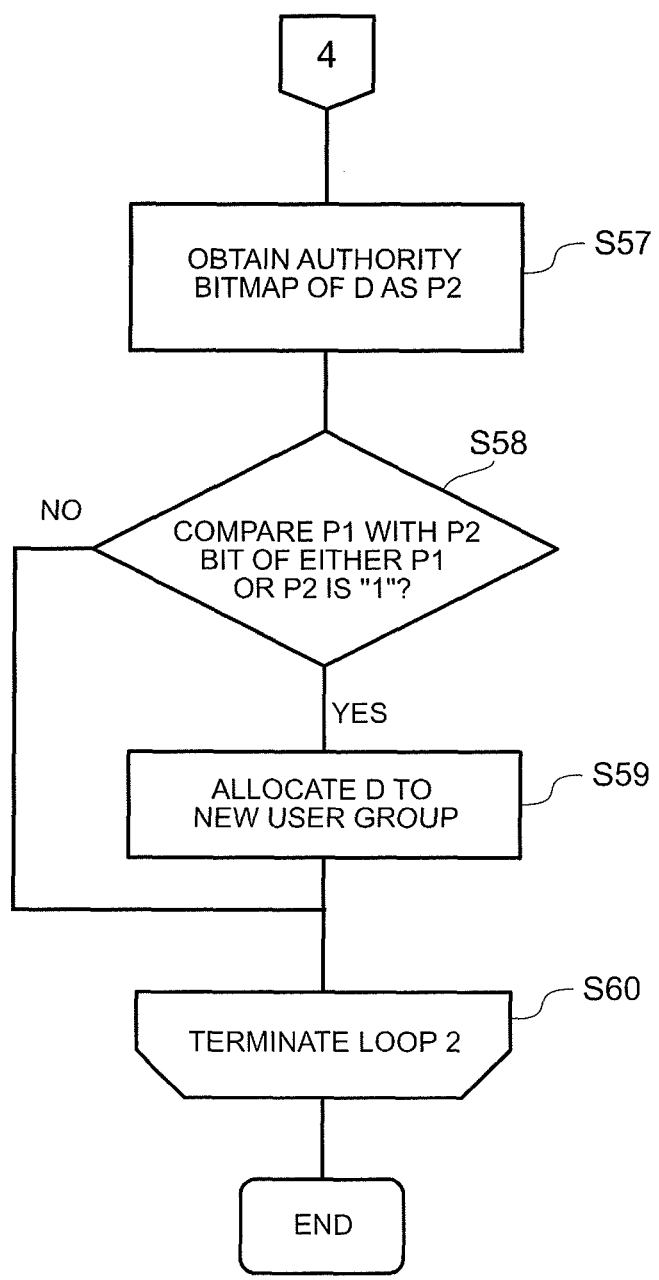
FIG. 19 is a flowchart explaining the user group creation processing.

Next, the user group creation processing will be explained with reference to flowcharts in FIG. 18 and FIG. 19.

This processing is executed at the beginning before starting the operation of the storage apparatus 18 or after starting the operation of the storage apparatus 18 when the administrator 26 having the operation authority operates the communication terminal device connected to the management terminal 86 and gives an instruction to create a new user group UG and a user group creation command is given from the server program of the management terminal 86 to the account management program 204 of the storage apparatus 18 in accordance with the above instruction.

Firstly, when the administrator 206 having the operation authority operates the communication terminal device connected to the management terminal 86 and designates a group name (user group ID) of the new user group UG and roles to be assigned to the user group UG, the account management program 204 obtains the designated group name of the user group UG and the roles to be assigned to that user group UG (S51).

Under this circumstance, the account management program 204 adds a new entry (row) to the user group management table 214 and stores a new user group ID that is specific to the new user group UG in the added entry.

Next, the account management program 204 assigns a plurality of roles to the new user group UG created in step S52 (S53).

For example, the account management program 204 stores, for example, the role IDs of the roles designated by the administrator 26 in the newly added entry of the user group management table 214.

Next, the account management program 204 obtains an authority bitmap as P1 for the newly created user group UG (S54). For example, the account management program 204 obtains an authority bitmap P1 of the roles assigned to the user group UG from the role management table 218.

Next, the account management program 204 starts processing of loop 2 (S55), selects one default resource group, obtains the default resource group ID of the selected default resource group as D (S56), refers to the default resource group management table 226 based on the obtained D (default resource group ID), and obtains an authority bitmap P2 of the selected default resource group D (S57).

Subsequently, the account management program 204 compares the authority bitmap P1 obtained in step S54 with the authority bitmap P2 obtained in step S57 and judges whether any of the authority bits is 1 or not (S58).

If a negative judgment is returned in step S58, the account management program 204 proceeds to processing in step S60 and terminates the processing of loop 2, thereby terminating the processing in this routine.

On the other hand, if an affirmative judgment is returned in step S58, the account management program 204 assigns D obtained in step S57 to the new user group UG and executes the processing of loop 2 on all the default resource groups; and if the processing on all the default resource groups terminates, the account management program 204 terminates the processing of loop 2 (S60), thereby terminating the processing in this routine.

Incidentally, if a plurality of bits which are set to 1 exist in the authority bitmap P2 and if at least one of the bits in the authority bitmap P1 corresponding to the above-mentioned bits is set to 1, the account management program 204 obtains an affirmative judgment result in step S58.

If the above-described processing is executed, all the default resource groups RSG which can be operated by the roles assigned to that user group UG (all the default resource groups RSG which can be operated within the range of the operation authorities assigned to the user group UG) will be allocated to the new user group UG.

(Volume Migration Support Processing)

Next, volume migration support processing will be explained with reference to a flowchart in FIG. 20.

This processing is started by the migration support control program 210 when a request from the administrator 26 is made or some kind of setting operation is performed on the storage apparatus 18, on condition that the online volume migration processing is executed.

Firstly, the migration support control program 210 refers to the control information stored in the local memory 112, obtains an LDEV list existing in the storage apparatus 18 as an array LDEV[ ], and sets the number of LDEVs to N (S71).

Next, the migration support control program 210 starts processing of loop 3 sequentially from the top to the Nth of the array LDEV (S72), and judges whether the SCSI inquiry ID which is the identifier used by the host computer 12 to identify the relevant LDEV is changed or not (S73).

If a negative judgment is returned in step S73, the migration support control program 210 proceeds to step S75 and terminates the processing of loop 3; and if an affirmative judgment is returned in step S73, the migration support control program 210 executes processing for setting a resource group as the processing of process A (S74), and then terminates the processing of loop 3 (S75).

If in step S73, for example, data of the migration source volume 28 shown in FIG. 1 has been migrated to the migration destination volume 32 and data of the migration source volume 30 has been migrated to the migration destination volume 34, it is determined that the ID of the migration destination volume 32 is changed to the ID of the migration source volume 28 and the ID of the migration destination volume 34 is changed to the ID of the migration source volume 30.

If the processing of process A in step S74 is executed, for example, the resource group 38 whose name is a device identifier (for example, a device name and a serial number) of the migration source storage apparatus 14, and the resource group whose name is a device identifier (for example, a device name and a serial number) of the migration source storage apparatus 16 are constructed.

After the termination of the processing of loop 3, the migration support control program 210 executes processing for displaying information about the created resource groups to the administrator 26 (S76) and then terminates the processing in this routine.

(Processing of Process A)

Figure 21:
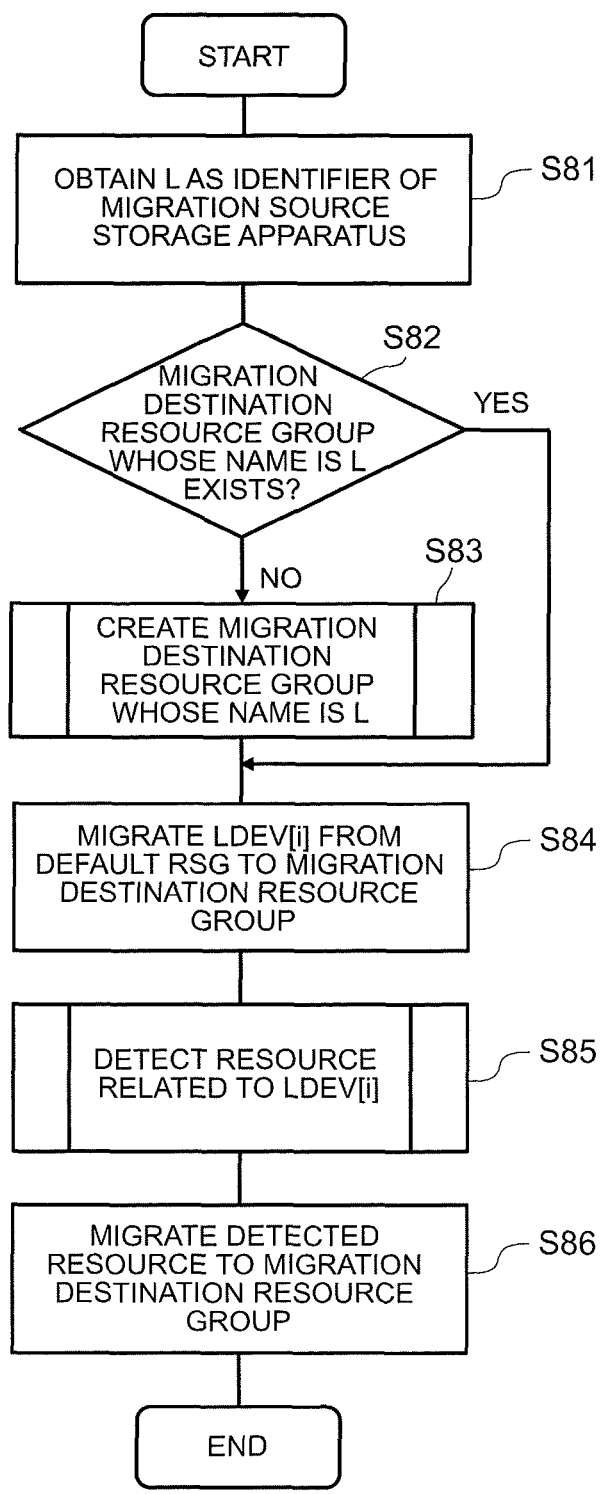
FIG. 21 is a flowchart explaining processing of process A.

Next, the processing of process A will be explained with reference to a flowchart in FIG. 21.

Figure 20:
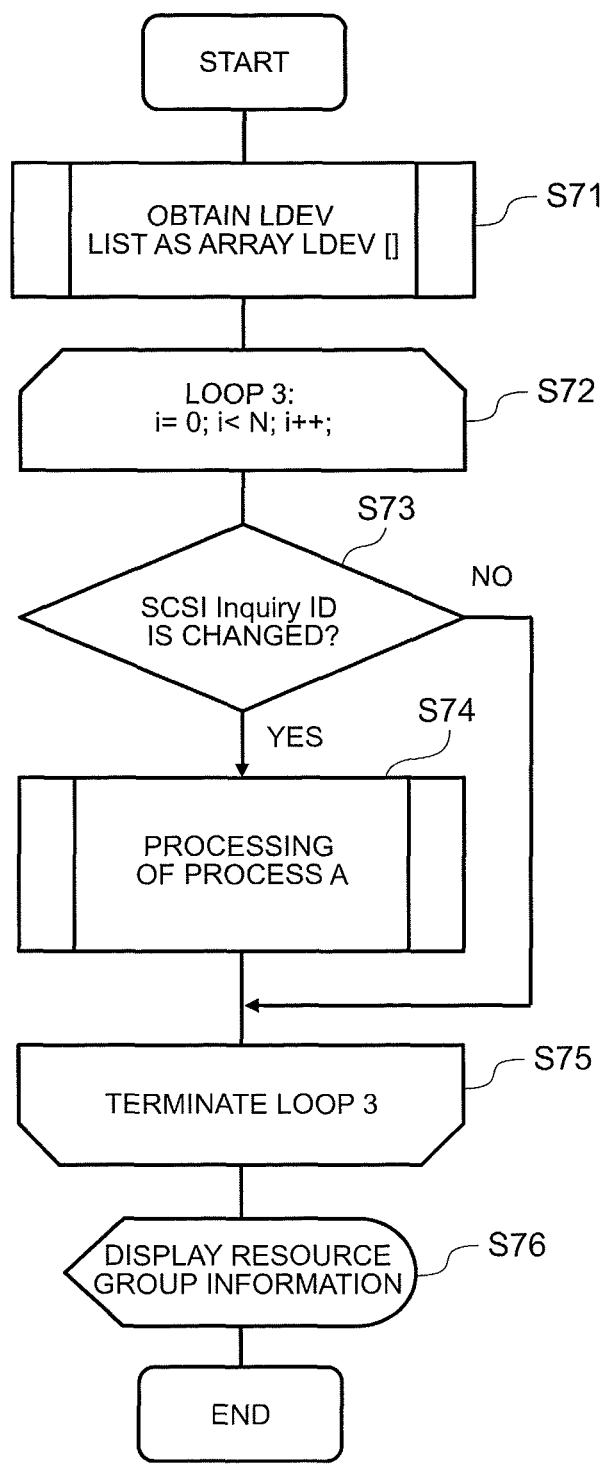
FIG. 20 is a flowchart explaining processing of the first embodiment.

This processing is the specific content of step S74 in FIG. 20.

Firstly, the migration support control program 210 obtains identifier L (for example, a product name and a serial number) of the migration source storage apparatus 14, 16 from the SCSI inquiry ID of LDEV[i] (S81) and judges whether a migration destination resource group whose name is the obtained identifier L exists or not (S82).

If an affirmative judgment is returned in step S82, the migration support control program 210 determines that the migration destination resource group whose name is the already obtained identifier L exists; and proceeds to processing in step S84. If a negative judgment is returned in step S82, the migration support control program 210 creates a migration destination resource group whose name is the identifier L (S83). For example, the resource group 38 shown in FIG. 1 is created as the migration destination resource group with the name L in, for example, the local memory 112.

Next, the migration support control program 210 extracts LDEV[i] from the default resource group and migrates it to the migration destination resource group (S84).

Then, the migration support control program 210 detects a plurality of resources related to LDEV[i] (S85) and migrates the plurality of detected resources to the migration destination resource group (S86), thereby terminating the processing in this routine.

Specifically speaking, if the migration support control program 210 extracts, for example, the migration destination volume 32 shown in FIG. 1 as LDEV[i], it migrates the migration destination volume 32 to the resource group 38; and if the migration support control program 210 detects the port 42, the host group 44, the virtual volume 46, and the parity group 48 as the resources (related resources) related to the migration destination volume 32, it migrates these resources to the resource group 38 and manages each resource, together with the migration destination volume 32, as a resource belonging to the resource group 38. Migration of the migration destination volume 32 and its related resources to the resource group 38 herein means to change the resource group ID of the resource configuration management table 224 to the migration destination resource group ID.

Furthermore, if the migration support control program 210 creates the resource group 40 as a migration destination resource group whose name is identifier C in step S83, it migrates the migration destination volume 34 to the resource group 40; and if the migration support control program 210 detects the port 50, the host group 52, and the parity group 54 as the resources related to the migration destination volume 34, it migrates these resource to the resource group 40 and manages each resource, together with the migration destination volume 34, as a resource belonging to the resource group 40. Migration of the migration destination volume 34 and its related resources to the resource group 40 herein means to change the resource group ID of the resource configuration management table 224 to the migration destination resource group ID.

Subsequently, the migration support control program 210 allocates the resource group 38 to the administrator 22 and allocates the resource group 40 to the administrator 24.

Under this circumstance as the processing result of the migration support control program 210, the controller 92 manages each migration destination volume 32, 34 and each resource belonging to each resource group 38, 40 as operation targets to be allocated individually to each administrator (migration source user) 22, 24 who uses the migration source storage apparatus 14, 16, and as operation targets over which only each administrator 22, 24 has the operation authority.

Consequently, even if the administrator 22 continues a business activity to operate the resource group 38 as business activities at the storage apparatus 18 and the administrator 24 continues a business activity to operate the resource group 40 as business activities at the storage apparatus 18, each administrator 22, 24 cannot operate the resources of other administrators. So, it is possible to prevent the operations by the administrator 22 or the administrator 24 from affecting the businesses of other administrators.

Figure 22:
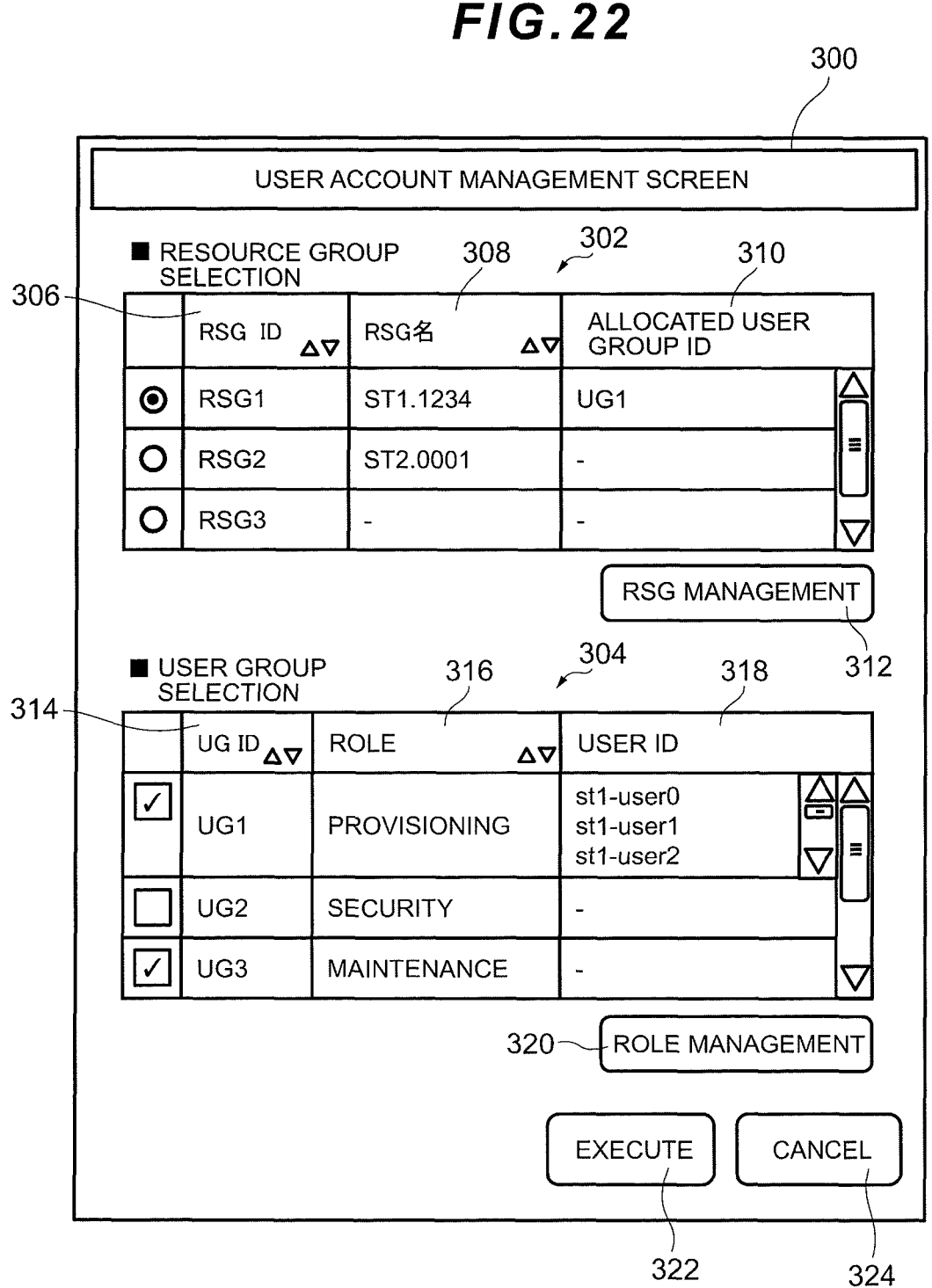
FIG. 22 is a diagram showing a display example of a user account screen.

Next, FIG. 22 shows a display example of a user account management screen.

Referring to FIG. 22, a user account management screen 300 includes a display area for operating resource group selection 302 and a display area for operating user group selection 304.

The display area for operating the resource group selection 302 displays a resource group ID 306, a resource group name 308, and an allocated user group ID 310. Under this circumstance, the administrator can select one resource group to allocate; and when operating an RSG (resource group) management button 312, the details of the selected resource group are displayed on a detailed screen (see FIG. 23).

The display area for operating the user group selection 304 displays a user group ID 314, a role 316, and a user ID 318.

The administrator can select a user group(s) by operating a role management button 320. Under this circumstance, the administrator can select one or more user groups to be allocated to the resource group selected by the RSG (resource group) management button 312. If an execution button 322 is operated, the selected content will be registered; and if a cancellation button 324 is operated, for example, the content selected by the role management button 320 will be canceled. Furthermore, the administrator can rearrange the content displayed in the user ID 318 in alphabetical order by operating an ascending order button 326.

Figure 23:
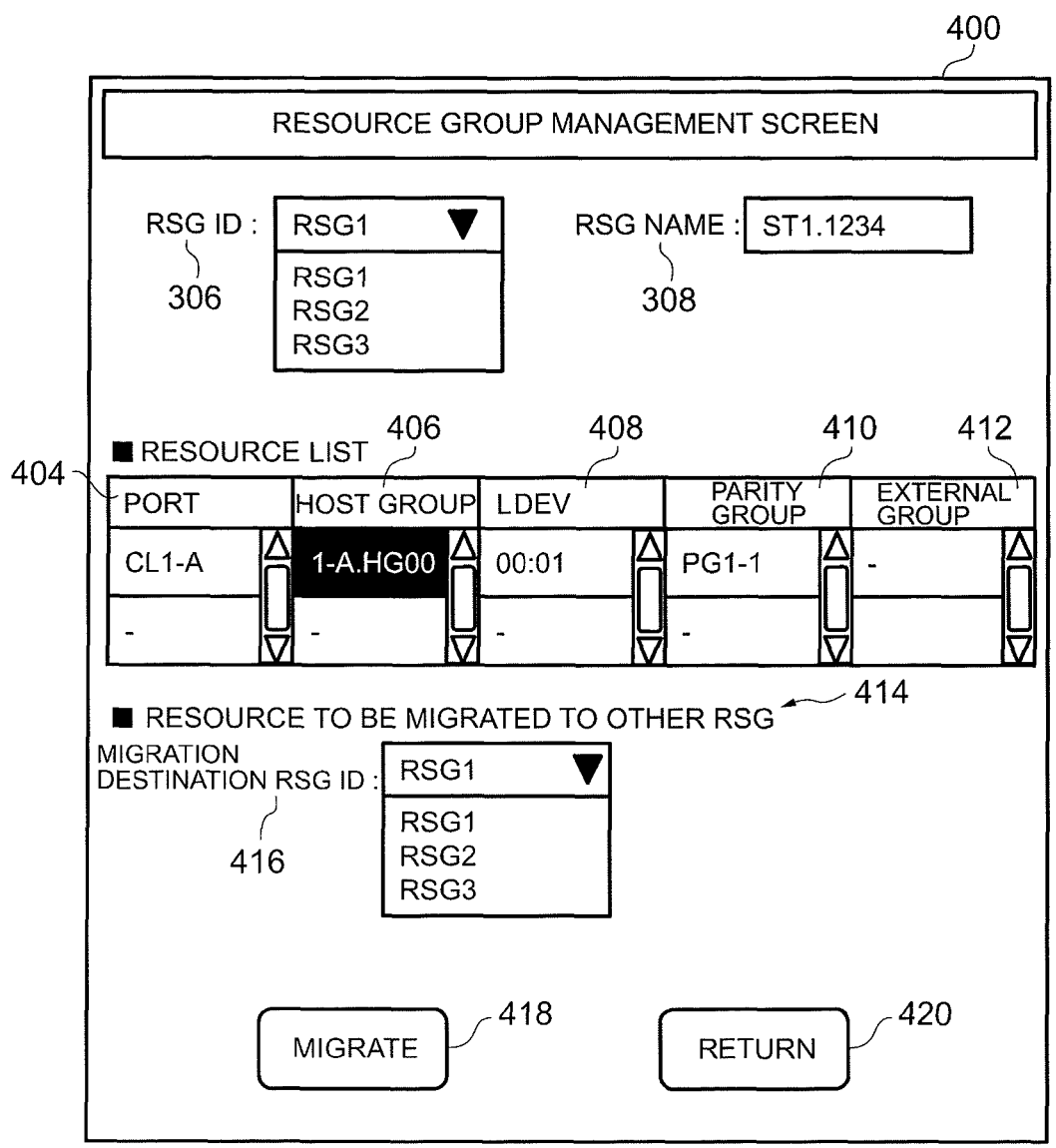
FIG. 23 is a diagram showing a display example of a resource group management screen.

Next, FIG. 23 shows a display example of a resource group management screen.

Referring to FIG. 23, a resource group management screen 400 displays the resource group ID 306 and the resource group name 308 selected by the RSG (resource group) management button 312, and a resource list 402 indicating a list of resources belonging to the displayed resource group ID 306.

The resource list 402 displays a port 404, a host group 406, an LDEV 408, a parity group 410, and an external group 412. These items can be selected arbitrarily.

A resource to be migrated to other resource groups 414 is displayed below the resource list 402. The resource to be migrated to other resource groups 414 displays a migration destination resource group ID 416. In this case, this area displays that a resource selected from the resource list 402, for example, a host group is to be migrated to a resource group selected in the migration destination RSG ID 416, for example, RSG1. This migration is started by operating an execution button 418. Incidentally, if a return button 420 is operated, the screen returns to the user account screen 300.

Figure 24:
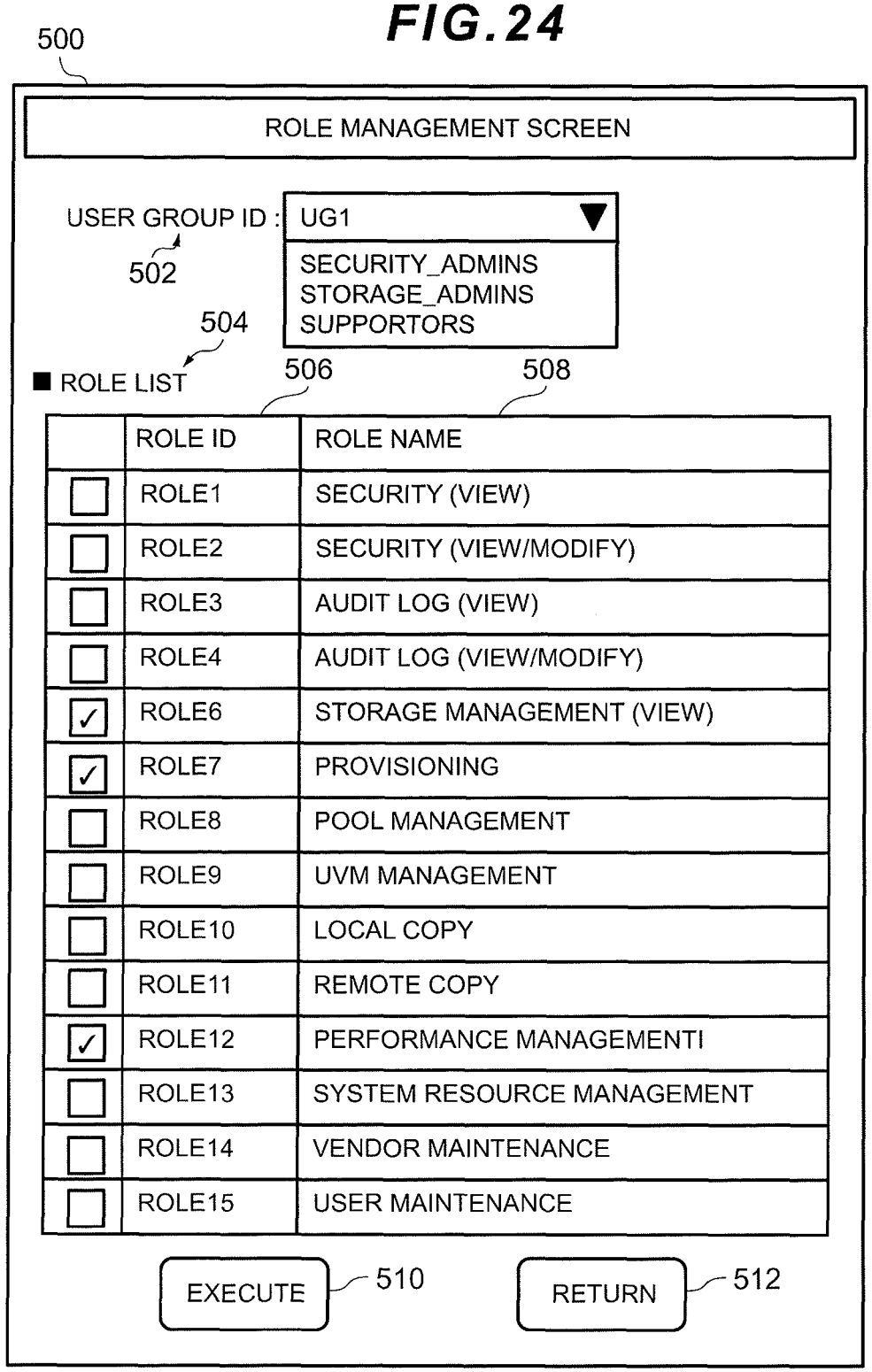
FIG. 24 is a diagram showing a display example of a role management screen.

Next, FIG. 24 shows a display example of a role management screen.

Referring to FIG. 24, a role management screen 500 includes a display area for displaying a user group ID 502 and a display area for displaying a role list 504.

The display area for displaying the user group ID 502 displays the ID of an administrator belonging to a user group, for example, the user group UG1.

The display area for displaying the role list 504 displays a plurality of role IDs 506 and a plurality of role names 508 corresponding to a plurality of selection areas.

Under this circumstance, a role(s) selected by the administrator will be assigned to the user group displayed in the user group ID 502. Incidentally, a selection number is inserted into a selection area of the role list 504 with respect to an already assigned role. The selected role(s) will be assigned to the user group by the administrator by operating an execution button 510. Incidentally, if the administrator operates a return button 512, the previous screen will be displayed.

According to this embodiment, even if the administrator 22 continues the business activity to operate the resource group 38 as business activities at the storage apparatus 18 and the administrator 24 continues the business activity to operate the resource group 40 as business activities at the storage apparatus 18, each administrator 22, 24 cannot operate the resources of other administrators. So, it is possible to prevent the operations by the administrator 22 or the administrator 24 from affecting the businesses of other administrators.

Also, according to this embodiment, the resources migrated from the migration source storage apparatus 14, 16 to the migration destination storage apparatus 18 can be appropriately allocated to the administrator (migration source user) 22, 24 who manages each migration source storage apparatus 14, 16.

Furthermore, since this embodiment is designed to automatically execute the processing for creating each resource group 38, 40 based on the ID of the migration source volume 28, 30 and the processing for distributing the resources belonging to each resource group 38, 40, the resources can be appropriately allocated to the administrators (migration source user) 22, 24 without distribution mistakes and a burden on the distributors (administrators) can be reduced.

(Second Embodiment)

Figure 25:
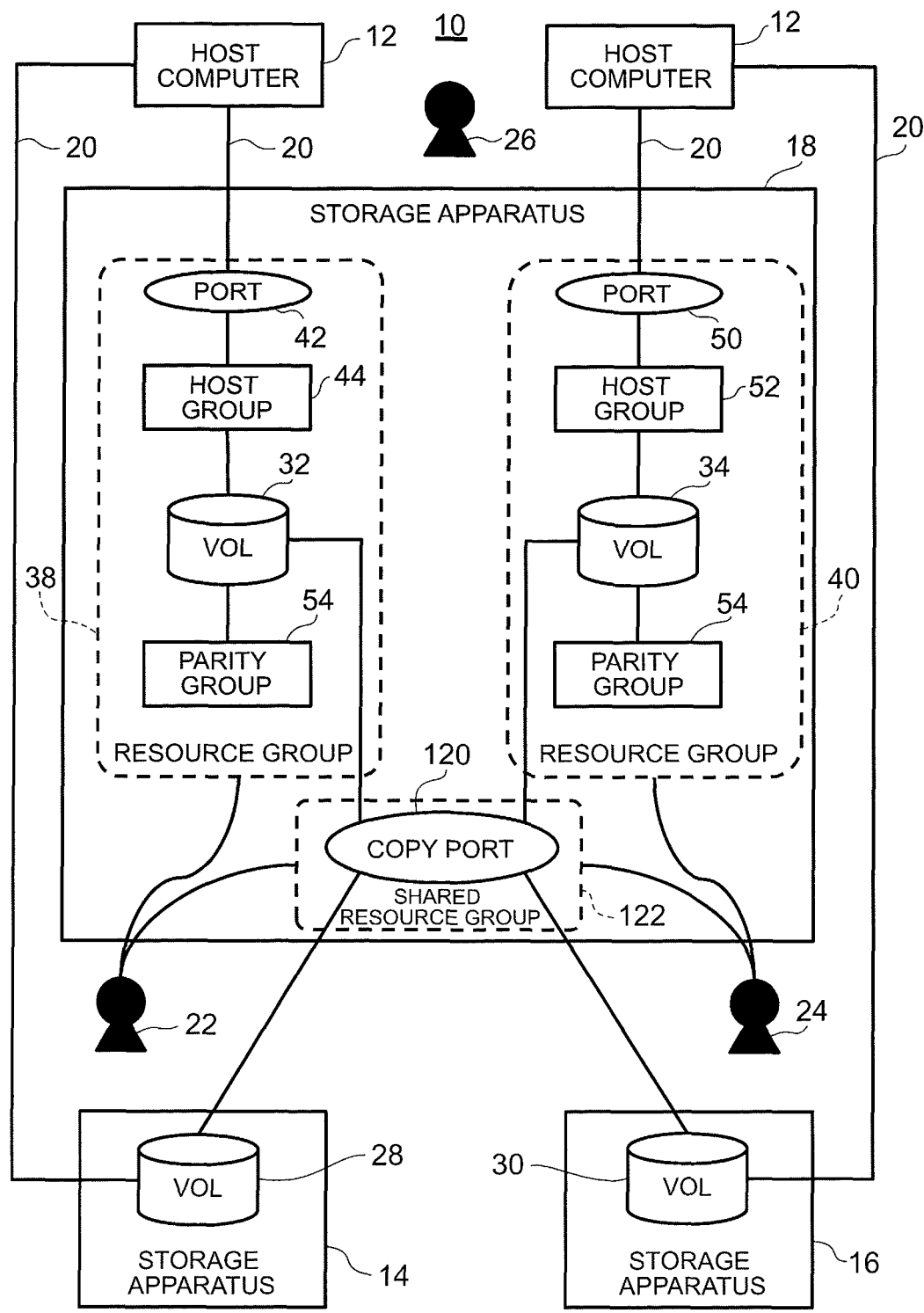
FIG. 25 is a block diagram showing the overall configuration of a computer system when a port is shared by resource groups.
Figure 26:
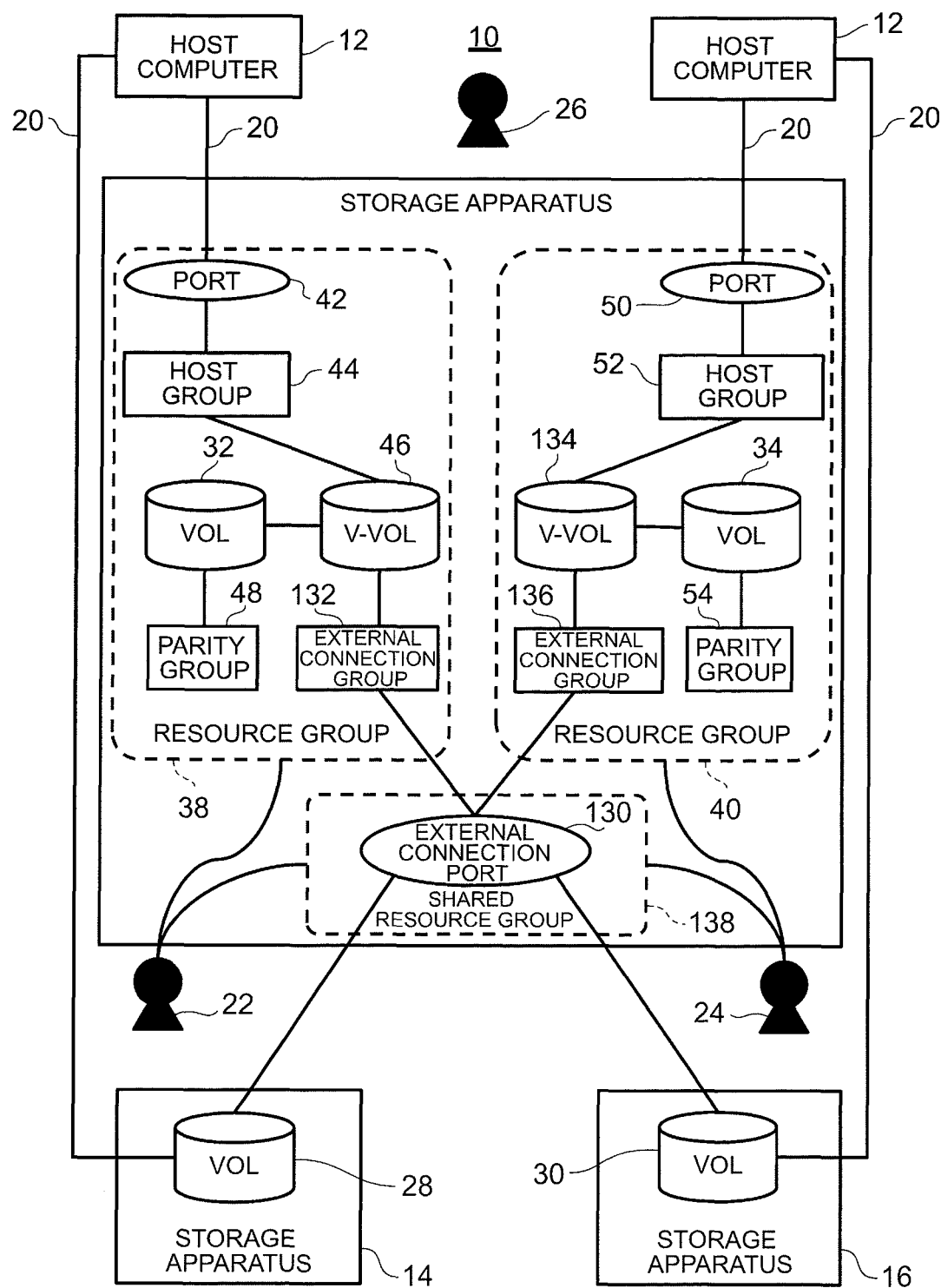
FIG. 26 is a block configuration diagram showing the overall configuration of a computer system when an external connection port is shared by resource groups.

This embodiment is an example of a case where the migration source storage apparatuses 14, 16 share a resource of the migration destination storage apparatus 18, and each storage apparatus is constructed from the same elements as in the first embodiment. FIG. 25 shows a case where the storage apparatuses 14, 16 share a copy port; and FIG. 26 shows a case where the storage apparatuses 14, 16 share an external connection port.

Referring to FIG. 25, when the migration source storage apparatus 14 and the migration source storage apparatus 16 share a copy port 120 and if the volume migration processing is executed, data of the migration source volume 28 is migrated via the copy port 120 to the migration destination volume 32 and data of the migration source volume 30 is migrated via the copy port 120 to the migration destination volume 34.

Under this circumstance, if the resource group 38 to be allocated to the administrator 22 is created in the same manner as in the first embodiment, the resource group 38 is constituted from, for example, the port 42, the host group 44, the migration destination volume 32, the parity group 48, and the copy port 120. Furthermore, if the resource group 40 to be allocated to the administrator 24 is created, the resource group 40 is constituted from, for example, the port 50, the host group 52, the migration destination volume 34, the parity group 54, and the copy port 120.

If processing for, for example, migrating the copy port 120 to the resource group 38 as the resource belonging to the resource group 38 and then migrating the copy port 120 to the resource group 40 as the resource belonging to the resource group 40 is executed under the above-described circumstance, the copy port 120 which is the shared resource will be processed as the resource belonging to only the resource group 40 and be exclusively owned by the resource group 40.

On the contrary, if processing for migrating the copy port 120 to the resource group 40 as the resource belonging to the resource group 40 and then migrating the copy port 120 to the resource group 38 as the resource belonging to the resource group 38 is executed, the copy port 120 which is the shared resource will be processed as the resource belonging to only the resource group 38 and be exclusively owned by the resource group 38.

So, this embodiment is designed in order to prevent the copy port 120, which is the shared resource, from being exclusively owned by the resource group 38 or the resource group 40, so that the shared resource is managed by associating it with the resource group 38 or the resource group 40, a shared resource group 122 for sorting the shared resource into the resource group 38 or the resource group 40 is formed in, for example, the local memory 112 based on, for example, the identifiers of the migration source volumes 28, 30, and the copy port 120 is managed by using the shared resource group 122.

Then, the resource group 38 and the shared resource group 122 are allocated to the administrator 22 and the resource group 40 and the shared resource group 122 are allocated to the administrator 24. As a result, it is possible to prevent the copy port 120, which is the shared resource, from being exclusively owned by the resource group 38 or the resource group 40.

Referring to FIG. 26, when the migration source storage apparatus 14 and the migration source storage apparatus 16 share an external connection port 130 and if the volume migration processing is executed, data of the migration source volume 28 is migrated via the external connection port 130 to the migration destination volume 32 and data of the migration source volume 30 is migrated via the external connection port 130 to the migration destination volume 34.

Under this circumstance, if the resource group 38 to be allocated to the administrator 22 is created in the same manner as in the first embodiment, the resource group 38 is constituted from, for example, the port 42, the host group 44, the migration destination volume 32, the parity group 48, the virtual volume 46, an external connection group 132, and the external connection port 130. Furthermore, if the resource group 40 to be allocated to the administrator 24 is created, the resource group 40 is constituted from, for example, the port 50, the host group 52, the migration destination volume 34, the parity group 54, a virtual volume 134, an external connection group 136, and the external connection port 130.

If processing for, for example, migrating the external connection port 130 to the resource group 38 as the resource belonging to the resource group 38 and then migrating the external connection port 130 to the resource group 40 as the resource belonging to the resource group 40 is executed under the above-described circumstance, the external connection port 130 which is the shared resource will be processed as the resource belonging to only the resource group 40 and be exclusively owned by the resource group 40.

On the contrary, if processing for migrating the external connection port 130 to the resource group 40 as the resource belonging to the resource group 40 and then migrating the external connection port 130 to the resource group 38 as the resource belonging to the resource group 38 is executed, the external connection port 130 which is the shared resource will be processed as the resource belonging to only the resource group 38 and be exclusively owned by the resource group 38.

So, this embodiment is designed in order to prevent the external connection port 130, which is the shared resource, from being exclusively owned by the resource group 38 or the resource group 40, so that the shared resource (external connection port 130) is managed by associating it with the resource group 38 or the resource group 40, a shared resource group 138 for sorting the shared resource into the resource group 38 or the resource group 40 is formed in, for example, the local memory 112 based on, for example, the identifiers of the migration source volumes 28, 30, and the external connection port 130 is managed by using the shared resource group 138.

Then, the resource group 38 and the shared resource group 138 are allocated to the administrator 22 and the resource group 40 and the shared resource group 138 are allocated to the administrator 24. As a result, it is possible to prevent the external connection port 130, which is the shared resource, from being exclusively owned by the resource group 38 or the resource group 40.

Next, processing according to this embodiment will be explained with reference to a flowchart in FIG. 27.

Since the difference between the processing according to this embodiment and the first embodiment is only the processing of process A, the processing of process A will be explained. During this process A, processing for migrating the shared resource, which is shared by the administrator 22A and the administrator 22B in the migration destination storage apparatus 18, to the shared resource group is executed when consolidating the migration source volumes 28, 30 as the migration destination volumes 32, 34.

Firstly, the migration support control program 210 obtains L as an identifier (product name and serial number) of the migration source storage apparatus 14, 16 based on the SCSI inquiry ID of LDEV[i] (S91) and judges whether a migration destination resource group whose name is the obtained identifier L exists or not (S92).

If an affirmative judgment is returned in step S92, the migration support control program 210 determines that the migration destination resource group whose name is the obtained identifier L already exists; then proceeds to processing in step S94. If a negative judgment is returned in step S92, the migration support control program 210 creates a migration destination resource group whose name is the identifier L (S93). For example, the migration support control program 210 creates the resource group 38 as the migration destination resource group whose name is the identifier L.

Next, the migration support control program 210 extracts LDEV[i] from the default resource group and migrates it to the migration destination resource group (S94).

For example, the migration support control program 210 migrates the migration destination volume 32 as LDEV[i] to the resource group 38 and migrates the migration destination volume to the resource group 40.

Subsequently, the migration support control program 210 executes, as processing of process B, processing for creating a shared resource group, for example, the shared resource group 122 or the shared resource group 138, and migrating the shared resource (the copy port 120 or the external connection port 130) to the shared resource group (S95), thereby terminating the processing in this routine.

Figure 28:
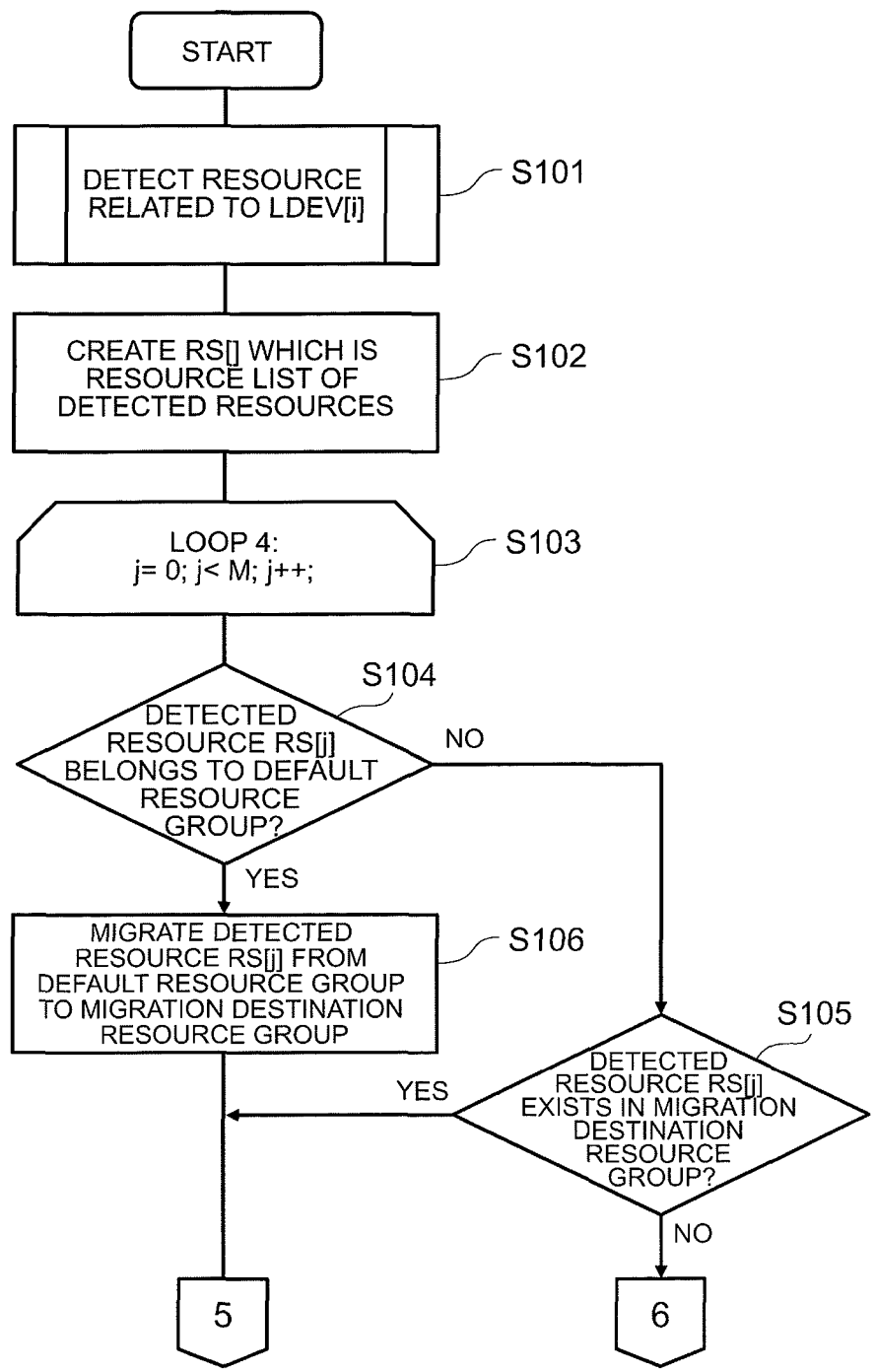
FIG. 28 is a flowchart explaining processing of process B.
Figure 29:
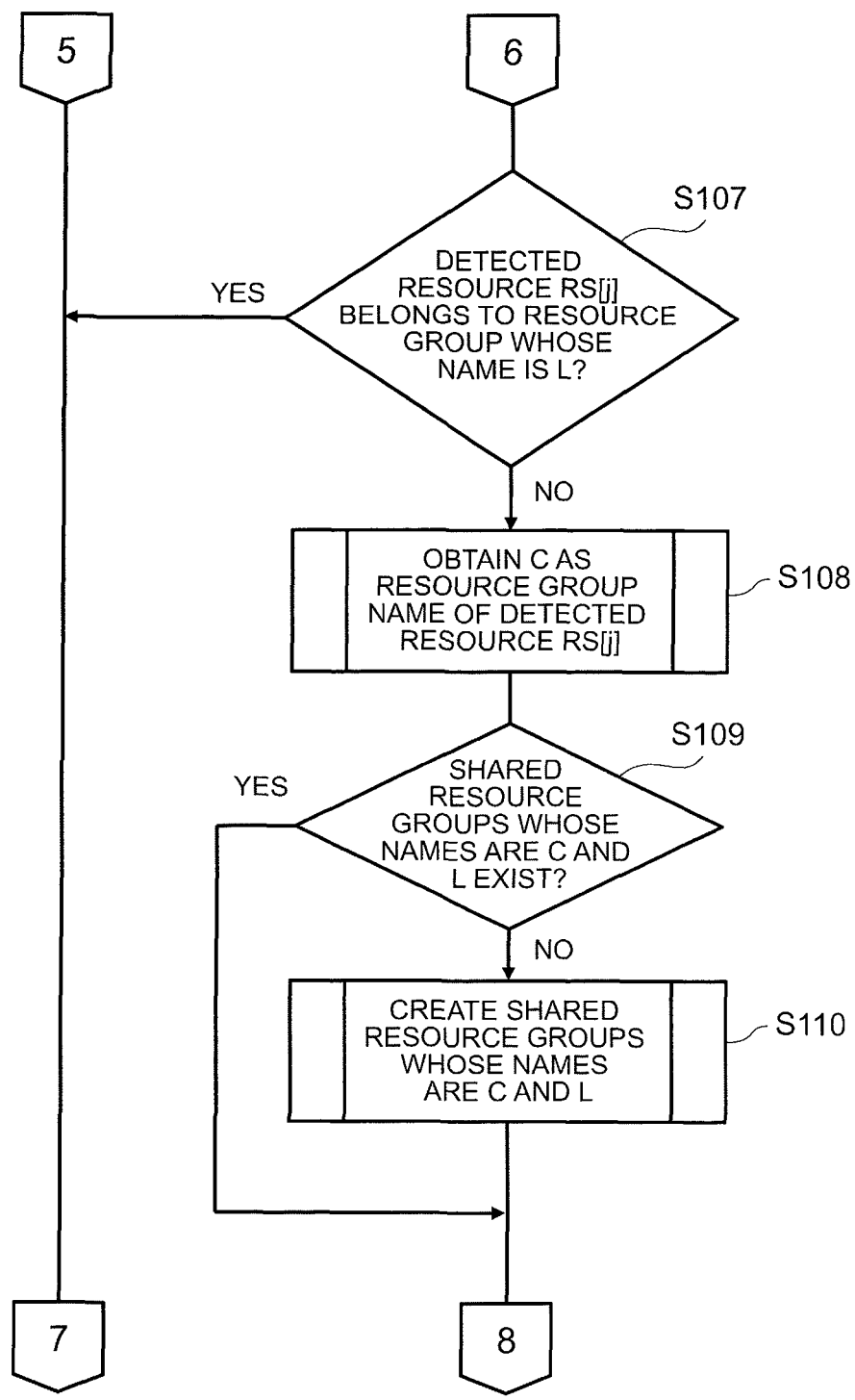
FIG. 29 is a flowchart explaining the processing of process B.
Figure 30:
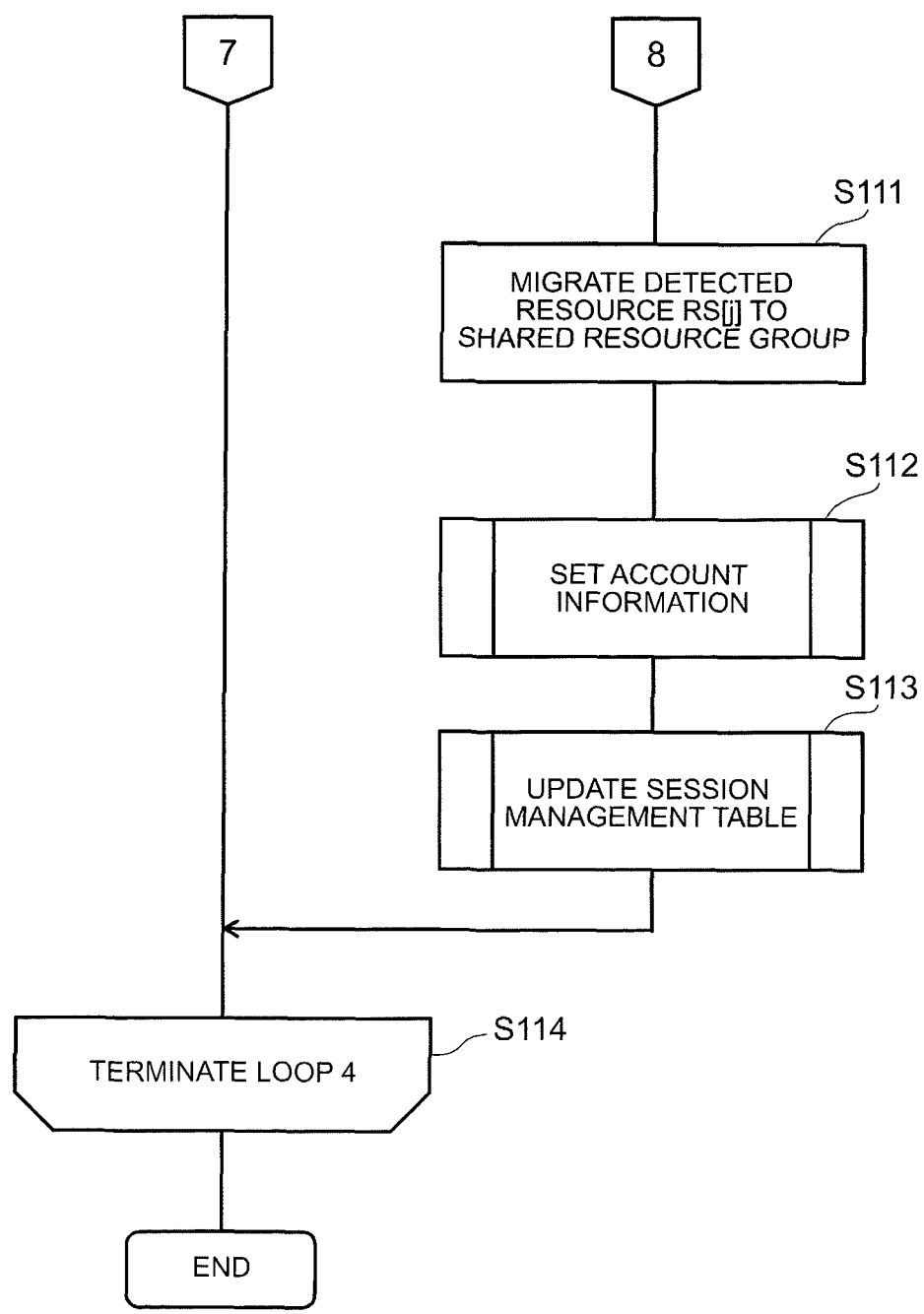
FIG. 30 is a flowchart explaining the processing of process B.

Next, the processing of process B will be explained with reference to flowcharts in FIG. 28, FIG. 29, and FIG. 30.

Figure 27:
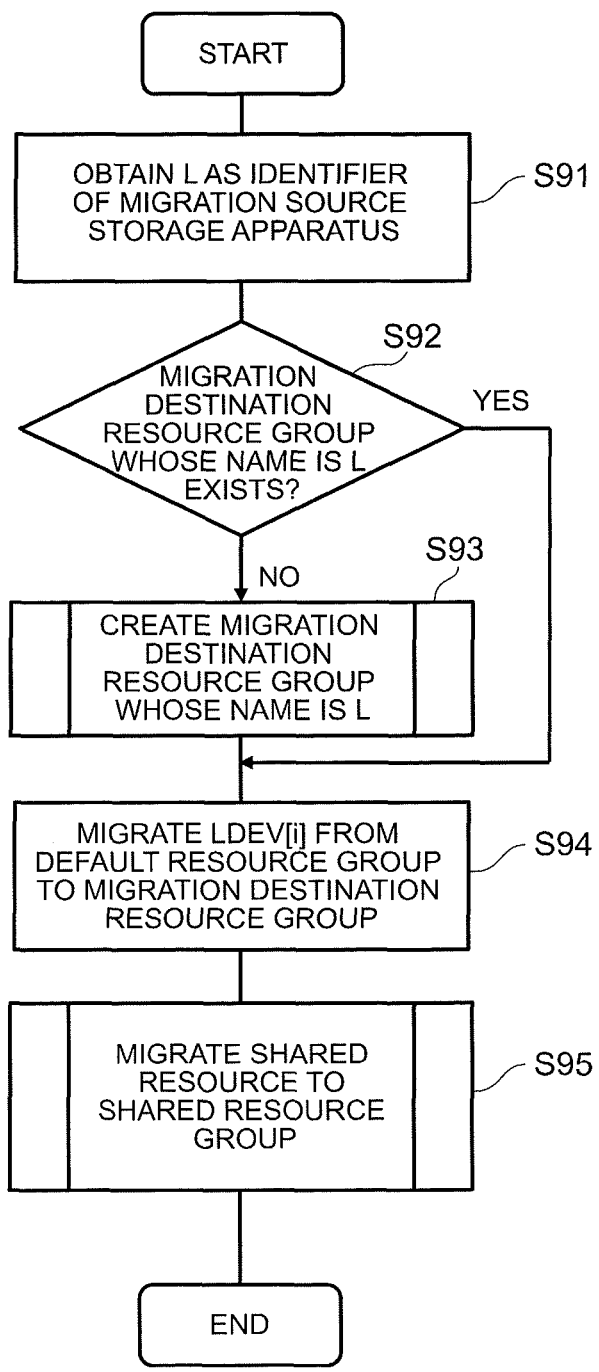
FIG. 27 is a flowchart explaining actions of a second embodiment.

This processing is the specific content of step S95 in FIG. 27.

Firstly, the migration support control program 210 detects resources related to LDEV[i] based on the control information (S101). For example, if LDEV[i] is the migration destination volume 32, the migration support control program 210 detects the port 42, the host group 44, the parity group 48, and the copy port 120 as the resources related to the migration destination volume 32; and if LDEV[i] is the migration destination volume 34, the migration support control program 210 detects the port 50, the host group 52, the parity group 54, and the copy port 120 as the resources related to the migration destination volume 34.

Next, the migration support control program 210 creates RS[ ] that is a resource list of the detected resources (S102).

Under this circumstance, the migration support control program 210 sets the number of the detected resources to M and executes processing of loop 4 on all the resources in the resource list (S103).

Next, the migration support control program 210 judges whether the detected resources belong to the default resource group or not (S104). If a negative judgment is returned in step S104, the migration support control program 210 judges whether the detected resource RS[j] exists in the migration destination resource group or not (S105).

On the other, if an affirmative judgment is returned in step S104, the migration support control program 210 migrates the detected resources from the default resource group to the migration destination resource group (S106), then proceeds to processing in step S114, and thereby terminates the processing of loop 4.

Under this circumstance, if the resource group 38 is created as the migration destination resource group whose name is L, the resources including the port 42, the host group 44, and the parity group 48 are migrated to the resource group 38.

If an affirmative judgment is returned in step S105, the migration support control program 210 determines that the detected resource RS[j] already exists in the migration destination resource group; and terminates the processing of loop 4 (S114) and also terminates the processing in this routine. If a negative judgment is returned in step S105, the migration support control program 210 judges whether or not the detected resource RS[j] belongs to the migration destination resource group whose name is L (S107).

If an affirmative judgment is returned in step S107, the migration support control program 210 terminates the processing of loop 4 (S114). If a negative judgment is returned, the migration support control program 210 obtains C as the resource group name of the detected resources (the name of the resource group in which the detected resources are currently stored) (S108).

Next, the migration support control program 210 judges whether the shared resource group whose name is C, L exist or not (S109).

For example, if the name of the migration source storage apparatus 14 is L and the name of the migration source storage apparatus 16 is C, the migration support control program 210 judges whether the shared resource group 120 whose name is C, L exists or not.

If an affirmative judgment is returned in step S109, the migration support control program 210 proceeds to processing in step S111; and if a negative judgment is returned, the migration support control program 210 creates the shared resource group whose name is C, L (S110), migrates the detected shared resources to the shared resource group whose name is C, L (S111), and sets account information (S112).

For example, if the resource group 38 is created as the resource group whose name is L and the resource group 40 is created as the resource group whose name is C and the shared resource group 122 is created as the shared resource group whose name is C, L, the resources including the port 42, the host group 44, and the parity group 48 as the resources related to the migration destination volume 32 are migrated to the migration destination resource group 38, the resources including the port 50, the host group 52, and the parity group 54 as the resources related to the migration destination volume 34 are migrated to the resource group 40, and the copy port 120 as the shared resource is migrated to the shared resource group 122.

Next, the migration support control program 210 updates the session management table 220 (S113) and terminates the processing of loop 4 and the processing in this routine.

In step S113, the migration support control program 210 changes a bit corresponding to the shared resource group including C, L in its name to 1 with respect to a session for which a bit corresponding to the resource group whose name is C is 1, in the allocated resource group ID bitmap of currently existing sessions.

Then, the migration support control program 210 allocates the migration destination resource group 38 and the shared resource group 122 to the administrator 22 and allocates the migration destination resource group 40 and the shared resource group 122 to the administrator 24.

According to this embodiment, it is possible to prevent the shared resource 120 from being exclusively owned by the resource group 38 or the resource group 40 and appropriately allocate the resources, which have been migrated from the migration source storage apparatuses 14, 16 to the migration destination storage apparatus 18, to the administrators (migration source users) 22, 24.

(Third Embodiment)

This embodiment is an example of a case where a single migration source storage apparatus is managed by a plurality of administrators; and each storage apparatus is constituted from the same elements as those in the first embodiment.

Figure 31:
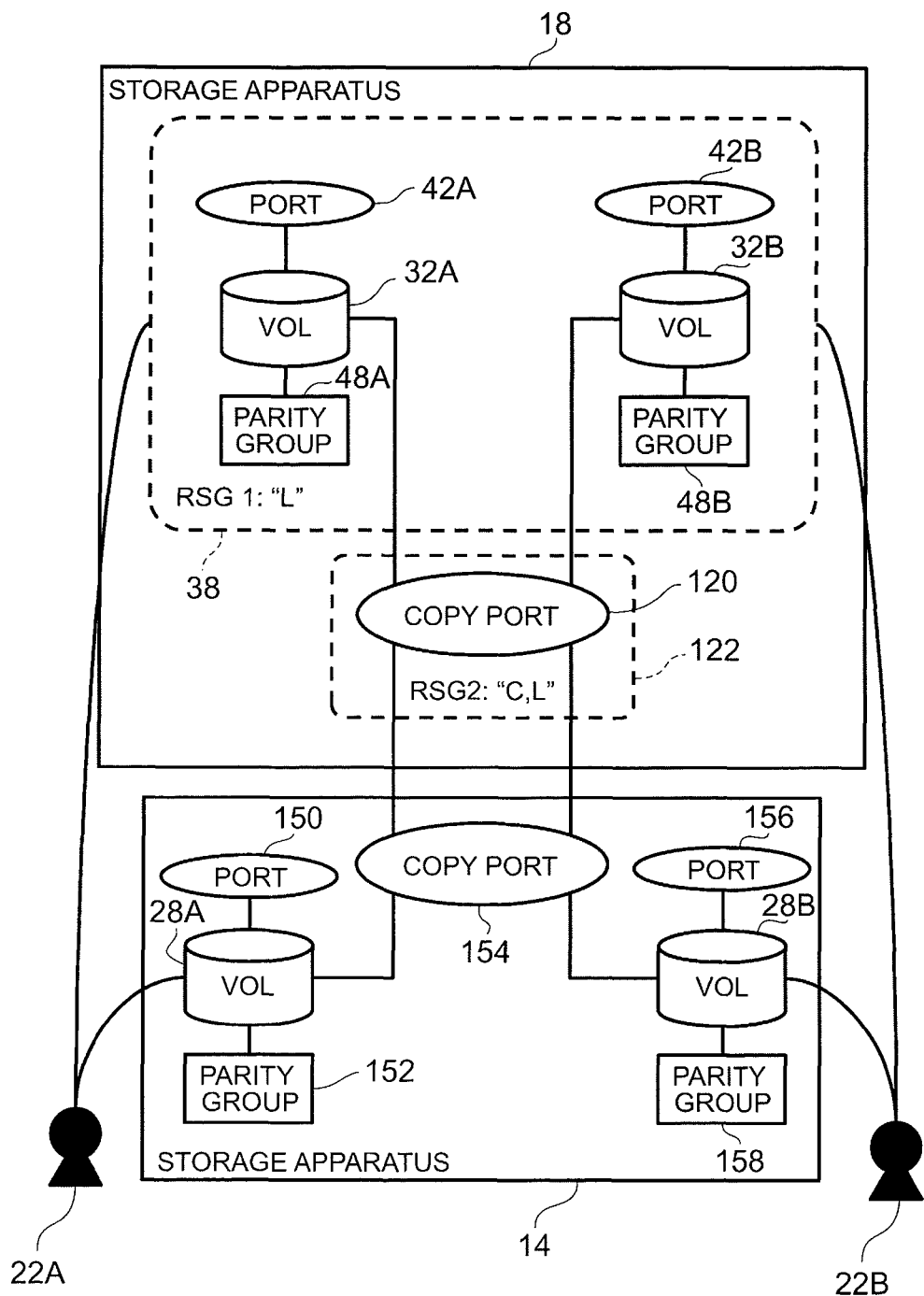
FIG. 31 is a block configuration diagram of the computer system for explaining a state where the processing according to the second embodiment has terminated.

FIG. 31 shows a conceptual diagram of a case where the migration source storage apparatus 14 is managed by a plurality of administrators 22A, 22B, respectively.

Referring to FIG. 31, the administrator 22A, whose operation target is a migration source volume 28A, and the administrator 22B, whose operation target is a migration source volume 28B, are located in the storage apparatus 14; and a port 150, a parity group 152, and a copy port 154 are connected to the migration source volume 28A, and the copy port 154, a port 156, and a parity group 158 are connected to the migration source volume 28B. When the volume migration is executed in the above-described environment, data of the migration source volume 28A is migrated via the copy port 154 and the copy port 120 to a migration destination volume 32A and data of the migration source volume 28B is migrated via the copy ports 154, 120 to a migration destination volume 32B.

If the processing according to the second embodiment is executed in the storage apparatuses 14, 18 under the above-described circumstance, the migration destination resource group 38 whose name is L and the shared resource group 122 whose name is C, L are formed in the storage apparatus 18.

If the resources related to the migration destination volume 32A are constituted from a port 42A, a parity group 48A, and the copy port 120 and the resources related to the migration destination volume 32B are constituted from a port 42B, a parity group 48B, and the copy port 120, the migration destination resource group 38 whose name is L is constituted from the ports 42A, 42B, the migration destination volumes 32A, 32B, and the parity groups 48A, 48B, and a shared resource group 122 is composed of the copy port 120 as the shared resource shared by the storage apparatuses 14, 16.

The migration destination resource group 38 and the shared resource group 122 are allocated to the administrator 22A and the migration destination resource group 38 and the shared resource group 122 are allocated to the administrator 22B.

Specifically speaking, the resources which each administrator 22A, 22B is in charge of are allocated to the administrators 22A, 22B, and the resources which each administrator 22A, 22B is not in charge of are also allocated to the administrators 22A, 22B.

Figure 32:
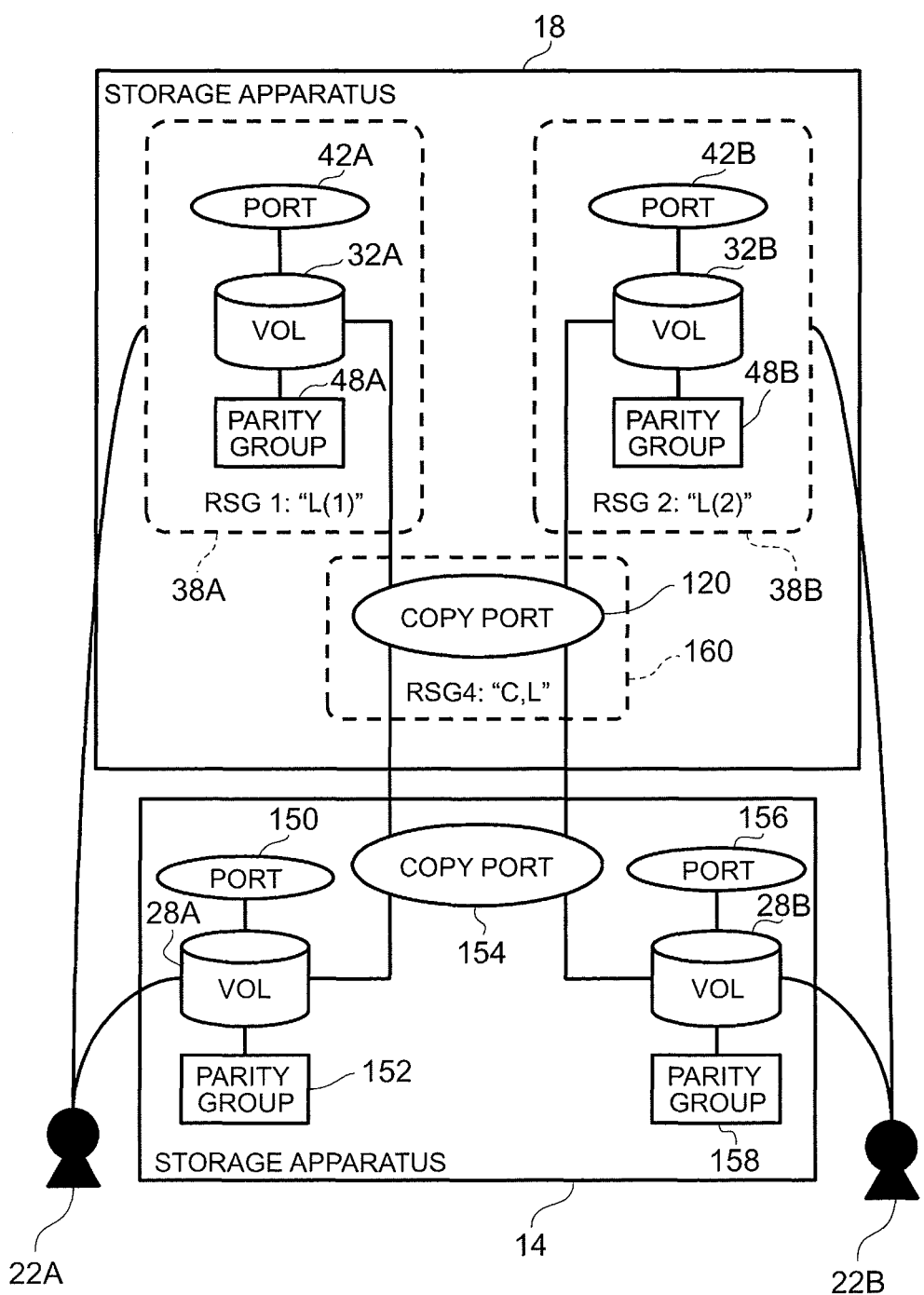
FIG. 32 is a block configuration diagram of the computer system for explaining the concept of when processing according to a third embodiment is executed after the termination of the processing according to the second embodiment.

Therefore, in this embodiment as shown in FIG. 32, when creating the migration destination resource group, the administrator IDs of the administrators 22A, 22B are obtained from the migration source storage apparatus 14 and a plurality of user-based migration destination resource groups are created in accordance with a combination pattern of each obtained administrator ID (identification information for identifying the administrator).

For example, the resource group 38A whose name is L1 is created as a user-based migration destination resource group corresponding to the administrator 22A and the resource group 38B whose name is L2 is created as a user-based migration destination resource group corresponding to the administrator 22B. Furthermore, the copy port 120 which is the shared resource between the storage apparatuses 14, 16 is managed in association with the resource group 38A or the resource group 38B, and a shared resource group 160 whose name is C, L is created as a shared resource group for sorting the copy port 120 to the resource group 38A or the resource group 38B based on, for example, the identifiers of the migration source volumes 28A, 28B.

Subsequently, the migration destination volume 32A is migrated to the migration destination resource group 38A; and the port 42A and the parity group 48A are migrated as the resources related to the migration destination volume 32A, thereby constituting the resource group 38A.

Similarly, the migration destination volume 32B is migrated to the migration destination resource group 38B; and the port 42B and the parity group 48B are migrated as the resources related to the migration destination volume 32B, thereby constituting the resource group 38B.

Furthermore, the copy port 120 is migrated to the shared resource group 160, thereby constituting the shared resource group 160.

Then, the user-based migration destination resource group 38A and the shared resource group 160 are allocated to the administrator 22A; and the user-based migration destination resource group 38B and the shared resource group 160 are allocated to the administrator 22B.

As a result, only the resources which each administrator 22A, 22B is in charge of are allocated to the administrators 22A, 22B.

Figure 33:
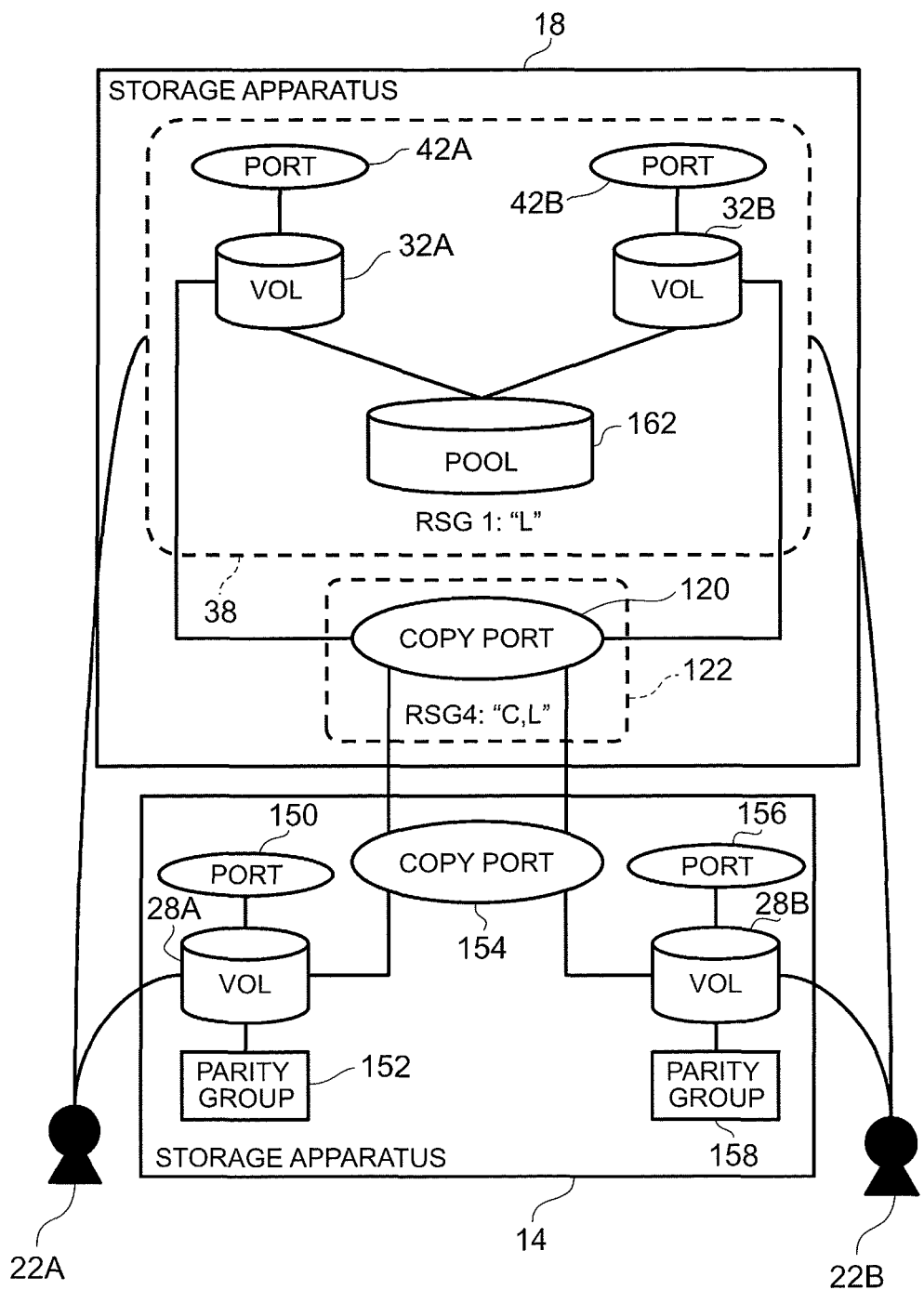
FIG. 33 is a block configuration diagram of the computer system for explaining a state where the processing according to the second embodiment has terminated.

Next, FIG. 33 shows an example of a case where the migration source storage apparatus 14 is managed by the two administrators 22A, 22B and the shared resource exists in the migration destination resource group 38 created at the migration destination storage apparatus 18.

Referring to FIG. 33, the administrator 22A, whose operation target is the migration source volume 28A, and the administrator 22B, whose operation target is the migration source volume 28B, are located in the storage apparatus 14; and the port 150, the parity group 152, and the copy port 154 are connected to the migration source volume 28A, and the copy port 154, the port 156, and the parity group 158 are connected to the migration source volume 28B. When the volume migration is executed in the above-described environment, data of the migration source volume 28A is migrated via the copy port 154 and the copy port 120 to the migration destination volume 32A and data of the migration source volume 28B is migrated via the copy ports 154, 120 to the migration destination volume 32B.

If the processing according to the second embodiment is executed in the storage apparatuses 14, 18 under the above-described circumstance, the migration destination resource group 38 whose name is L and the shared resource group 122 whose name is C, L are formed in the storage apparatus 18.

Now, for example, if the resources related to the migration destination volume 32A are constituted from the port 42A and a pool 162 and the resources related to the migration destination volume 32B are constituted from the port 42B and the pool 162, and the shared resource is composed of the copy port 120, the migration destination resource group 38 whose name is L is constituted from the ports 42A, 42B, the migration destination volumes 32A, 32B, and the pool 162, and the shared resource group 122 whose name is C, L is composed of the copy port 120.

Then, the migration destination resource group 38 and the shared resource group 122 are allocated to the administrator 22A and the migration destination resource group 38 and the shared resource group 122 are allocated to the administrator 22B.

Specifically speaking, the resources which each administrator 22A, 22B is in charge of are allocated to the administrators 22A, 22B, and also the resources which each administrator 22A, 22B is not in charge of are also allocated to the administrators 22A, 22B.

Figure 34:
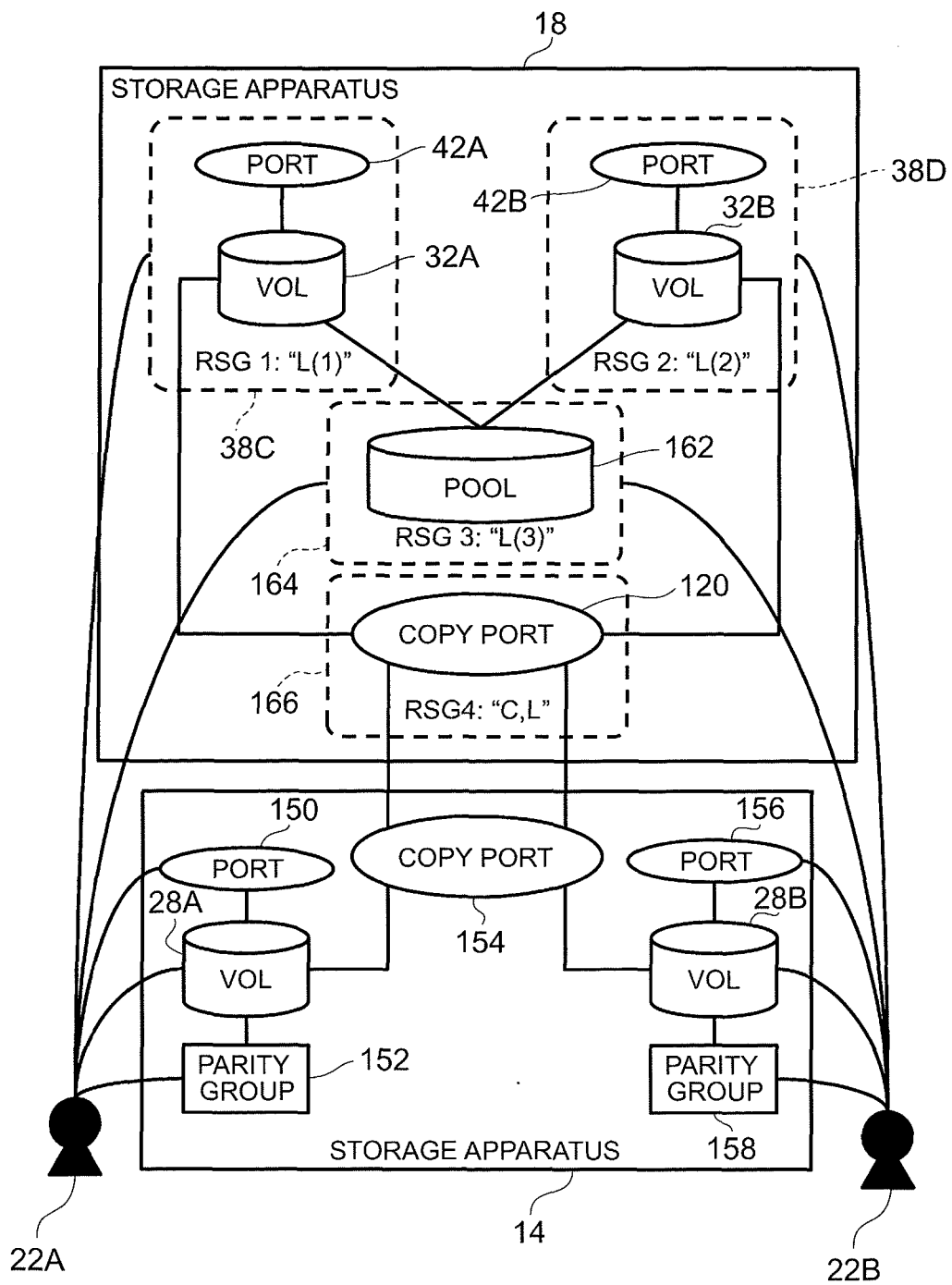
FIG. 34 is a block configuration diagram of the computer system for explaining the concept of when the processing according to the third embodiment is executed after the termination of the processing according to the second embodiment.

Therefore, in this embodiment as shown in FIG. 34, when creating the migration destination resource group, the administrator IDs of the administrators 22A, 22B are obtained from the migration source storage apparatus 14 and a plurality of user-based migration destination resource groups are created in accordance with a combination pattern of each obtained administrator ID.

For example, a resource group 38C whose name is L1 is created as a user-based migration destination resource group corresponding to the administrator 22A and a resource group 38D whose name is L2 is created as a user-based migration destination resource group corresponding to the administrator 22B.

Furthermore, the pool 162 which is a shared resource between the resource groups 38C, 38D is managed in association with the resource group 38C or the resource group 38D, and a shared resource group 164 whose name is L3 is created as a shared resource group for sorting the pool 162 to the resource group 38C or the resource group 38D based on, for example, the identifiers of the migration source volumes 28A, 28B.

Furthermore, the copy port 120 which is the shared resource between the storage apparatuses 14, 16 is managed in association with the resource group 38C or the resource group 38D, and a shared resource group 166 whose name is C, L is created as a shared resource group for sorting the copy port 120 to the resource group 38C or the resource group 38D based on, for example, the identifiers of the migration source volumes 28A, 28B.

Subsequently, the migration destination volume 32A is migrated to the migration destination resource group 38C; and the port 42A is migrated as the resource related to the migration destination volume 32A, thereby constituting the resource group 38C.

Similarly, the migration destination volume 32B is migrated to the migration destination resource group 38D; and the port 42B is migrated as the resource related to the migration destination volume 32B, thereby constituting the resource group 38D.

Furthermore, the pool 162 is migrated to the shared resource group 164 to constitute the shared resource group 164; and the copy port 120 is migrated to the shared resource group 166 to constitute the shared resource group 166.

Then, the user-based migration destination resource group 38A and the shared resource groups 164, 166 as operation targets are allocated to the administrator 22A; and the user-based migration destination resource group 38B and the shared resource groups 164, 166 as operation targets are allocated to the administrator 22B.

As a result, only the resources which each administrator 22A, 22B is in charge of are allocated to the administrators 22A, 22B.

Figure 35:
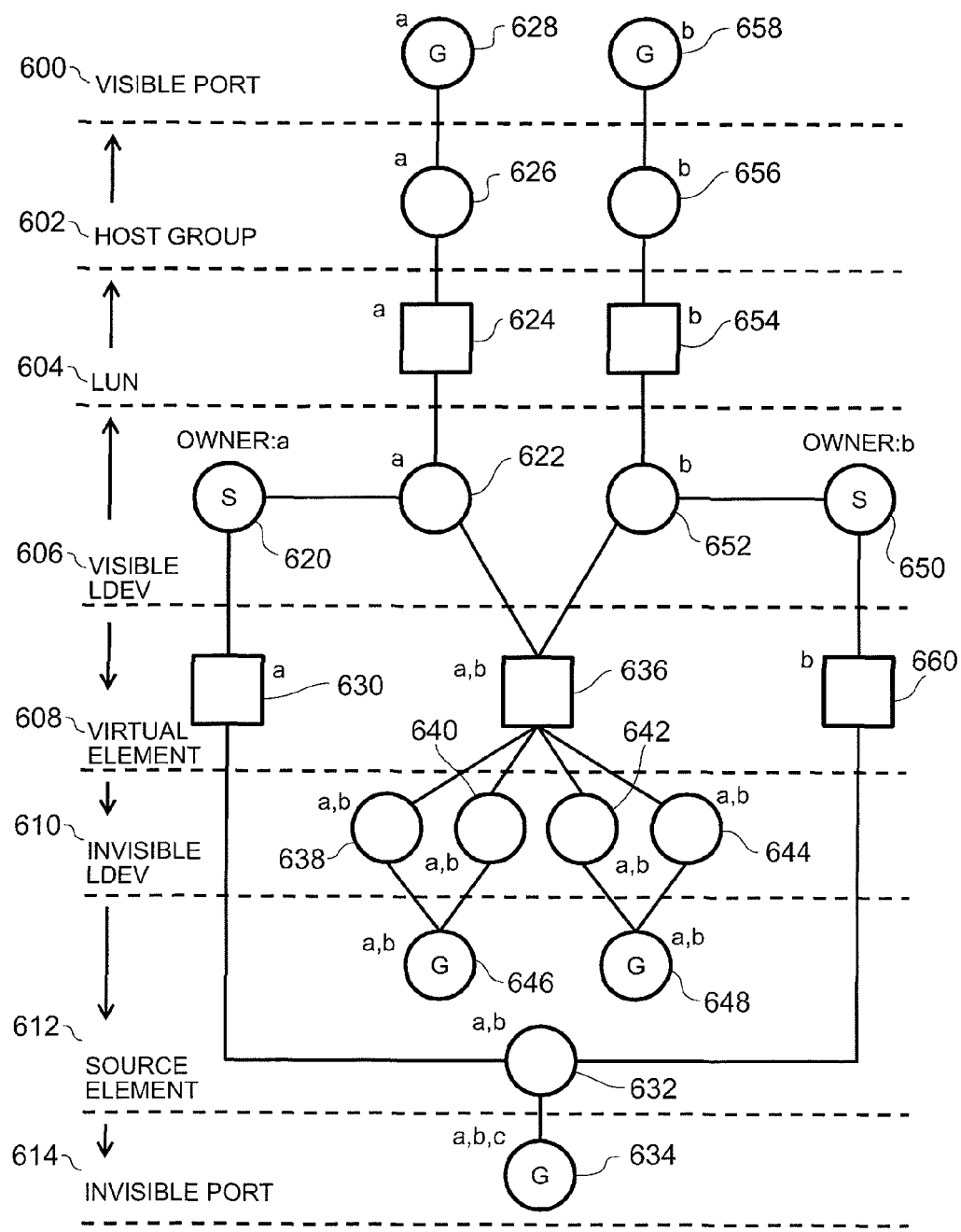
FIG. 35 is a schematic diagram explaining owner search processing.

Next, processing for deciding an owner of the resources will be explained with reference to a schematic diagram in FIG. 35.

When creating a migration destination resource group in the storage apparatus 18, processing for inquiring of the migration source storage apparatus 14 for the owner of each resource in consideration of, for example, the fact that the migration source storage apparatus 14 is managed by the plurality of administrators 22A, 22B.

For example, when creating the migration destination resource groups 38, 40 shown in FIG. 26, it is possible to divide the resources into a plurality of tiers and classify owners for each tier. Under this circumstance, each resource can be hierarchized into a visible port 600, a host group 602, a LUN 604, a visible LDEV 606, a virtual element 608, a invisible LDEV 610, a source element 612, and an invisible port 64.

Now, if processing is started on the external connection group 132 by setting an owner as a when the administrator 22A is the owner, setting an owner as b when the administrator 22B is the owner, and setting an owner as c when another administrator is the owner, an owner of a resource 620 corresponding to the external connection volume 132 becomes a and an owner of a resource 622 corresponding to the virtual volume 46 becomes a. Subsequently, if the processing is started on an upper tier than the resource 620, an owner of an element 624 belonging to the LUN 604 becomes a, an owner of a resource 626 belonging to the host group 602 becomes a, and an owner of a resource 628 belonging to the visible port 600 becomes a.

Furthermore, if the processing is started on a lower tier than the resource 620, an owner of an element 630 belonging to the virtual element 608 becomes a, an owner of a resource 632 belonging to the source element 612 becomes a, and an owner of a resource 634 belonging to the invisible port 614 becomes a.

Furthermore, an owner of a pool 636 belonging to the virtual element 608 becomes a, and an owner of each resource 638, 640, 642, 644 which is allocated to the pool 636 and belongs to the invisible LDEV 610 becomes a. An owner of each resource 646, 648 belonging to the source element 612 becomes a.

On the other hand, if the processing is started on a resource 650 corresponding to the external volume 136, an owner of the resource 650 becomes b and an owner of a resource 652 corresponding to the virtual volume 134 becomes b.

Subsequently, if the processing is started on an upper tier than the resource 650, an owner of an element 654 belonging to the LUN 604 becomes b, an owner of a resource 656 belonging to the host group 602 becomes b, and an owner of a resource 658 belonging to the visible port 600 becomes b.

Furthermore, if the processing is started on a lower tier than the resource 650, an owner of an element 660 belonging to the virtual element 608 becomes b, an owner of the resource 632 belonging to the source element 612 becomes b, and an owner of the resource 634 belonging to the invisible port 614 becomes b.

Furthermore, an owner of the pool 636 becomes b, and an owner of each resource 638 to 644 belonging to the invisible LDEV 610 becomes b, and an owner of each resource 646, 648 belonging to the source element 612 becomes b. Incidentally, the resource 634 belonging to the invisible port 614 also belongs to another administrator, so its owner becomes c.

Figure 36:
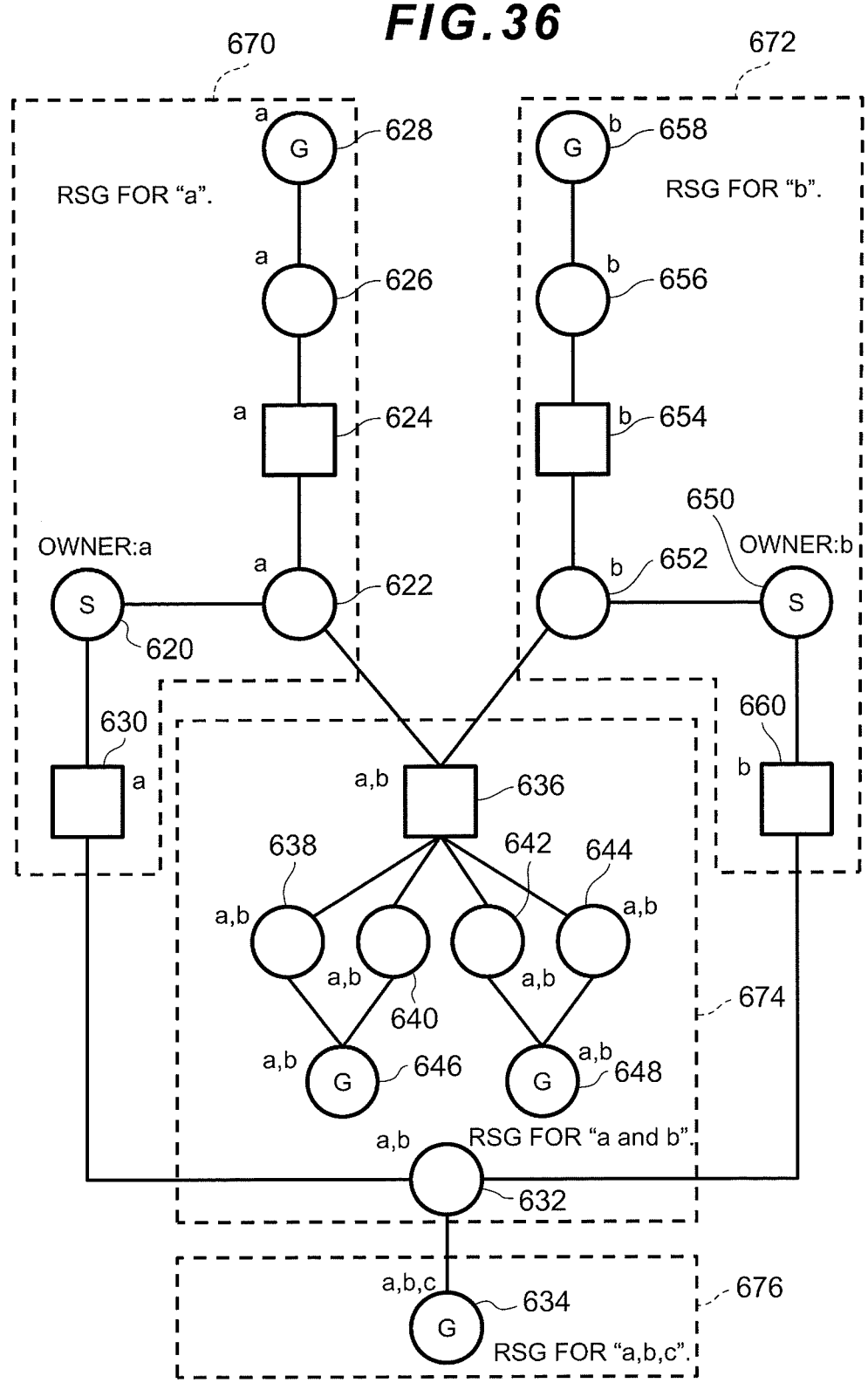
FIG. 36 is a schematic diagram explaining the owner search result.

As a result of the above-described processing, it is possible to form a resource group 670 corresponding to owner a, a resource group 672 corresponding to owner b, a resource group 674 corresponding to owner a, b, and a resource group 676 corresponding to owner a, b, c as shown in FIG. 36.

Next, FIG. 37 shows a configuration diagram of the access management table 230.

Referring to FIG. 37, the access management table 230 is constructed from a resource ID column 230A, a resource type column 230B, a current owner column 230C, a new owner column 230D, and a group pattern ID column 230E.

An entry of the resource ID column 230A stores information about the identifier for uniquely identifying the relevant resource, for example, CLA-1.

An entry of the resource type column 230B stores information about the type of the relevant resource, for example, VISIBLE PORT indicating a visible port.

An entry of the current owner column 230C stores information indicating a current owner of each resource, for example, a, b.

The new owner column 230D stores information about a new owner, for example, a, when the relevant resource is allocated to the new owner.

An entry of the group pattern ID column 230E stores information about an identifier for classifying owners into a plurality of combination patterns, for example, P1.

Next, FIG. 38 shows a configuration diagram of a group pattern list.

Referring to FIG. 38, a group pattern list 232 is constructed from a group pattern ID column 232A, an owner column 232B, a resource group ID column 232C, and a resource group name column 232D.

An entry of the group pattern ID column 232A stores information about an identifier of the relevant group pattern, for example, P1, P2, P3, P4.

An entry of the owner column 232B stores information about an owner corresponding to the group pattern ID. For example, a is stored as the name of the owner corresponding to the group pattern P1.

An entry of the resource group ID column 232C stores information about an identifier of the relevant resource group, for example, 1.

An entry of the resource group name column 232D stores information about the relevant resource group name. For example, MODEL.SERIAL.1 is stored as the resource group name corresponding to the group pattern ID P1.

Figure 39:
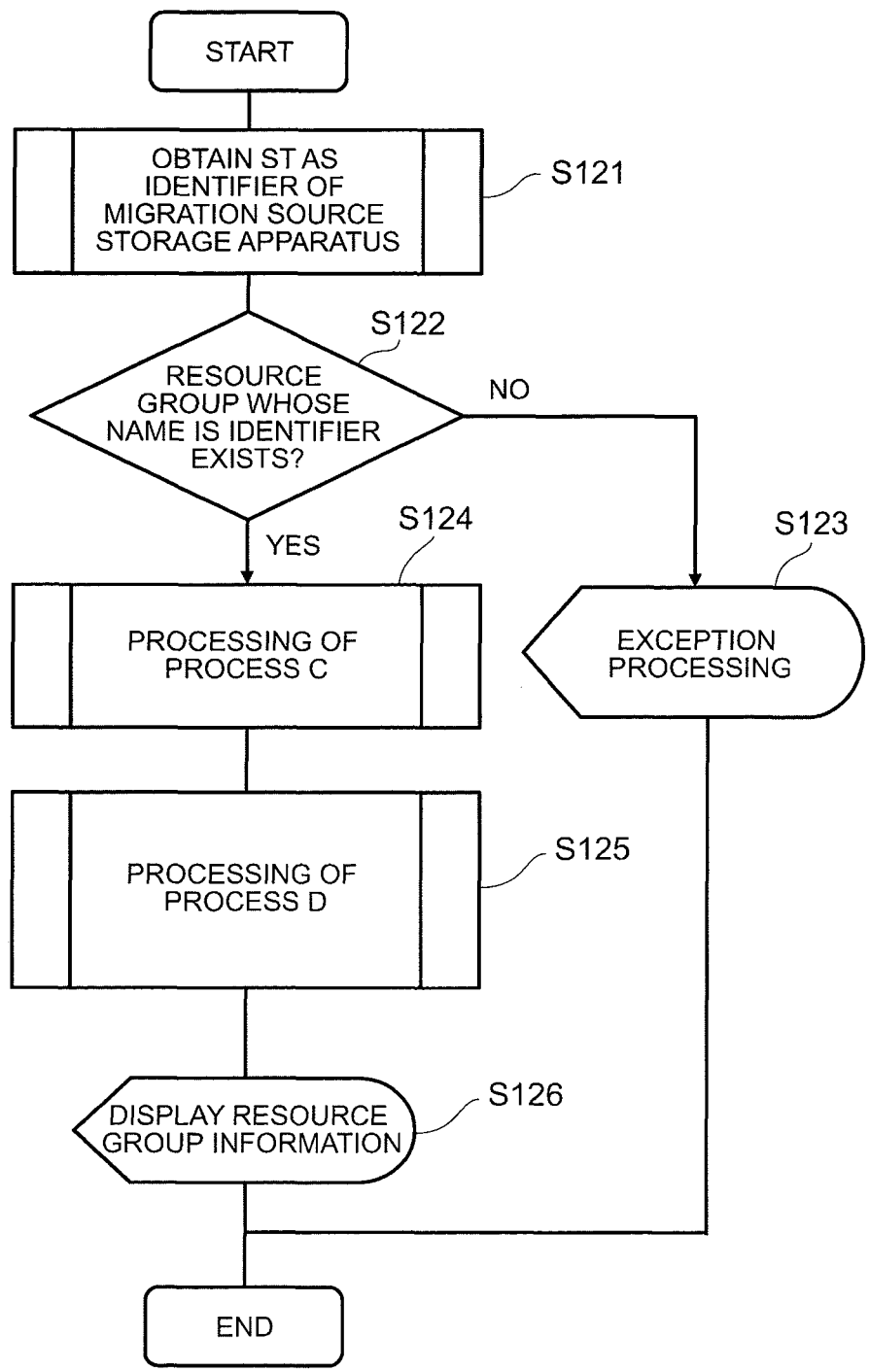
FIG. 39 is a flowchart explaining actions of the third embodiment.

Next, processing according to this embodiment will be explained with reference to a flowchart in FIG. 39. This processing is processing executed after completing the processing according to the first embodiment or the second embodiment.

Firstly, the migration support control program 210 obtains ST as the identifier ID of the migration source storage apparatus 14, which is input by the administrator 22A or the administrator 22B (S121); and judges whether a migration destination resource group whose name is the identifier ST exists or not (S122).

If a negative judgment is returned in step S122, the migration support control program 210 determines that the migration destination resource group whose name is the identifier ST does not exist; and executes exception processing (S123), thereby terminating the processing in this routine.

On the other hand, if an affirmative judgment is returned in step S122, the migration support control program 210 registers all the resources in the detected migration destination resource group in the access management table 230 as processing of process C (S124).

Under this circumstance, the migration support control program 210 registers an administrator (user group), to whom the migration destination resource group in which the resources registered in the access management table 230 is to be allocated, as an owner in the new owner column 230D of the access management table 230.

Furthermore, the migration support control program 210 extracts an LDEV (for example, the migration destination volume 32A), whose SCSI inquiry ID is changed, as identification information for identifying the owner from the detected migration destination resource group, obtains the owner of a migration source LDEV (for example, the migration source volume 28A) of the extracted LDEV from the migration source storage apparatus 14, and registers the obtained owner in an owner list X.

Furthermore, the migration support control program 210 registers the owner of the extracted LDEV in the new owner column 230D of the access management table 230 as the owner of the migration source LDEV obtained from the migration source storage apparatus 14.

Furthermore, the migration support control program 210 detects a resource related to the extracted LDEV based on the control information and registers the owner of the detected resource as the owner of the extracted LDEV in the new owner column 230D of the access management table 230.

Next, the migration support control program 210 executes, as processing of process D, processing for dividing the resource group, whose name is the identifier ST, into plurality of migration destination resource groups (S125).

For example, the migration support control program 210 refers to the new owner column 230D of the access management table 230; calculates group patterns; executes processing for setting, for example, a group in which a is registered as a new owner to P1, a group in which b is registered as a new owner to P2, a group in which a, b is registered as a new owner to P3, and a group in which a, b, c is registered as a new owner to P4; and then displays resource group information as the processing result of process D (S126), thereby terminating the processing in this routine.

Figure 40:
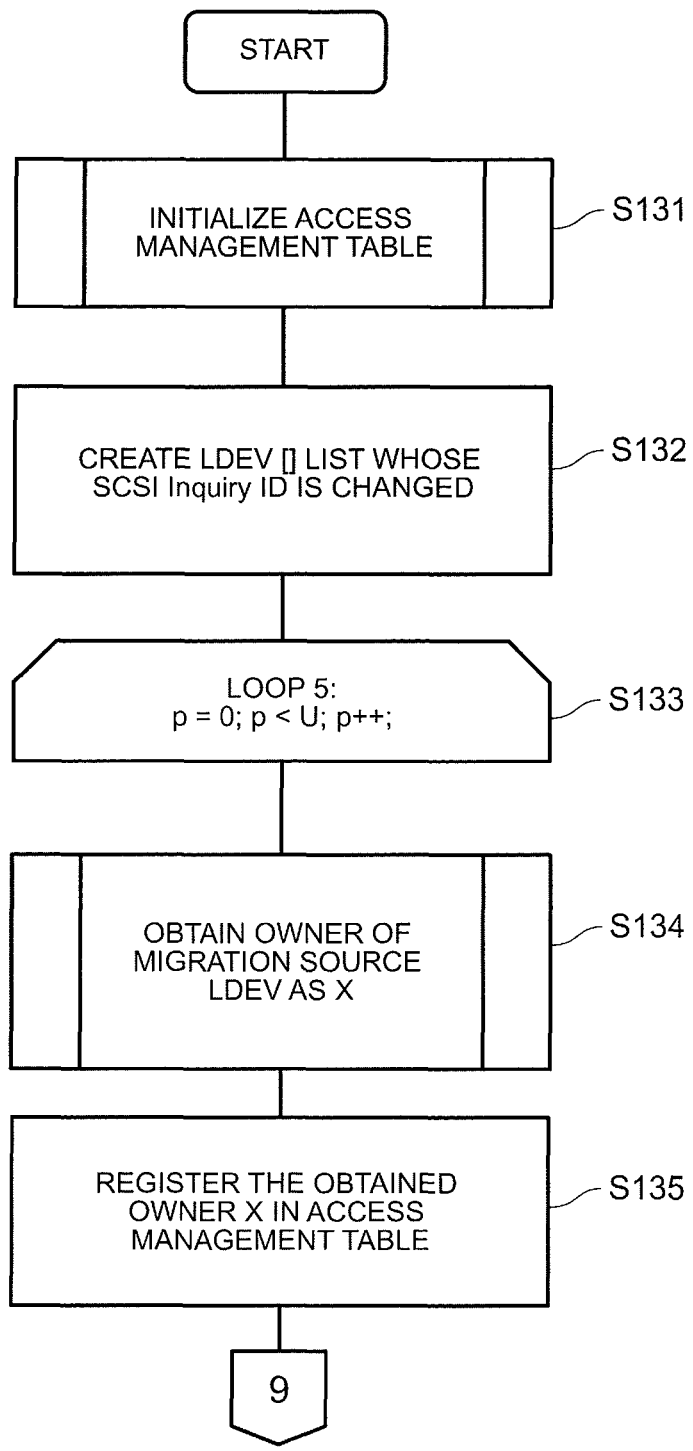
FIG. 40 is a flowchart explaining processing of process C.
Figure 41:
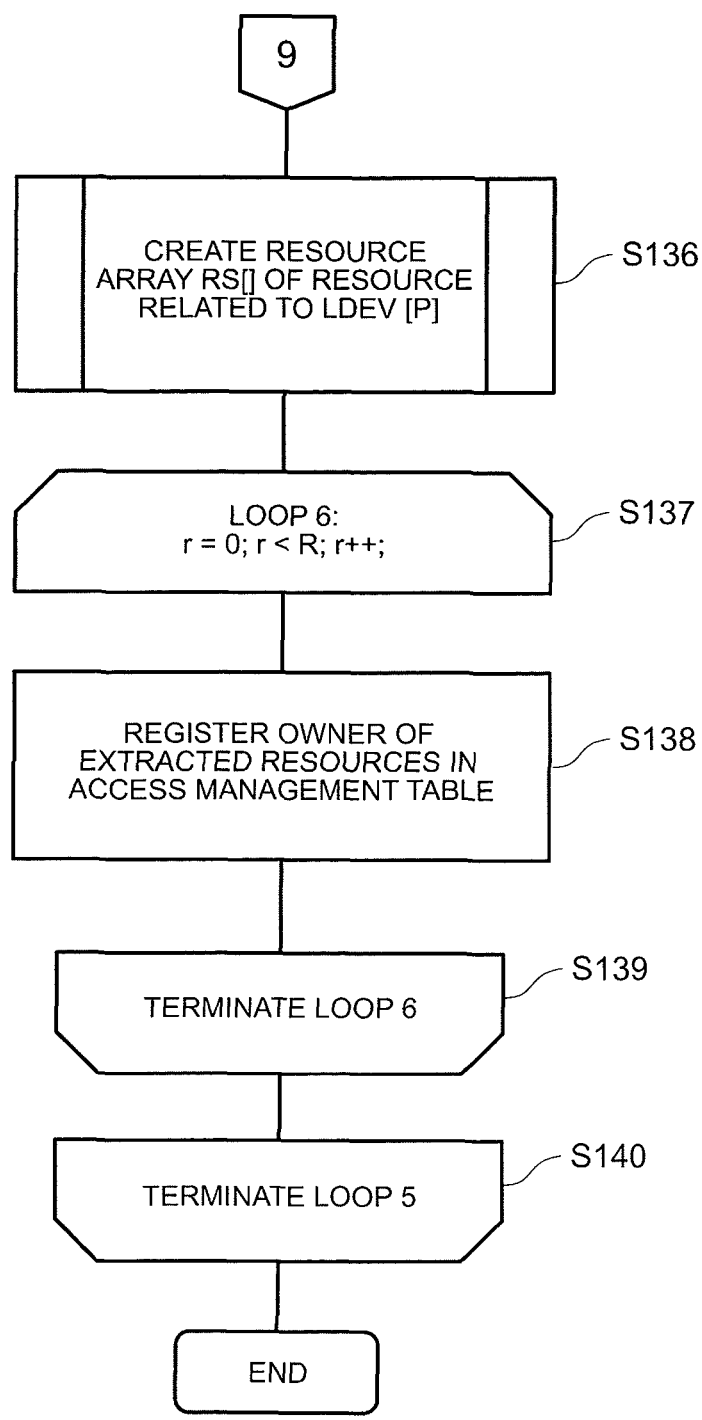
FIG. 41 is a flowchart explaining the processing of process C.

Next, the processing of process C will be explained with reference to flowcharts in FIG. 40 and FIG. 41.

Firstly, the migration support control program 210 initializes the access management table 230 (S131), Next, the migration support control program 210 creates, as an array LDEV[ ], a list of LDEVs whose SCSI inquiry IDs are changed, from the migration destination resource group whose name includes the identifier ST of the migration source storage apparatus 14 (S132).

Under this circumstance, the migration support control program 210 starts processing of loop 5 sequentially from the top of the array LDEV to the U-th LDEV when the number of LDEVs is U (S133).

Next, the migration support control program 210 obtains owner X of the migration source LDEV from the migration source storage apparatus 14 (S134) and registers the obtained owner X as the owner of the extracted LDEV in the new owner column 230D of the access management table 230 (S135).

Subsequently, the migration support control program 210 extracts resources related to the extracted LDEV[p] based on the control information and creates a list of the extracted resources as a resource array [ ] (S136).

Under this circumstance, the migration support control program 210 executes processing of loop 6 from the top of the resource array to the R-th resource when the number of the resources is R (S137).

Next, the migration support control program 210 recognizes the owner of the extracted resources as the owner of LDEV[p] and registers it in the new owner column 230D of the access management table 230 (S138), then terminates the processing of loop 6 (S139), then terminates the processing of loop 5 (S140), and then terminates the processing in this routine.

Figure 42:
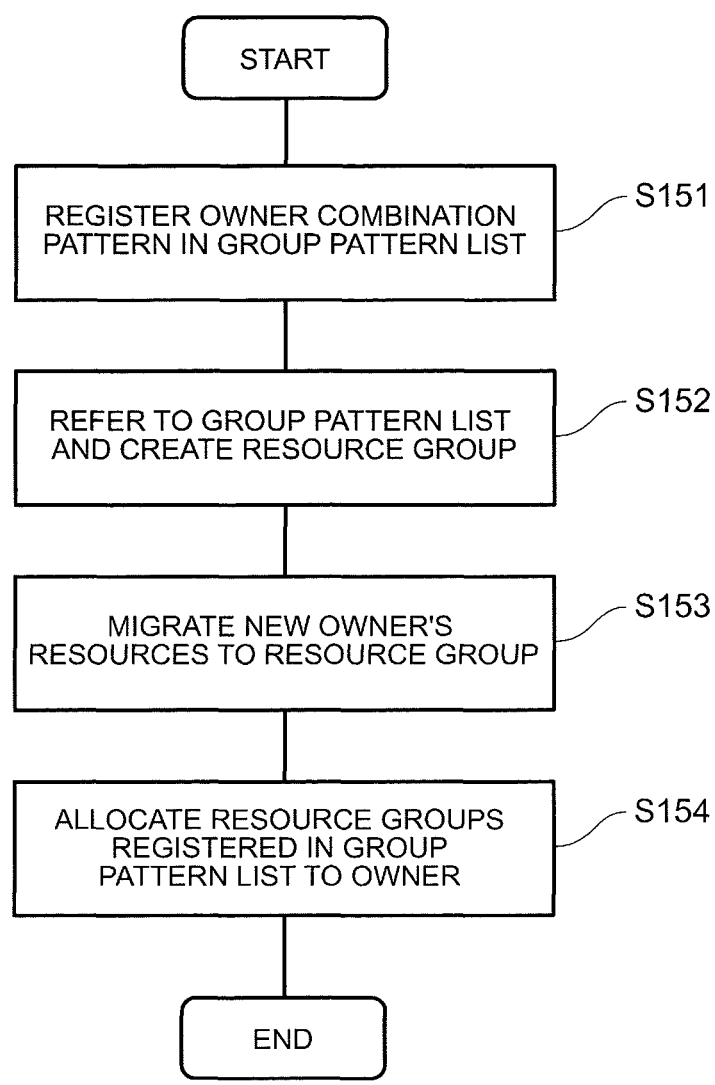
FIG. 42 is a flowchart explaining processing of process D.

Next, the processing of process D will be explained with reference to a flowchart in FIG. 42.

The migration support control program 210 refers to the access management table 230, compares the current owner with the new owner, and registers an owner combination pattern in the group pattern ID column 232A of the group pattern list 232 (S151).

Subsequently, the migration support control program 210 refers to the owner column 232B of the group pattern list 232 and creates a migration destination resource group (S152).

Under this circumstance, if a migration destination resource group allocated only to all the owners registered in the owner column 232B exists, the migration support control program 210 registers the resource group ID and the resource group name of the migration destination resource group in the group pattern list 232 and uses the existing one.

Subsequently, the migration support control program 210 refers to the owner column 232B of the group pattern list 232 and the new owner column 230D of the access management table 230 and migrates the resource of the new owner to the migration destination resource group (S153).

Then, the migration support control program 210 allocates the migration destination resource group, which is registered in the group pattern list 232, to the administrator or the user group of the new owner (S154), thereby terminating the processing in this routine.

According to this embodiment, the user-based migration destination resource group and the shared resource group are allocated as the operation targets to the administrators 22A, 22B. So, it is possible to allocate only the resources, which each administrator 22A, 22B is in charge of, to the administrators 22A, 22B.

Furthermore, even if resource access control is performed in each migration source storage apparatus 14, 16, this resource access control will not be passed directly to the migration destination storage apparatus 18 and it is possible to prevent the administrators 22A, 22B from accessing the resources, which they are not in charge of, according to this embodiment.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Computer system
12 Host computer
14, 16 Migration source storage apparatuses
18 Migration destination storage apparatus
20 Network
22, 24, 26 Administrators
28, 30 Migration source volumes
32, 34 Migration destination volumes
36 Management system
38, 40 Resource groups
90 Storage devices
92 Controller
96 Frontend package
98 Backend package
100 Microprocessor package
102 Cache memory package
200 Device control program
202 System configuration information
204 Account management table
206 User access control program
208 Resource group control program
210 Migration support control program
212 User account management table
214 User group management table
216 Authority bitmap management table
218 Role management table
220 Session management table
222 Resource group management table
224 Resource group configuration management table
226 Default resource management table
230 Access management table
232 Group pattern list

The invention claimed is:
1. A computer system comprising:
a plurality of storage apparatuses having one or more storage devices; and
a host computer for sending or receiving information to or from each storage apparatus via networks,
wherein: two storage apparatuses among the plurality of storage apparatuses are migration source storage apparatuses and a storage apparatus of the plurality of storage apparatuses is a migration destination storage apparatus,
the computer system is configured to migrate data of a plurality of migration source volumes of each migration source storage apparatus via the networks to a plurality of migration destination volumes of the migration destination storage apparatus,
the host computer is configured to:
switch from a plurality of network paths connecting each migration source volume and the host computer to a plurality of network paths connecting each migration destination volume and the host computer on a condition that a migration setting is set to migrate the data of each migration source volume to each migration destination volume, and
recognize each migration destination volume as each migration source volume;
the migration destination storage apparatus includes a controller configured to:

send or receive information to or from the host computer; and manage each migration destination volume as an access target of the host computer; and manage each migration destination volume by associating it with each migration source storage apparatus;

divide the migration destination volumes into a plurality of resource groups based on identification information for identifying each migration source volume;

manage a plurality of resources related to each migration destination volume by associating a migration destination volume with each resource group, each resource including at least a logical device and a port;

manage each migration destination volume and each resource belonging to each resource group as operation targets to be allocated individually to each migration source user who uses each migration source apparatus, and as operation targets over which only each migration source user has operation authority;

manage role management by maintaining a map from role to resource groups, a map from group identifier (ID) to roles, a map from role ID to role names and authority bitmaps, and a map from bits of the authority bitmap to an authority; and manage users by assigning users one or more roles or group IDs, and by executing an authority on a resource only if the user has the authority for the resource based on the one or more roles or groups assigned to the user.

2. The computer system according to claim 1, wherein if the plurality of migration destination volumes which are migration destination volumes belonging to any of the resource groups and are migrated from one of the two migration source storage apparatuses exist, the controller creates a plurality of user-based migration destination resource groups corresponding to a plurality of migration source users, for which each of the plurality of migration source volumes that are migration sources of the plurality of migration destination volumes is an operation target, as migration destination resource groups for managing the plurality of migration destination volumes; and manages each migration destination volume by associating it with each user-based migration destination resource group.

3. The computer system according to claim 2, wherein when creating each user-based migration destination resource group corresponding to each migration source user, the controller obtains identification information for identifying each migration source user as an owner from one of the migration source storage apparatuses and creates each user-based migration destination resource group by associating it with each migration source user based on the obtained identification information.

4. The computer system according to claim 3, wherein the controller manages the plurality of resources related to each migration destination volume migrated from one of the migration source storage apparatuses by associating them with each user-based resource group; manages each migration destination volume and each resource belonging to each user-based resource group as operation targets to be allocated individually to each migration source user who uses that one of the migration source storage apparatuses, and as operation targets over which only each migration source user has operation authority.

5. The computer system according to claim 1, wherein if a shared resource that is shared by each resource group exists in the plurality of resources related to each migration destination volume, the controller manages the shared resource as a resource group different from the plurality of resource groups by associating the shared resource with each resource group; creates a shared resource group for sorting the shared resource into each resource group; manages the shared resource by using the shared resource group; and manages the shared resource group as an operation target to be allocated individually to each migration source user.

6. A computer system comprising:

a plurality of storage apparatuses having one or more storage devices; and a host computer for sending or receiving information to or from each storage apparatus via networks, wherein:

two storage apparatuses among the plurality of storage apparatuses are migration source storage apparatuses and a storage apparatus of the plurality of storage apparatuses is a migration destination storage apparatus, the computer system is configured to migrate data of a plurality of migration source volumes of each migration source storage apparatus via the networks to a plurality of migration destination volumes of the migration destination storage apparatus, the host computer is configured to:

switch from a plurality of network paths connecting each migration source volume and the host computer to a plurality of network paths connecting each migration destination volume and the host computer on a condition that a migration setting is set to migrate the data of each migration source volume to each migration destination volume, and recognize each migration destination volume as each migration source volume;

the migration destination storage apparatus includes a controller configured to:

send or receive information to or from the host computer;

manage each migration destination volume as an access target of the host computer;

manage each migration destination volume by associating it with each migration source storage apparatus;

divide the migration destination volumes into a plurality of resource groups based on identification information for identifying each migration source volume;

manage a plurality of resources related to each migration destination volume by associating a migration destination volume with each resource group, each resource including at least a logical device and a port;

manage each migration destination volume and each resource belonging to each resource group as operation targets to be allocated individually to each migration source user who uses each migration source apparatus, and as operation targets over which only each migration source user has operation authority;

manage the shared resource as a resource group different from the plurality of resource groups by associating the shared resource with each resource group if a shared resource that is shared by each migration source storage apparatus exists in the plurality of resources related to each migration destination volume;

create a shared resource group for sorting the shared resource into each resource group;

manage the shared resource by using the shared resource group;

manage the shared resource group as an operation target to be allocated individually to each migration source user;

manage role management by maintaining a map from role to resource groups, a map from group identifier (ID) to roles, a map from role ID to role names and authority bitmaps, and a map from bits of the authority bitmap to an authority; and manage users by assigning users one or more roles or group IDs, and by executing an authority on a resource only if the user has the authority for the resource based on the one or more roles or groups assigned to the user.

7. The computer system according to claim 6, wherein if a shared resource that is shared by each resource group exists in the plurality of resources related to each migration destination volume, the controller manages the shared resource as a resource group different from the plurality of resource groups by associating the shared resource with each resource group; creates a shared resource group for sorting the shared resource into each resource group; manages the shared resource by using the shared resource group; and manages the shared resource group as an operation target to be allocated individually to each migration source user.

8. A method for managing a computer system including a plurality of storage apparatuses having one or more storage devices, and a host computer for sending or receiving information to or from each storage apparatus via networks, two storage apparatuses among the plurality of storage apparatuses are migration source storage apparatuses and a storage apparatus of the plurality of storage apparatuses is a migration destination storage apparatus, and data of a plurality of migration source volumes of each migration source storage apparatus is migrated via the networks to a plurality of migration destination volumes of the migration destination storage apparatus, the computer system management method comprising:

a step executed by the host computer of, on condition that a migration setting is set to migrate the data of each migration source volume to each migration destination volume, switching from a plurality of network paths connecting each migration source volume and the host computer to a plurality of network paths connecting each migration destination volume and the host computer, and recognizing each migration destination volume as each migration source volume;

a step executed by a controller, which manages, at the migration destination storage apparatus, each migration destination volume as an access target of the host computer, of managing each migration destination volume by associating it with each migration source storage apparatus and dividing the migration destination volumes into a plurality of resource groups based on identification information for identifying each migration source volume;

a step executed by the controller of managing a plurality of resources related to each migration destination volume by associating them with each resource group, each resource including at least a logical device and a port;

a step executed by the controller of managing each migration destination volume and each resource belonging to each resource group as operation targets to be allocated individually to each migration source user who uses each migration source apparatus, and as operation targets over which only each migration source user has operation authority and a step executed by the controller of managing role management by maintaining a map from role to resourese groups, a map from group ID to roles, a map from role ID to role names and authority bitmaps, and a map from bits of the authority bitmap to an authority;

a step executed by the controller of managing users by assigning users one or more roles or group IDs, and by executing an authority on a resource only if the user has the authority for the resource based on the one or more roles or groups assigned to the user.

9. The computer system management method according to claim 8, further comprising:

a step executed by the controller of, if the plurality of migration destination volumes which are migration destination volumes belonging to any of the resource groups and are migrated from one of the two migration source storage apparatuses exist, creating a plurality of user-based migration destination resource groups corresponding to a plurality of migration source users, for which each of the plurality of migration source volumes that are migration sources of the plurality of migration destination volumes is an operation target, as migration destination resource groups for managing the plurality of migration destination volumes; and a step executed by the controller of managing each migration destination volume by associating it with each user-based migration destination resource group.

10. The computer system management method according to claim 9, further comprising:

a step executed by the controller of, when creating each user-based migration destination resource group corresponding to each migration source user, obtaining identification information for identifying each migration source user as an owner from one of the migration source storage apparatuses; and a step executed by the controller of creating each user-based migration destination resource group by associating it with each migration source user based on the obtained identification information.

11. The computer system management method according to claim 10, further comprising:

a step executed by the controller of managing the plurality of resources related to each migration destination volume migrated from one of the migration source storage apparatuses by associating them with each user-based resource group;

a step executed by the controller of managing each migration destination volume and each resource belonging to each user-based resource group as operation targets to be allocated individually to each migration source user who uses that one of the migration source storage apparatuses, and as operation targets over which only each migration source user has operation authority.

12. The computer system management method according to claim 8, further comprising:

a step executed by the controller of, if a shared resource that is shared by each resource group exists in the plurality of resources related to each migration destination volume, managing the shared resource as a resource group different from the plurality of resource groups by associating the shared resource with each resource group; creating a shared resource group for sorting the shared resource into each resource group; managing the shared resource by using the shared resource group; and a step executed by the controller of managing the shared resource group as an operation target to be allocated individually to each migration source user.

* * * * *